United States Patent
Schill, Jr.

(10) Patent No.: US 10,135,236 B2
(45) Date of Patent: Nov. 20, 2018

(54) AUTO-TRIGGERED METHODS AND SYSTEMS FOR PROTECTING AGAINST DIRECT AND INDIRECT ELECTRONIC ATTACK

(71) Applicant: The Board of Regents of the University of Nevada System of Higher Education on behalf of the University of Nevada, Las Vegas, NV (US)

(72) Inventor: Robert A. Schill, Jr., Henderson, NV (US)

(73) Assignee: The Board of Regents of the Nevada Systems of Higher Education on Behalf of the University of Nevada, Las Vegas, Las Vegas, NV (US)

( * ) Notice: Subject to any disclaimer, the term of this patent is extended or adjusted under 35 U.S.C. 154(b) by 397 days.

(21) Appl. No.: 14/185,871

(22) Filed: Feb. 20, 2014

(65) Prior Publication Data
US 2015/0029632 A1    Jan. 29, 2015

Related U.S. Application Data

(60) Provisional application No. 61/767,059, filed on Feb. 20, 2013.

(51) Int. Cl.
*H01T 23/00* (2006.01)
*H02H 3/08* (2006.01)
*H02H 5/00* (2006.01)

(52) U.S. Cl.
CPC .................. *H02H 5/005* (2013.01)

(58) Field of Classification Search
CPC ............. H01T 23/00; H01L 2924/0002; H01L 2924/00; H02H 3/08
(Continued)

(56) References Cited

U.S. PATENT DOCUMENTS 1,001,821 A * 8/1911 Coffield ................. F01B 17/02
    91/342
3,023,380 A * 2/1962 Hill ......................... H01J 17/04
    333/13
(Continued)

OTHER PUBLICATIONS

U.S. Appl. No. 61/767,059, filed Feb. 20, 2013, Robert A. Schill, Jr. (University of Nevada, Las Vegas).
(Continued)

*Primary Examiner* — Dharti Patel
(74) *Attorney, Agent, or Firm* — Ballard Spahr LLP

(57) ABSTRACT

Methods and systems for preventing direct and indirect electronic attacks, cyber attacks, and/or minimizing the impact of high voltage pulses are disclosed. In an aspect, an example system can comprise an electromagnetic plasma disrupter device. The electromagnetic plasma disrupter device can comprise a gas pressurized enclosure such a waveguide, grounded metal enclosure, or Faraday shield having a first pair of opposed electrodes at least partially enclosed in the enclosure. A first electrode of a first pair of the opposed electrodes can be connected to ground. A second electrode of the first pair of opposed electrodes can be coupled to a voltage source. The system can optionally comprise a second pair of opposed electrodes. The second pair of electrodes can allow, under normal operation, for signals to enter and leave an electronic circuit that is being protected.

20 Claims, 39 Drawing Sheets

(58) Field of Classification Search
USPC .............. 361/231, 111–112, 91.1, 76, 86;
333/135, 137, 157, 208, 99, 13;
315/111.21; 342/13
See application file for complete search history.

(56) References Cited

U.S. PATENT DOCUMENTS

| | | | | |
|---|---|---|---|---|
| 3,212,034 | A * | 10/1965 | Kaufman | H01P 1/209 315/39 |
| 3,227,971 | A * | 1/1966 | Stewart | H01P 1/00 333/17.1 |
| 3,480,828 | A * | 11/1969 | Goldie | H01J 17/04 313/592 |
| 3,903,489 | A * | 9/1975 | Schubert | H01P 1/14 313/39 |
| 4,291,255 | A * | 9/1981 | Alexeff | H01T 2/02 313/231.41 |
| 4,394,622 | A * | 7/1983 | Rink | H01J 17/38 313/234 |
| 4,412,150 | A * | 10/1983 | Alexeff | H01S 1/00 313/231.31 |
| 4,431,946 | A * | 2/1984 | O'Loughlin | H01T 2/00 307/139 |
| 4,477,746 | A * | 10/1984 | Piltch | H01T 14/00 307/107 |
| 4,782,235 | A * | 11/1988 | Lejeune | H01J 27/18 250/423 R |
| 4,942,337 | A * | 7/1990 | Beerwald | H01T 2/00 315/325 |
| 5,182,496 | A | 1/1993 | Manheimer | 315/111.41 |
| 5,418,430 | A * | 5/1995 | Bayliss | H01J 37/32009 313/231.31 |
| 5,663,694 | A * | 9/1997 | Goebel | H01P 1/14 331/82 |
| 5,980,767 | A * | 11/1999 | Koshimizu | B81C 1/00587 216/60 |
| 6,136,214 | A * | 10/2000 | Mori | H01J 37/32871 118/723 R |
| 6,417,604 | B1 | 7/2002 | Hartmann | 313/153 |
| 6,713,771 | B2 * | 3/2004 | Nakagawa | B01J 19/123 250/431 |
| 7,570,683 | B1 * | 8/2009 | Broderick | H01S 3/03 372/35 |
| 7,656,989 | B2 | 2/2010 | Wood | 376/132 |
| 8,624,502 | B2 * | 1/2014 | Rosenthal | H01J 27/18 250/423 R |
| 2002/0047544 | A1 | 4/2002 | Nishikawa | 315/111.21 |
| 2012/0038277 | A1 * | 2/2012 | Eto | H01J 37/32091 315/111.21 |
| 2012/0228261 | A1 * | 9/2012 | Watanabe | G03F 7/40 216/41 |
| 2014/0076716 | A1 * | 3/2014 | Gorokhovsky | H01J 37/32357 204/192.12 |
| 2015/0122670 | A1 * | 5/2015 | Stautner | F17C 11/00 206/0.7 |
| 2015/0123539 | A1 * | 5/2015 | Stautner | H01J 7/18 315/108 |

OTHER PUBLICATIONS

Alexeff et al. "Experimental and theoretical results with plasma antennas." Plasma Science, IEEE Transactions on, vol. 34, No. 2, 166-172.
Andersen, S. and Schill, Jr., R.A., "Nonlinear Theory Modeling Electron Beam Constriction in a Pulsed Power Discharge," IEEE Transactions on Plasma Science, submitted Sep. 12, 2014. (Currently under second review).
Ball. 1972. "Plasma diagnostics and energy transport of a dc discharge used for sputtering." J. Appl. Phys., vol. 43, No. 7, 3047-3057.
Baranov et al. 1969. "Contraction of a positive column. I, "Sov. Phys. Tech. Phys., vol. 14, 176.
Bennett. 1934. "Magnetically self-focusing streams," Physical Review, vol. 45, No. 12, pp. 890.
Bittencourt. *Fundamentals of Plasma Physics* (3 ed. 2004).
Briggs & Yu. 1982. "Modeling beam-front dynamics at low gas pressures," Lawrence Livermore National lab., UCID-19399, 1-46.
Briggs. 1981. "Simple model of beam transport in low-pressure ion-focused regimes," pp. 1-14.
Buchanan, H.L. 1987. "Electron beam propagation in the ion-focused regime," Phys. Fluids, vol. 30, pp. 221.
Carlqvist. 1988. "Cosmic electric currents and the generalized Bennett relation," Astrophysics & Space Science, vol. 144, No. 1, pp. 73-84.
Chapman, B. *Glow discharge processes: Sputtering and plasma etching.* (1980).
Cobine. *Gaseous Conductors: Theory and Engineering Applications.* (1958).
Daniels et al. 1990. "The contracted positive column in electronegative gases." J. Phys. D., vol. 23, 823.
Dyatko et al. 2008. "Experimental and theoretical study of the transition between diffuse and contracted forms of the glow discharge in argon." J. Phys. D., vol. 41, 055204.
Eletskii. 1971. "Contraction of the positive column of a glow discharge," Sov. Phys. Tech. Phys., vol. 15, 1308.
Fernsler et al. 1992. "Conditioning electron beams in the ion-focused regime," Phys. Fluids B, vol. 4, pp. 4153.
Fernsler. 1992. "Conditioning electron beams in the ion-focused regime," Naval Research Laboratory, Washington DC, NRL/MR/4790-92-7100, pp. 1-50.
Freidberg, J.P., *Ideal Magnetohydrodynamics,* (1987).
Golubovskii et al. 2011. "Contraction of the positive column of discharges in noble gases." Plasma Sources Sci. Technol., vol. 20, 053002.
Golubovskii. 1979. "Contraction of an inert-gas discharge. I. Argon (experiment)," Sov. Phys. Tech. Phys., vol. 24, No. 2, 173.
Graves et al. 1986. "A continuum model of DC and RF discharges." Plasma Science, IEEE Transactions on, vol. 14, No. 2, 78-91.
Gsponer. 2009. "The physics of high-intensity high-energy particle beam propagation in open air and outer-space plasmas," Independent Scientific Research Institute, Oxford England, ISRI-82-04.56, pp. 1-254.
Hayakawa et al. "Analysis of discharge phenomena under non-uniform electirc field in vacuum using image processing," Electrical Insulation, 1994, Conference Record of the 1994 IEEE Int. Symp. on Electrical Insulation, pp. 241-244.
Kelly et al. 1999. "Microwave reflections from a vacuum ultraviolet laser produced plasma sheet," J.Appl.Phys., vol. 85, pp. 63-68.
Kenty. 1962. "Volume recombination, constriction, and volt-ampere characteristics of the positive column," Physical review, vol. 126, No. 4, 1235.
Lieberman & Lichtenberg. *Principles of plasma discharges and materials processing.* (1994).
Manheimer, W.M. 1991. "Plasma reflectors for electronic beam steering in radar systems," Plasma Science, IEEE Transactions on, vol. 19, No. 6, pp. 1228-1234.
Martin et al. 1985. "Electron-beam guiding and phase-mix damping by a laser-ionized channel," Phys.Rev.Lett., vol. 54, No. 7, pp. 685-688.
Massey et al. 1965. "Constricted discharges in the rare gases. I. Spectroscopic and electrical measurements." J. Appl. Phys., vol. 36, No. 2, 361-372.
Massey. 1965. "Constricted discharges in the rare gases. II. Analysis of the macroscopic properties of the discharge." J. Appl. Phys., vol. 36, No. 2, 373-380.
Mathew et al. 1996. "Generation of large area, sheet plasma mirrors for redirecting high frequency microwave beams," Phys.Rev.Lett., vol. 77, No. 10, pp. 1982-1985.
Mathew et al. 1995. "Electronically steerable plasma mirror," IEEE International Symposium on Phased Array Systems, Conference Proceeding, pp. 58-62.
Meger et al. 1995. "Experimental investigations of the formation of a plasma mirror for high-frequency microwave beam steering," Phys. Plasmas, vol. 2, pp. 2532.

(56) References Cited

OTHER PUBLICATIONS

Miao et al. 2008. "Conical DC discharge in ambient air using water as an electrode," Plasma Science, IEEE Transactions on, vol. 36, No. 1, 126-130.

Miller, R.B. *An introduction to the physics of intense charged particle beams*, (1982).

Milsom. 1996. "Constriction of the positive column in a DC-driven sulphur hexafluoride gas discharge." J.Phys.D., vol. 29, 403.

Myers et al. 1995. "Transport and centering of high current electron beams in neutral gas filled cells," J.Appl.Phys., vol. 78, No. 6, pp. 3580-3591.

Myers et al. 1996. "Emittance tailoring of electron beams for propagation in dense gas," J.Appl.Phys., vol. 80, No. 8, pp. 4258-4267.

Nguyen et al. 1987. "Transverse instability of an electron beam in a beam-induced ion channel," Appl.Phys.Lett., vol. 50, No. 5, pp. 239-241.

Ogle et al. 1987. "Diffuse and constricted glow discharges in $SF_6$." J. Phys. D., vol. 20, 453.

Ottinger et al. 1984. "Theoretical modeling of the plasma erosion opening switch for inductive storage applications." J. Appl. Phys., vol. 56, No. 3, 774-784.

Risacher et al. 2007. "Active stabilization of low-current arc discharges in atmospheric-pressure air," Plasma Sources Sci. Technol., vol. 16, pp. 200.

Robson et al. 1992. "Demonstration of a plasma mirror for microwaves." Plasma Science, IEEE Transactions on, vol. 20, No. 6, 1036-1040.

Rogoff. 1972."Gas heating effects in the constriction of a high-pressure glow discharge column." Phys. Fluids, vol. 15, 1931-1940.

Schill, R.A. 2011. "Basic Research on Plasma Cathode for HPM Sources (NE—Luginsland)." University of Nevada Las Vegas, Department of Electrical and Computer Engineering.

Schram. 2009. "Is plasma unique? The presence of electrons and the importance of charge." Plasma Sources Sci. Technol., 18, 014003.

Shen et al. 1995. "Properties of a vacuum ultraviolet laser created plasma sheet for a microwave reflector," J.Appl.Phys., vol. 78, No. 12, pp. 6974-6979.

Smith, C. and Schill, R., "DC Discharge and breakdown study with applications to the take-off region in an electron source leading to electron production," AFOSR Grant #FA9550-08-1-0045, vol. Final Report, 2008.

Takaki et al. 2002. "High-current, large volume glow plasma production using pulse modulator," IEEE International Symposium on Electrical Insulation, Conference Proceedings, pp. 571-574.

Toader, E.I. 1995. "On the constricted neon positive column." J. Phys. D., vol. 28, 75.

Ul'yanov. 1973. "Contraction of the positive column by dissociative recombination," Sov. Phys. Tech. Phys., vol. 18, No. 3, 360.

Von Engel. *Ionized Gases*. (1994).

Woo & DeGroot. 1984. "Microwave absorption and plasma heating due to microwave breakdown in the atmosphere," Phys. Fluids, vol. 27, pp. 475.

\* cited by examiner

| Characteristic | Performance Requirement | Supplemental Information |
|---|---|---|
| Risetime | | |
| 10-foot probe | ≤ 4.5 ns. | $Z_{source}$ = 25 ohms. |
| 25-foot probe | ≤ 50 ns. | |
| Bandwidth (−3 db) | | |
| 10-foot probe | 75 MHz. | Test oscilloscope must be ≥ 100 MHz. |
| 25-foot probe | 8 MHz. | |
| Delay Time | | |
| 10-foot probe | Approximately 10 ns. | |
| 25-foot probe | Approximately 25 ns. | |

FIG. 3F

AUTO-TRIGGERED METHODS AND SYSTEMS FOR PROTECTING AGAINST DIRECT AND INDIRECT ELECTRONIC ATTACK

CROSS REFERENCE TO RELATED PATENT APPLICATION

This application claims priority to U.S. Provisional Application No. 61/767,059 filed Feb. 20, 2013, herein incorporated by reference in its entirety.

GOVERNMENT SUPPORT CLAUSE

This invention was made with government support under FA9550-08-1-0045 awarded by the Air Force Office of Scientific Research (AFOSR). The government has certain rights in the invention.

BACKGROUND

Natural phenomena such as lightning and tribo-electric effects resulting from dry sand storms can couple large voltages, large currents, or electromagnetic pulses into materials through large electrical discharges. Strong solar flares can cause unprecedented damage not only to communication and data security devices built with sensitive electronics but also with hearty electrical elements found in the power grid. High voltages and high currents created by such natural phenomena can disrupt and intermittently minimize the longevity of electronic equipment. Electromagnetic pulses (EMP) or high energy from directed electromagnetic weapons can be directed into materials to damage electronic equipment. Such damage can affect satellite communications, personal computers, television, electronic household commodities, and electronic equipment in military theater, for example. There is a need for more sophisticated methods and systems for protecting against electronic attacks.

SUMMARY

It is to be understood that both the following general description and the following detailed description are exemplary and explanatory only and are not restrictive. Methods and systems for preventing direct and indirect electronic attacks, cyber attacks, and/or minimizing the impact of high voltage pulses are disclosed. In an aspect, an example system can comprise an electromagnetic plasma disrupter device. The electromagnetic plasma disrupter device can comprise a gas pressurized housing (e.g., enclosure, partial enclosure, pressurized structure) such as a waveguide, a first electrode of a first pair of the opposed electrodes can be connected to ground. A second electrode of the first pair of opposed electrodes can be coupled to a voltage source. The system can optionally comprise a second pair of opposed electrodes. The second pair of the opposed electrodes can be disposed within the waveguide in series. The second pair of electrodes can allow, under normal operation, for signals to enter and leave the electronic circuit that is being protected. In an aspect, the first pair of opposed electrodes can respond to a damaging incoming signal as the signal passes between electrode plates auto-triggering a controlled plasma wire. The first pair of opposed electrode can generate and control plasma wire that reflects, scatters, and attenuates a forth coming signal appropriately shielding the connected electronic circuitry.

A first example method can comprise disposing an electromagnetic plasma disrupter on common electrical lines (e.g., utility cord, wire, coaxial cable) between any external source (e.g., antenna, utility outlet, energy source disposed external to the pressurized housing) or external load (e.g., electrical, electromagnetic, optic, electro-mechanical, mechanical devices, energy load disposed external to the pressurized housing) and electronic circuitry in a grounded enclosure or appropriate Faraday shield, as shown in FIG. 1. As an example, the electromagnetic plasma disrupter device can comprise an appropriate gas pressurized grounded metallic enclosure or Faraday shielded enclosure and two pairs of opposed electrodes partially or fully enclosed in the enclosure. A first electrode of the first pair of opposed electrodes can be connected to ground. A second electrode of the first pair of the opposed electrodes can be coupled to a bias voltage source. A second pair of opposed electrodes can be disposed within the electrical line in series with the electronic circuitry in its own appropriately shielded enclosure. Low energy/low power electrical signals can be passed to and from the electronic circuitry through capacitor coupling effects. A first electrode of the second pair can be electrically or electromagnetically connected to the electronic circuitry. The second electrode of the second pair can be electrically or electromagnetically connected to an external load or source. In an aspect, an appropriate gas pressure can be applied to the enclosure containing the two electrode pair. The first electrode pair is biased below the threshold gas breakdown voltage. As damaging electromagnetic energy is coupled to the line containing the plasma disrupter and impacts the first electrode pair, the threshold breakdown voltage will be exceeded, triggering the gas environment to breakdown and generate a plasma. With appropriate parameters, the plasma will form a plasma wire which in turn reflects, scatters, or absorbs the forthcoming portion of the damaging electromagnetic energy.

In an aspect, an example method can comprise disposing an electromagnetic plasma disrupter device between any external source (e.g., microwave source, high frequency radio frequency source, horn, waveguide, or aperture antenna) or external load (e.g., microwave circuit) and electronic circuitry in its own grounded, shielded enclosure, as shown in FIG. 2. As an example, the electromagnetic plasma disrupter device can comprise an appropriately gas pressurized section of waveguide and one opposed pair of electrodes, defined as the first electrode pair, partially or fully enclosed in the waveguide with electromagnetic transparent windows that localize the pressurized gas environment. A first electrode of the first pair of the opposed electrodes can be coupled to ground. A second electrode of the first pair of the opposed electrodes can be coupled to a bias voltage source. The plasma disrupter can be associated with the first electrode pair. For clarity, there is optionally, no second electrode pair in this example. In an aspect, an appropriate gas pressure can be applied to a localized section of the waveguide bounded with electromagnetic transparent windows. A voltage can be applied across the second electrode of the first pair of the opposed electrodes to a level below threshold. A damaging electromagnetic signal impacting the biased first electrode pair auto-triggers the generation of a plasma medium when the breakdown threshold is exceeded. As the plasma evolves, it shapes itself as a constricted plasma wire. The plasma wire in turn reflects, scatters, and absorbs the damaging electromagnetic signal.

Additional advantages are set forth in part in the description which follows or may be learned by practice. The advantages can be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 3F illustrates Tektronix P6015 high voltage probe specifications;

FIGS. 3M-1 and 3M-2 illustrates scope data as measured experimentally with an oscilloscope under the defined conditions: $R_b=158\Omega$, d=3 cm, $V_{br}=2.5$ kV, $C_o=300$ pF

FIG. 5E-1 to 5E-28 illustrates examples of the image processing code output plots.

DETAILED DESCRIPTION

Figure 1A:
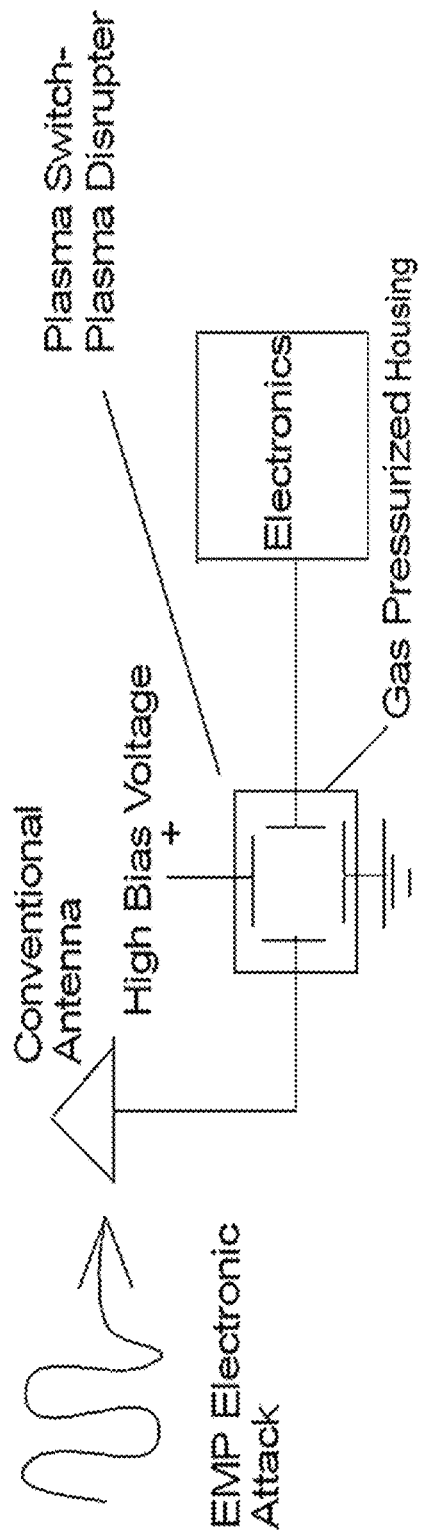
FIG. 1A illustrates an exemplary system environment.

Before the present methods and systems are disclosed and described, it is to be understood that the methods and systems are not limited to specific methods, specific components, or to particular configurations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it can be understood that the particular value forms another embodiment. It can be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

As can be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It can be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It can also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

In an aspect, dense plasmas can have the ability to reflect, scatter, attenuate, and/or distort impinging signals thereby effectively acting as a switch. For example, radio frequency (RF) waves are unable to penetrate the earth's ionosphere (e.g., dense plasma) but visible light can. By using a pressurized gas in the Torr to 10s of Torr range (e.g., order of magnitude) biased by a suitable high voltage source, a controlled constricted plasma pinch may be generated to prevent a damaging portion of the EMP or high electromagnetic energy from passing the discharge to the electronics. If the plasma switch is biased to a potential below some tunable threshold, the apparatus can be in the off position (no plasma discharge) allowing for normal usage of the electronic device. When an incoming signal (e.g., a large EMP or energetic signal) impinges on an input such as an antenna structure, the magnitude of the field in the pressurized gas can exceed the breakdown threshold of the gas to trigger a plasma discharge thereby shorting (e.g., reflecting, etc.) the incoming signal. The disclosed methods and systems can be used in electromagnetic shielding products and high voltage electric switching products.

Figure 2A:
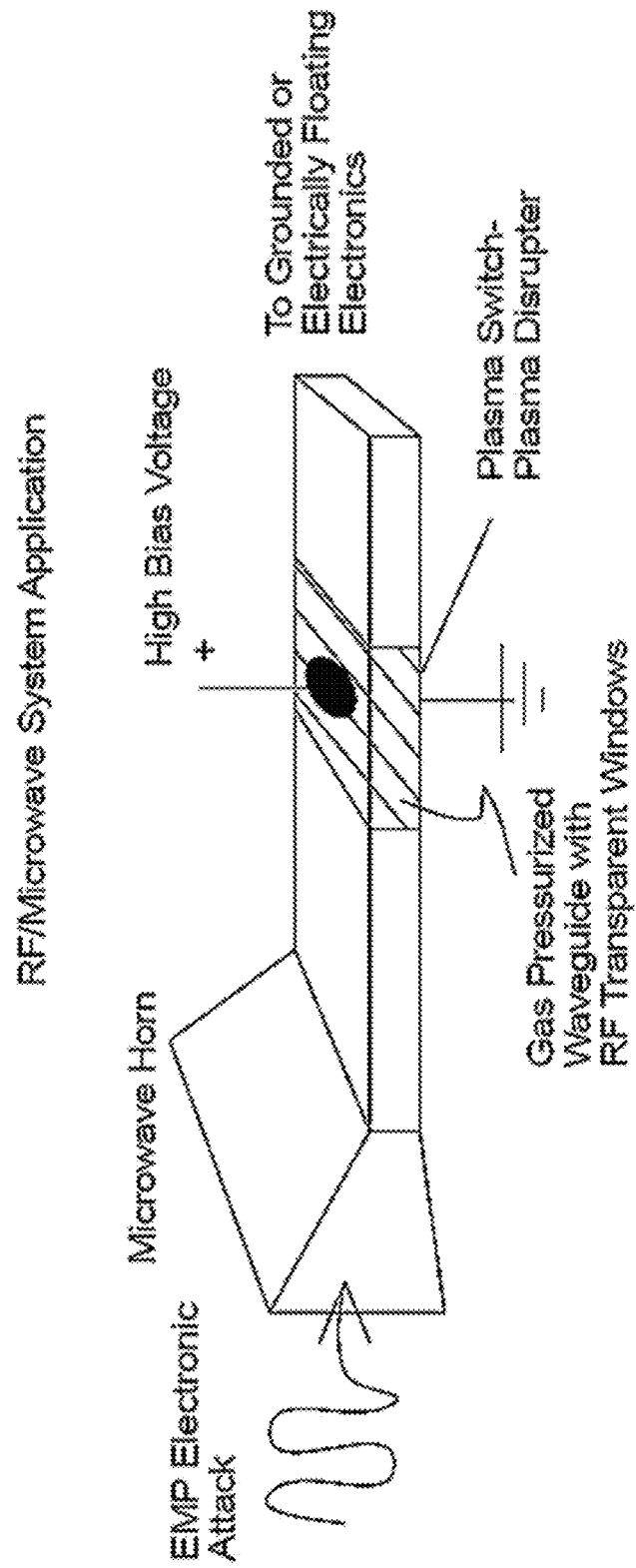
FIG. 2A illustrates another exemplary system environment.
Figure 2B:
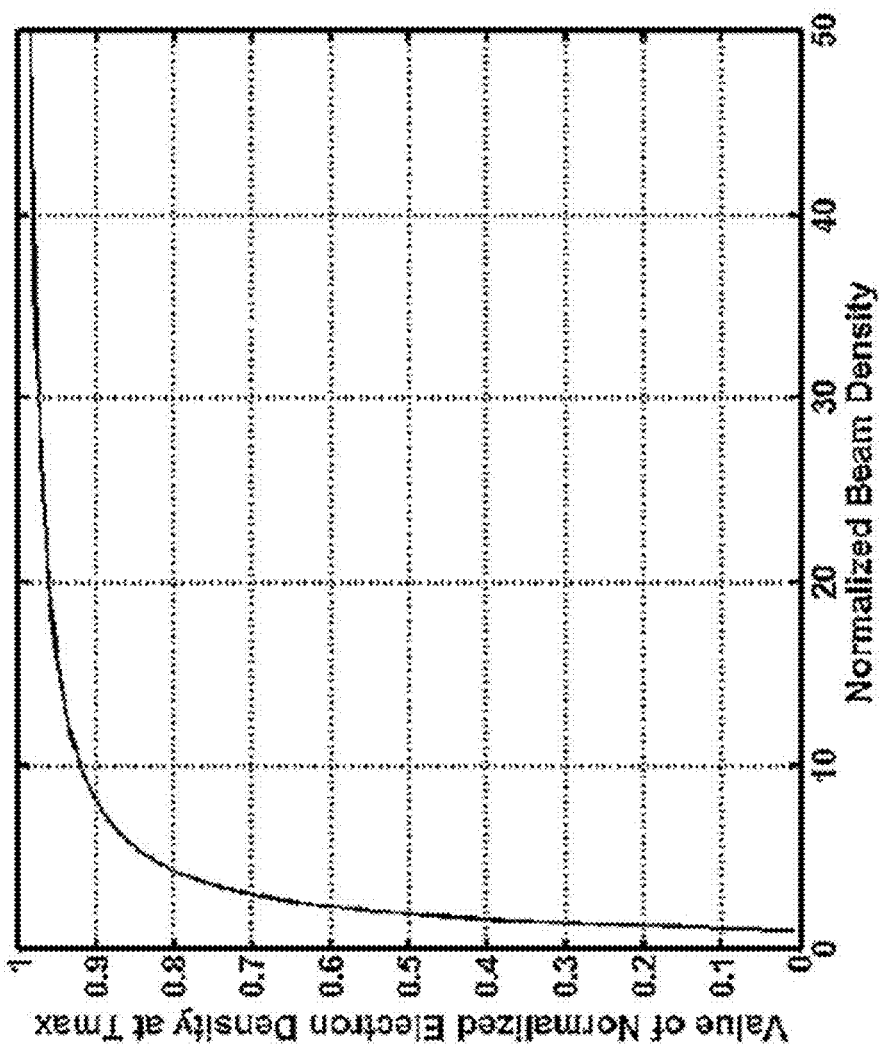
FIG. 2B illustrates an endpoint electron density of Case 4b for different values of $\tilde{n}_b$.
Figures 1, 2C:
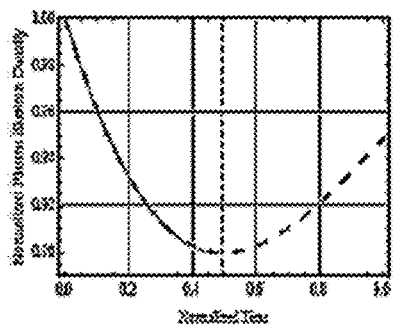
FIG. 2C illustrates a normalized background electron density initially in a quasineutral state with its background ion specie in the presence of an electron beam density with normalized beam density $\tilde{n}_b=0.1$ (2C-1), $\tilde{n}_b=1$ (2C-2), $\tilde{n}_b=1.01$ (2C-3), $\tilde{n}_b=2$ (2C-4), $\tilde{n}_b=0.99$ (2C-5)
FIGS. 3A-1 and 3A-2 illustrates electrical discharge tube experimental setup.
Figures 2, 2C:
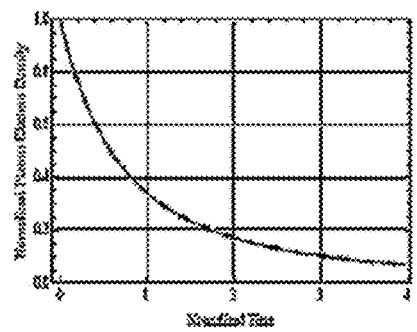

FIG. 1 and FIG. 2 illustrate two scenarios on how the disclosed apparatus can be used and fitted into a circuit between an antenna and electronics to be protected. In an electrical system, shown in FIG. 1A, the apparatus can be AC coupled to an electronic device. The magnitude of two electric field amplitudes with perpendicular orientation generated between two sets of plates, E1 and E2, can yield a resultant field $E=(E1^2+E2^2)^{0.5}$ which can be responsible for the breakdown of gas in the waveguide. Breakdown is associated with a Paschen effect. In a RF/microwave system, as shown in FIG. 2A, an electromagnetic wave can be captured by a waveguide. The wave can generate an electric field which can be combined with a biased electric field, resulting in a discharge. The disclosed apparatus can harness the physics of electromagnetic pulses on electronics to control discharge (e.g., arc-like) that can occur during breakdown such that a violent or destructive arcing does not occur in the electronic system through any portal within the electronic equipment (similar to lightning) and within the disclosed apparatus. Instead, a gentle constricted glow results that does not significantly damage the electrodes of the apparatus and leads to a controlled release of charge or pulsating charge dependent on external circuitry and the external field. The actual physics of the discharge can be different from that at low pressure. If the external field is large enough, the disclosed apparatus can be controlled by undesired external fields and the pulsing nature of the biased plates has nominal or no effect on the discharge. If the external field falls below a threshold, the pulsing nature of the discharge automatically turns the switch off allowing for normal operations of the electronic device.

In an aspect, an exemplary electronic system can comprise an external source (e.g., antenna, electrical outlet, generator) or external load (e.g., electrical, electromagnetic, optical, electro-mechanical, mechanical devices), an electronic device (e.g., circuitry), and a plasma disrupter device positioned between the external source or external load and the electronic device to protect the electronic device against an electromagnetic pulse impacting external sources, loads, or connecting lines. In an aspect, the electromagnetic plasma disrupter device can comprise a gas pressurized grounded metal enclosure or a similar Faraday shield and two pairs of opposed electrodes partially or fully enclosed in the enclosure. A first electrode of a first pair of the opposed electrodes can be connected to ground. A second electrode of the first pair of opposed electrodes can be connected to a voltage source. A second pair of the opposed electrodes can be disposed within the waveguide in series. The first electrode pair is responsible for generating and controlling the auto-triggered plasma disruptor. The second electrode pair under normal operation AC couples signals to and from the electronic circuit being protected.

In another aspect, an exemplary electronic system can comprise an external source or external load connected to a single conductor waveguide and an electronic device (e.g., circuitry), and a plasma disrupter device positioned between the external source or external load and the electronic device to protect the electronic device against an electromagnetic pulse impacting external sources, loads or connecting lines. In an aspect, the electromagnetic plasma disrupter device can comprise a waveguide that is locally pressurized with gas contained between two electromagnetic transparent windows in the waveguide housing a single pair of opposed electrodes partially or fully enclosed in the enclosure. This electrode pair will be denoted as the first electrode pair even though it is the only electrode pair in this example. A first electrode of a first pair of the opposed electrodes can be connected to ground. A second electrode of the first pair of opposed electrodes can be connected to a voltage source. The first electrode pair is responsible for generating and controlling the auto-triggered plasma disruptor.

To assist in tuning and observing functional aspects of the plasma disruptor, the housing containing a vacuum and the one or two electrode pairs may have one or more RF transparent windows. Upon interception of an electromagnetic pulse that would otherwise damage, if not destroy the electronics associated with the antenna, the auto-triggered plasma switch associated with the first electrode pair disrupts any flow of electrical or electromagnetic surge impacting the first electrode pair in series between the external source or external load and the electronic device (e.g., circuitry). As an example, the electronic device being protected can comprise computers, video equipment, broadcasting equipment, medical equipment, electric locomotives, receiving equipment, radios, cell phones, broadcast towers, and the like.

In an aspect, by controlling the state in which secondary electrons are generated within a pulsed, nearly DC plasma discharge, the nature of the secondary electrons can collectively redistribute the thermal electrons in the discharge to form a plasma wire, a pulsed, nearly static equilibrium pinch to act as a "Plasma Shield" barrier to large external destructive electromagnetic or EMP signatures. Nearly implies that the response time of the plasma pinch to reach equilibrium is less than or on the order of the on-time of the switch. The on-time is the time duration that the damaging electromagnetic energy is in between the plates. Plasma can be described as a fluid that contains free electrons, ions, and neutral atoms. It is created through a process of ionization.

Plasma, the forth state of matter, can be simply described as a fluid that contains free electrons, ions and neutral atoms [1]. It is created through the process of ionization [2]. To be considered a plasma, the gas can also exhibit quasi-neutral and collective behaviors [3] where long range electric, magnetic, and/or electromagnetic fields can influence the nature of the medium.

In an aspect, plasma can contain enough ionized particles to allow electromagnetic forces and effects among the ionized particles to dominate plasma behavior. As ionized particles move around they can create local concentrations of charge resulting in generation of net electric and magnetic fields. These fields can have a long range effect on particles far away in the plasma. Thus the motion of particles in plasma not only can depend on local collisions, but also on state and behavior of particles in remote regions as well. This communication and connection of particles can be described as collective behavior and is necessary for the ionized gas to be considered a plasma [3].

A simple nonlinear theory has been developed to estimate the process of electron channeling for an energetic electron beam passing through a thermalized plasma. A number of different perturbations have been used to analyze the governing equations characterizing the physical process. It is assumed over the duration of the experiment, that the ions are sluggish and do not move thereby presenting a uniform static background ion species. In the simple model, the cold background electron fluid with no net initial motion is allowed to respond to the presence of fast moving electron fluid. In this model, the electron species is separated into two different species of the same type but with very different initial particle states. The motivation of the theory is to determine if the fast moving secondary electron emission particles passing through a discharge may be responsible for a non-arc-like plasma pinch effect that results in experiments with periodic pulse discharge.

In certain plasma discharge experiments, it has been observed that under specific conditions a plasma glow discharge column tends to seek the central location of the discharge electrodes away from the electrode edges and chamber walls. Further, the column appears to have the properties of a stabilized equilibrium plasma pinch in a glow (non-arc-like) state. This is unusual since, normally field enhancements occur on edges resulting in arc-like discharge breakdown. Also, the column of plasma that protrudes from the anode emits highly intense, non-uniform light that is uncharacteristically bright for a glow discharge.

In an aspect, under certain conditions and assumptions, a secondary electron beam can initiate and sustain electron channeling and subsequent pinch forces due to charge repulsion and attraction, charge neutralization, and self-magnetic forces. This theory can be expanded beyond a glow discharge and be applied to any moderately energetic beam that passes through plasma, as long as the underlying assumptions and conditions are not violated.

An apparatus can be constructed to investigate this phenomenon. The apparatus can deliver controlled pulses that generate stable and repetitive pinched discharges. The apparatus can allow a user to change the parameters and the conditions of the discharge and to study the conditions that bring about plasma constriction. Measurement tools can be integrated into the system including current and voltage probes and image analysis tools.

In an aspect, conditions and assumptions can be built into theory, and compared to experiments and simulation, in order to discuss the applicability of the theory to a constricted glow discharge. Based on the models developed and on experimental implications, a parameter space based on the properties of the discharge can be identified that leads to the pinch of the discharge. Further, from transient discharge measurements, various properties of the pinch have been identified.

To be considered a plasma, gas can exhibit quasi-neutral and collective behaviors where long range electric, magnetic, and/or electromagnetic fields can influence the nature of the medium.

After a certain energy, however, the collision cross-section decreases with increasing energy. For clarity, the collision cross section is a measure of the probability that a collision event will occur. Typically, a collision cross section curve is plotted against the energy of the element experiencing the collision. All collisions cross section curves have a threshold energy level. Below the threshold energy, a collision will not occur. As the energy increases beyond this threshold, the probability of a collision event increases. An energy is reached where the cross section, the probability of collision, is maximized. Typically these certain energies are between 1 eV and tens of eV and depends on the collision process and the elements undergoing collision. Beyond this certain energy, the probability of collision typically decreases with increase in energy. The threshold energy and the energy for maximum collision cross section is dependent on the collision process and the collision parameters. With high enough energy the, probability of collision may be one or more orders of magnitude smaller than the peak cross section. This is the reason energetic primary electrons make it easily through the glow with a low probability of performing an ionizing collision. A small percentage of primary electrons do ionize though. Plus, primary electrons generate secondary electron emission at the anode. Primary electrons are directional and generally move quickly from cathode towards the anode [1].

In an aspect, the plasma is in condition of quasi-neutrality, meaning that in each volume element composing the plasma medium on a macroscopic level there are nearly equal number of localized positive and negative charges. In equilibrium, quasi-neutrality can be linked to the shielding of long range effects in a localized region of space. The charges in a plasma can allow the plasma to shield out electric potentials. The plasma charges can redistribute in such manner that the fields from a localized charge cannot be felt by other charges outside of a sphere on a macroscopic level. As the thermal energy of the electrons increases, density fluctuation of charge in a microscopic sphere formed at lower temperatures can result in field leakage from the sphere and consequently charges outside of the original sphere of lower temperature respond to the fields, thereby increasing the shielding radius of the sphere. The shielding cloud that the charges form can be called a sheath and its radius can increase with increasing thermal energy. The shielding effect is not perfect allowing a potential to exist external to the sheath and internal to the plasma, but it can decay rapidly with distance. The potential difference near a planar grid of infinite in extent immersed in a plasma can be given by:

$$\phi = \phi_0 \exp(-|x|/\lambda_D) \quad (1.1)$$

where the thickness of the sheath is characterized by the Debye length ($\lambda_D$) [3]

$$\lambda_D \equiv \left(\frac{\varepsilon_0 K T_e}{n e^2}\right)^{1/2} \quad (1.2)$$

The Debye length for the one dimensional sheath is also the radius of the Debye sphere shielding an external point charge placed in a plasma medium.

If the length of the plasma system, L, is smaller than the Debye length, the plasma cannot be quasi-neutral on a macroscopic level. Therefore, one plasma criterion is [3]:

$$\lambda_D << L \quad (1.3)$$

In an aspect, the number of charges within the Debye sphere ($N_D$) must be significant for the statistical nature of the theory to be valid, therefore $$N_D << 1 \quad (1.4)$$

In an aspect, the response time of the charges due to internal space charge effects can be small compared to the mean free time between short range billiard ball-like collisions ($\tau$) in order for the plasma to retain its collective long range electromagnetic effects and to be influenced by external field sources. The space charge effects in a plasma can be described by electron plasma frequency ($\omega_{pe}$). So a plasma satisfies the criterion:

$$\omega \tau > 1 \quad (1.5)$$

For a plasma with no externally applied magnetic field, the electron plasma frequency can be given by:

$$\omega_e = \sqrt{\frac{ne^2}{m_e \varepsilon_o}} \quad (1.6)$$

$$\text{or, } f_e = 8.98 \times 10^3 * \sqrt{n_e} \quad (1.7)$$

The large mass ratio between ions and electrons can suggest that the electrons are more mobile than the ions assuming all other conditions are the same. This may be seen in Eq. (1.6) if the mass of the electron is replaced by the mass of the ion. The electron plasma frequency can be much larger than the ion plasma frequency since $m_i/m_e \sim 1836$. When a voltage is applied between two electrodes containing a plasma medium in a thermodynamic equilibrium, the light free moving electrons near the electrodes can typically respond to the penetrating fields faster than the heavier, slow moving, ions since energy can be linearly proportional to the square of the speed and the mass of the charge. Sheath formation can result at both electrodes. At the anode, fast moving electrons can enter the sheath region at a greater rate compared to slow moving ions near a cathode. Further, the energetic electrons entering the sheath can gain energy in the sheath field and collide with the electrode plate. The energetic electrons have enough energy to overcome space charge effects at the anode giving rise to a higher loss of negative charge in the plasma. The same effect occurs at the cathode but the number of ions reaching the cathode sheath is lower because they move slower. Once equilibrium is attained, the plasma potential can be the most positive potential in a system [1].

This negative voltage difference in all sheaths can create a situation in which ions are accelerated to the sheath as they randomly arrive. They must arrive to the sheath with a certain amount of kinetic energy provided by the small potential that 'leaks' into the plasma. The criterion characterizing this effect is called the Bohm Criterion [1].

These properties of plasmas create rich behaviors that are still not completely understood, but which can be used in many applications. Indeed, plasmas are used to conduct large currents [4], to reflect electromagnetic waves [5], and are even used as antennas to transmit RF signals [6].

A DC discharge is not an ideal plasma, although it does have regions that approach the plasma model [1]. These discharges have regions of weakly ionized gases and they are sustained by a DC electric field [7]. A typical DC discharge experiment contains two uncoated metal electrodes separated by a specific distance and held at a certain pressure. After a high enough DC voltage is applied, breakdown occurs and current flows.

A DC discharge can have regions of weakly ionized gases and they can be sustained by a DC electric field. A DC discharge contains two electrodes separated by a specific distance and held at a certain pressure. After a high enough DC voltage is applied, breakdown can occur and current flows. A DC discharge can comprise a plurality of regions within each with their own kinetics and properties. The regions can be cathode layer(s), cathode dark space, negative glow, Faraday dark space, positive column, anode dark space, anode glow.

In an aspect, the positive column, the negative glow and the cathode dark space, positive column can be considered. As the electrode separation decreases, so does the Faraday dark space and positive column until they are no longer present. As an example, a parallel plate DC discharge studied by Ball contained only two primary regions: the cathode dark space and negative glow [8].

In an aspect, in the cathode dark space, no visible light is present in a cathode sheath. Thus, the processes that occur in the cathode dark space cannot be expected to give rise to significant ionization [1]. It is noted that photon generation is a consequence of de-excitation and recombination which occurs in regions with sufficient excitation and ionization.

A large potential difference occurs across this region. This potential causes ions that happen to reach the sheath interface (after the necessary Bohm acceleration) to be accelerated to the cathode. These ions are not expected to create much ionization; they can emit a significant number of secondary electrons after they strike the target [1].

These electrons can be accelerated into the plasma and end up with kinetic energies equal to the sheath voltage drop. Experimentally it has been determined that there can be little spread in these emitted electrons' kinetic energy at the sheath-to-glow edge. These results can imply that electrons are accelerated fully without significant collisions, which would use up kinetic energy and create a wider distribution of electron energy. This can also support the assumption that significant ionization does not occur in this region. These high speed electrons can continue to travel into the glow region [1].

The sheath length in this region can be much larger than Debye length estimates. This can be due to the semi-permanent nature of the negatively charged cathode. In the development of the Debye length, ions can be modeled as motionless since they are significantly heavier than electrons. However, this DC voltage in the sheath can give ions ample time to bunch up against the cathode, creating a large 'space charge limited current region' absent of electrons (except for fast secondary electrons) [1].

In an aspect, the cathode region then can be separated into three regions.

A first region can be a pre-sheath region, where electrons can be nearly equal to ions but ions can be accelerated to the sheath region, in order to reach the velocities imposed by the Bohm criterion. A second region can be a Debye region, exists where electrons concentration can diminish quickly. A third region can be a space charge limited current region.

In an aspect, the anode region at the end of the positive column. Although the anode is held at a positive voltage with respect to the cathode, it is not the most positive voltage in the system. This can occur as a natural result of the limited number of electrons in the plasma and their more mobile nature (relative lower mass and higher thermal speed). Therefore, electrons can be repelled in both sheath regions, near the cathode and near the anode.

In an aspect, voltage drop in the anode sheath can be small, so ion bunching does not occur at the electrode. Also, electrons with enough energy can make it through the sheath. Consequently, only a pre-sheath and Debye region can appear to exist. Hence, the anode sheath can be small. The anode can be struck with ions, photons and electrons with various energies, and so the secondary electron emission is high, which provides energy and electrons to the glow region [1].

The negative glow region near the cathode (negative electrode) contains an ionized gas region similar to that of an ideal plasma. Though, differences exist. First, this region can be very anisotropic due to the fast electrons that are accelerated into the glow by secondary electron emission at the cathode. Also, there can be a very small electric field within the negative glow [1].

There can be three energy regimes of electrons within the negative glow region. First, primary electrons can be high energy electrons provided by the cathode sheath. These can be the secondary electrons emitted from the cathode. Second, secondary electrons can be produced from recent ionizing collisions resulting in a partial loss of primary electron's energy. Such electrons can be secondary electrons generated at the anode since the anode sheath voltage is orders of magnitude smaller than that across the cathode sheath. Third, ultimate electrons can be thermalized to the plasma temperature and are the most common of the three electron constituents [1].

The highly energetic primary electrons can have a high probability of not suffering an ionizing collision upon passing through the negative glow region, reaching subsequent regions with enough energy to overcome the potential hills in the discharge. As the energy of an electron increases from a threshold value, ionizing cross-section increases, which can mean an increase in the probability of ionization. After a certain energy (typically between ones eV and tens eV), however, the cross-section decreases with increasing energy. This is the reason energetic primary electrons can make it easily through the glow with a low probability of performing an ionizing collision. A small percentage of primary electrons can ionize. Plus, primary electrons generate secondary electron emission at the anode. Primary electrons are directional and generally move quickly from the cathode towards the anode [1].

Thermal electrons can have average energies below minimum energy required to ionize a gas molecule, can contribute ionization. Others characterize the energy distribution of these electrons with a Maxwell-Boltzmann energy distribution. The electrons at the tail end of the distribution have enough energy to ionize. Plus, ionization can occur in a two-step process. First neutrals can be excited, which can require less energy than a single step ionization), then it can be a small step to ionization. Thus, thermal electrons can contribute to all or almost all of the ionization needed to sustain a glow [1].

In an aspect, energy can be provided to glow to sustain ionization. As an example, a slight voltage difference across the glow can be provided. In another aspect, energy can be provided from plasma waves in the primary electron flow. Velocity modulation and space charge bunches occur in the glow as primary electrons move from cathode to anode. These plasma waves can trap electrons with the right velocity and direction much like a surfer catches a wave under the right conditions. So these waves can be another explanation for necessary heating of thermal electrons [1].

After passing the negative glow region, a dark region can be encountered called the Faraday dark space. Beyond the dark region is a luminous region known as the positive column [1, 9, 10]. Further on, the glow discharge may have anode glow and dark space regions, but it may not [9, 10]. In many discharges, the positive column fills the gap from the end of the Faraday dark space to a small localized region just before the anode.

If the electrodes of the discharge tube can be brought inwards, length of the negative glow and cathode dark space can be unaltered while positive column decreases in length until it disappears completely [1, 9-11]. This can imply that the positive column may not be necessary for the maintenance of the discharge, but can serve as a path for current to flow [10]. In an aspect, the positive column can have the following properties:

1. The gas temperature of the column can be low, and thus the conductance of this region (conductance provided by the concentration of positive ions and electrons) cannot be maintained by thermal ionization.
2. The column can be an 'ideal' plasma, having equal parts electrons and ions. These species can have a Maxwellian velocity distribution.
3. The temperature of the ions can be slightly larger than the temperature of the gas, while the temperature of the electrons is significantly higher than both the ions and neutrals.

Most positive column theories can take three effects into account: ionization, diffusion, and recombination. One major classical theory was described by Schottky who laid out a theory of the positive column that predicts macroscopic parameters such as the temperature of electrons, axial electric field strength, plasma density at the axis ($n_0$), and the radial distribution of the plasma [9-11]. This theory uses many simplifying assumptions such as [9]:

In an aspect, ionization can occur by single electron-neutral collisions. Charges can be lost by ambipolar diffusion to the walls, where the charges can be recombined.

In an aspect, volume recombination is neglected. The radial distribution of charge after Schottky's analysis is a zero order Bessel function of first kind [11]

$$n_r = n_0 J_0\left(\frac{2.405 r}{R}\right) \quad (1.8)$$

where R is the radius of the tube and 2.405 is the first zero of the Bessel function (since density cannot be negative). So, the plasma density in the positive column is not radially uniform, but rather is a maximum at the center of the tube and decreases as it extends out to the walls.

This theory can be inaccurate under certain operating conditions. One phenomenon that cannot be explained by Schottky's theory is described by von Engel and many others. It is the contraction of the positive column at high pressures [9, 13-26]. Von Engel describes the observation as such: when the pressure in a discharge tube is increased for a specific current, then the positive column (or the visible light) no longer extends all the way to the walls and it becomes slowly contained in the central region of the tube [9].

Von Engel admits that the mechanism of constriction is unclear, but he does give his prediction that at higher pressures the volume recombination rate becomes larger than the ambipolar diffusion rate to the walls and electron temperature is higher at the axis, causing a net ionization at the center of the tube and a net recombination away from the center. This would effectively contain the charges near the axis [9].

Figure 1B:
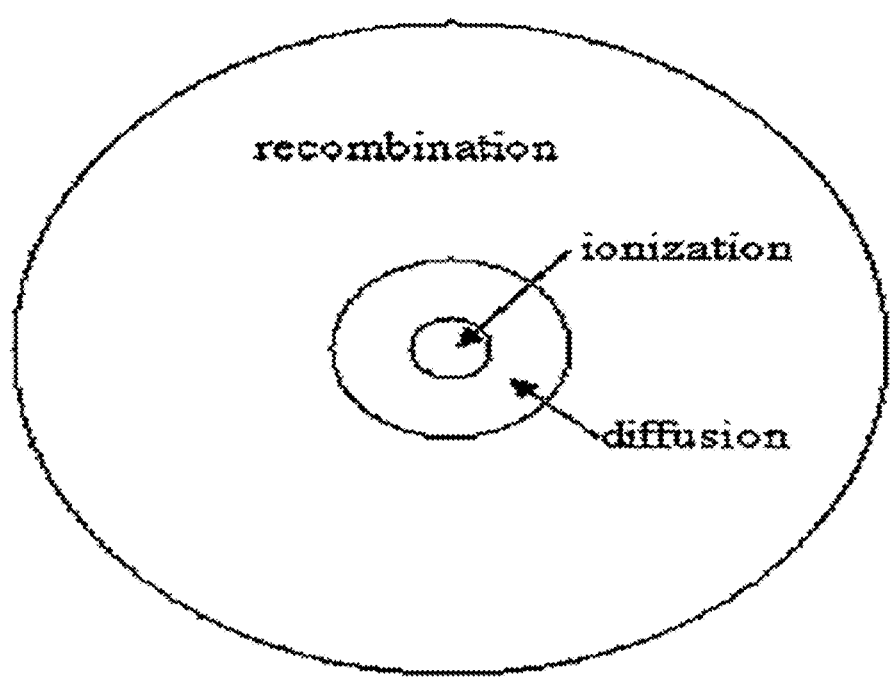
FIG. 1B illustrates ionization, diffusion, recombination theory of positive column constriction.

A review of this phenomenon was given by Yu. B. Golubovskii et al [16]. He chronicles experimental and theoretical work performed on contracted positive column. This is similar to what has been observed in the experiments, but with important differences. By generalizing Schottky's methods, researchers have developed theories to explain the constricted glow discharge. The balance of charged particles can be given by:

$$D_a \Delta n + I(n,T) - \Gamma(n,T) = 0 \quad (1.9)$$

where $D_a$ is the ambipolar diffusion coefficient, I is the rate of ionization and $\Gamma$ is the rate of recombination. Schottky simplified Eq. (1.9) by neglecting recombination and assuming ionization is a linear function of electron density. In these simplifications the Bessel distribution is obtained and constriction cannot be explained. However, if one looks at the ionization and recombination terms more carefully the picture changes. If ionization grows more rapidly with increasing concentration than the recombination does, and the ionization has a steeper radial drop, then constriction becomes possible. The column would then be confined to a region near the axis as shown in FIG. 1B.

It is therefore necessary to look at the elementary processes in the plasma that cause ionization and recombination. The author concludes that the electron-electron collisions in the calculation of ionization rates are extremely important and cause a non-linear dependence on electron density. Also, at low pressures volume recombination does not play a significant role, but at higher pressures and currents volume recombination prevents diffusion to the walls and causes a change from the diffuse glow to the contracted glow. Experiment also shows that non-homogenous heating does not play a significant role in the contraction of certain gases, such as neon and argon, but it is the main mechanism in others, such as helium [16].

Extra anecdotal evidence of the constriction of glow discharges can be found in [27] and [28]. Miao et al showed significant constriction in a hemisphere-to-water DC discharge as current increases beyond the breakdown current [27]. Hayakawa et al performed a needle-to-plane DC discharge at various pressures. The experiment was performed to the right of the minimum of the Paschen curve (a curve relating the breakdown voltage to the pressure and distance between electrodes). They found that as pressure increases, the area of discharge decreases [28].

The theories presented in the above papers seem to suffice for the conditions listed in their experiments. The most important difference between the discharge presented in this disclosure and the experiments described in the sources above is the presence of a highly energetic beam that can penetrate (or rather, has a good probability of penetrating) through the entire discharge. Due to high breakdown voltages, the secondary electron beam emitted at the cathode is expected to penetrate past the negative glow region and through the discharge completely. Further, experiments not conducted under equilibrium conditions can be based on transient discharge conditions in either single or multi-pulsed mode.

The theories reviewed by Golubovskii are purely DC glow discharges, and therefore they have a low voltage across the cathode dark space. This is important because it means that the electron beam (secondary electrons) emitted at the cathode can have an extremely high collisional cross section, and thus it is less likely the beam can penetrate past the negative glow region. Thus, they are allowed to treat the plasma in a very simplified way; a way that allows Eq. (1.9) to be used.

The inherent assumptions leading to Eq. (1.9) may be uncovered using theories developed by Bittencourt. The following is a paraphrasing of his work found in [3]. For a mostly uniform electron density with ideal gas characteris tics, the momentum equation can be reduced to a first order equation, and then linearized to obtain:

$$n_0 \frac{\partial}{\partial t} \vec{u}_e = -\frac{kT_e}{m_e} \vec{\nabla} n'_e - n_0 \nu_c \vec{u}_e \quad (1.10)$$

where $\nu_c$ is the collision frequency of the electrons and $\vec{\nabla} n'_e$ is a consequence of pressure gradient forces. Assuming equilibrium, the inertial force on the electron fluid specie is zero yielding $$n_0 \nu_c \vec{u}_e = -\frac{kT_e}{m_e} \vec{\nabla} n'_e \quad (1.11)$$

and $$\vec{\Gamma}_e = -D_e \nabla n'_e \quad (1.12)$$

where $D_e = \frac{kT_e}{m_e \nu_c}$ is the classical electron diffusion coefficient and $\vec{\Gamma}_e$ is the linearized electron flux due to pressure effects. Eq. (1.12) is known as Fick's law. (Note that Bittencourt's $\vec{\Gamma}_e$ is not the same as Golubovskii's recombination rate $\Gamma(n, T)$, but rather it is the term on the far left in Eq. (1.9)). This equation states that equilibrium between collisions and pressure forces has been achieved.

Eq. (1.9) and the theories that rely on it cannot be used when the effects of a highly energetic electron beam need to be considered. For one, the introduction of this third species can create a charge imbalance which is not included in the equation. Plus, the charge imbalance creates a strong non-equilibrium condition. Equilibrium can eventually ensue, but it cannot be assumed right at the onset as Eq. (1.9) does. If the electron beam emitted at the cathode reaches the anode with high energy, then pressure forces (diffusion) and collisions may not be the dominant interaction (or coupling effect) between the plasma and the beam. If the electron beam emitted at the cathode reaches the anode with high energy, then collisions are only a small decelerating effect. Further, because of its electrical nature and its transient nature, the electron beam cannot be assumed to be in equilibrium with collision forces and Eq. (1.9) cannot be used on the beam.

Instead, beam dynamics should be used in unison with plasma fluid models. Charge expulsion, ion channel formation, and magnetic forces should be the dominant roles considered. Collision and pressure equilibrium models (Eq. (1.9)) do not suffice as the central role. Rather, the effects of collisions should be added in at a later point as a small effect.

This disclosure deals with a completely different phenomenon than that of Golubovskii. Small parameter changes give vastly different results. The conditions presented here are much different than the conditions listed in the cited papers. Therefore one should expect that the physics are vastly different. Thus, this effort starts from the fluid equations from which the diffusion model is derived.

Pinch Mechanism—If the secondary electron beam is central in the role of constriction, then the pinch effect, or in other words the self-magnetic forces should be considered. One important feature of some laboratory plasmas is the existence of a pinch. When quick moving, highly directional electrons flow in a plasma, they can create an effect called a z-pinch. Current flowing along the axis of the cylinder (z-axis) induces a magnetic field in the θ direction. This field together with the cylinder of current produces a pinching force directed radial inwards. This force is balanced with a kinetic pressure gradient force directed outwards in steady-state [29]. As Freidberg puts it, "If one thinks of the magnetic field lines as rubber bands surrounding a column of plasma, the tension force is then obvious [30]."

Since a glow discharge has quick moving, highly directional electrons emitted from the cathode, one might expect the glow discharge to exhibit z-pinch properties. Thus, the constriction of the glow discharge that we see in experiment might be explained by this effect. However, as can be shown, the mechanism is more complex than this and that electron expulsion and ion channels must be included in the model.

Glow to Arc Transition

Figure 1C:
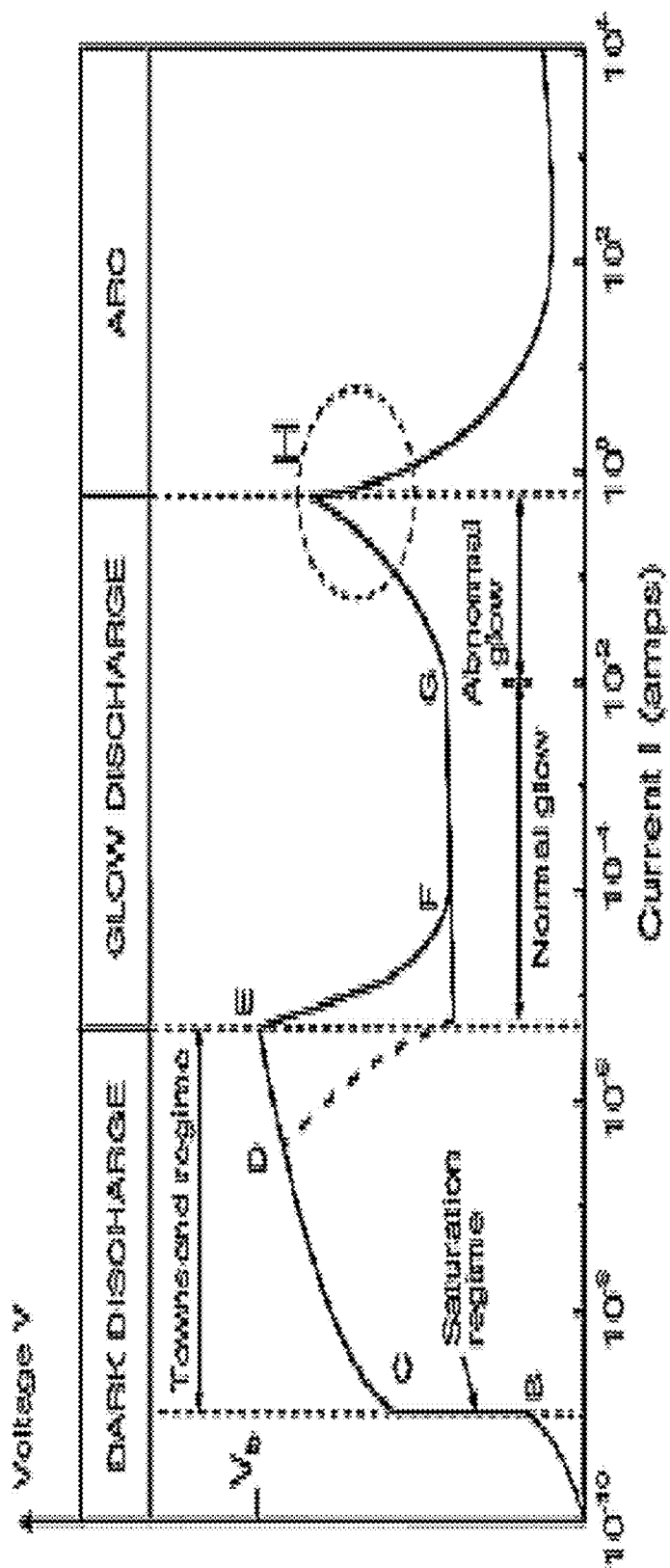
FIG. 1C illustrates voltage-current characteristics of an electrical discharge tube in DC mode.
Figure 1D:
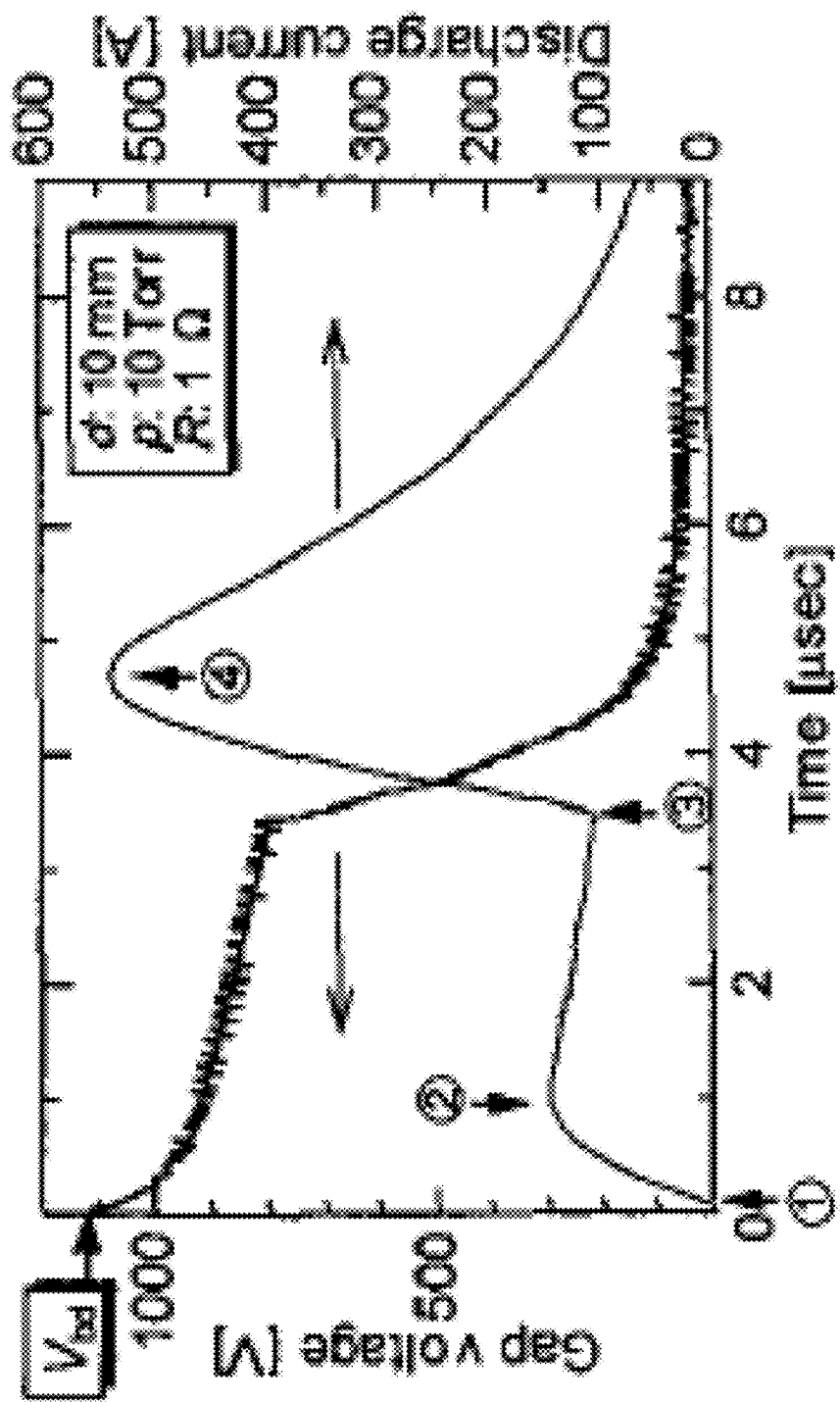
FIG. 1D illustrates transient electrical discharge.

It is found and reported herein that increasing ambient pressure gives rise to constriction. One danger of increasing pressure and current in order to pinch a glow discharge is the increased possibility of an arc discharge. In an aspect, if the pressure x gap length (pd) surpasses 100 Torr*cm in a DC discharge it inevitably leads to an 'explosive glow-to-arc' discharge, if enough energy can be provided by the external circuit. In such cases, the amount of current can grow without bounds until it is limited by the source [31] or space charge effects within the discharge. Thus an increase in pressure can cause an increase in the occurrence of 'explosive' arcs as in FIG. 1C. This phenomenon can be prevented by limiting the current provided by the source. As shown in the I-V curve above, if voltage of the source is held constant and current is allowed to grow without restriction, the glow discharge can eventually transition to an arc [31]. The unrestricted DC breakdown is illustrated by Takaki, et al. in FIG. 1D. The glow discharge is shown at point 2. The transition from glow to arc begins at point 3 and the arc is at full power at point 4. In an aspect, arc can occur at pd=10 Torr*cm, which can be below the limit of 100 Torr*cm. Experiments were performed on current limited pulsed, nearly DC discharges using a ballast damping resistor. When the resistance exceeded 18Ω (corresponding to a peak glow current of 10 A at 10 Torr*cm) arcs did not occur [32].

In an aspect, an increase in pressure can increase the pinch effect, but can also cause a glow discharge to transition to an arc. The glow discharge is relatively gentle on the cathode, but the arc can be very harmful and cause deep pits in the cathode. As such, it is more desirable to operate in the glow mode. This increases the lifetime and longevity of the cathode.

One heavily researched property of a DC glow discharge is its interaction with microwaves. This property has been studied especially with applications to microwave steering, such as the steering of microwaves for radar systems [5, 33-38].

Figure 1E:
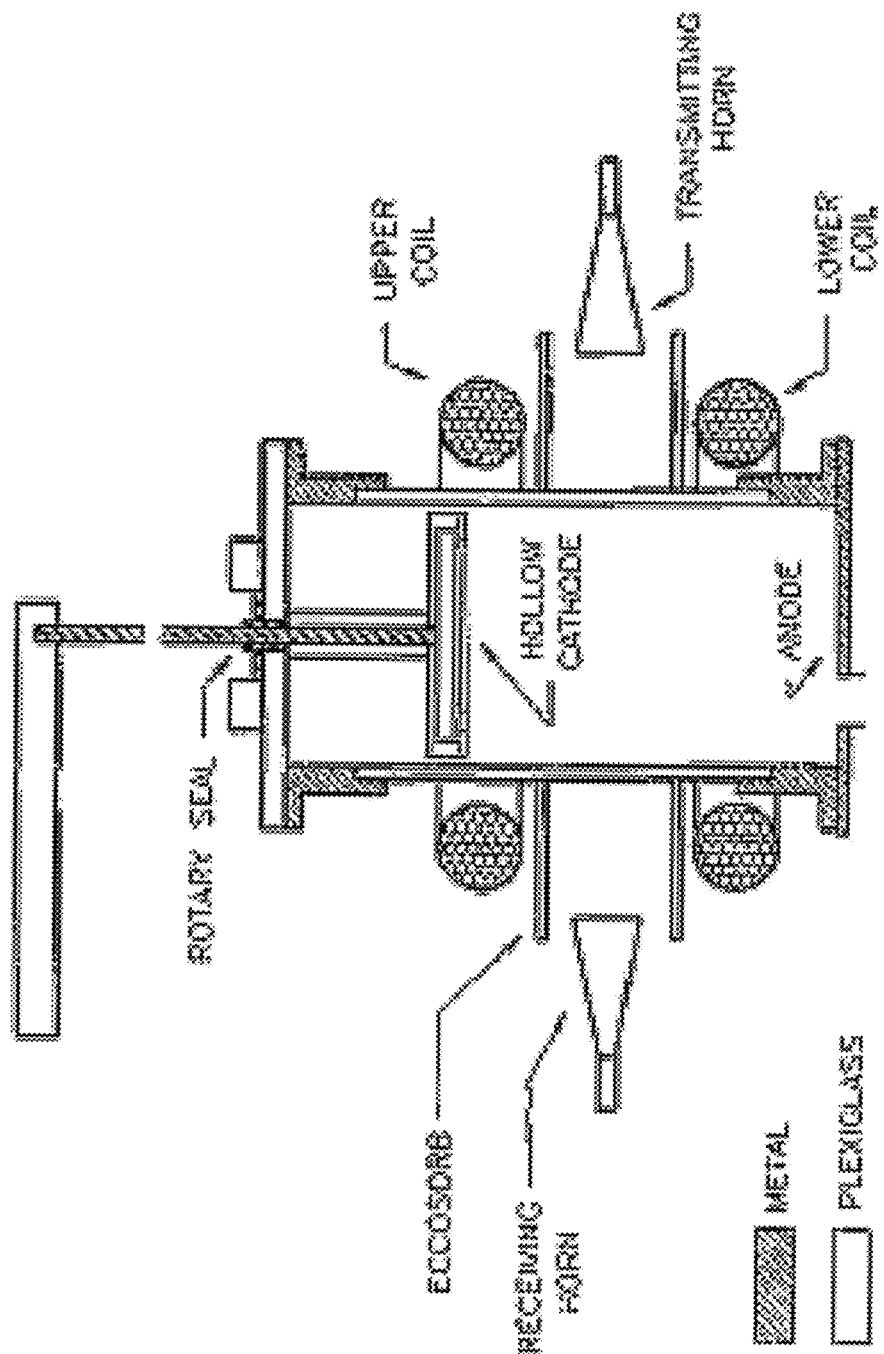
FIG. 1E is an experimental overview of a plasma reflector built by the Naval Research Laboratory.
Figure 1F:
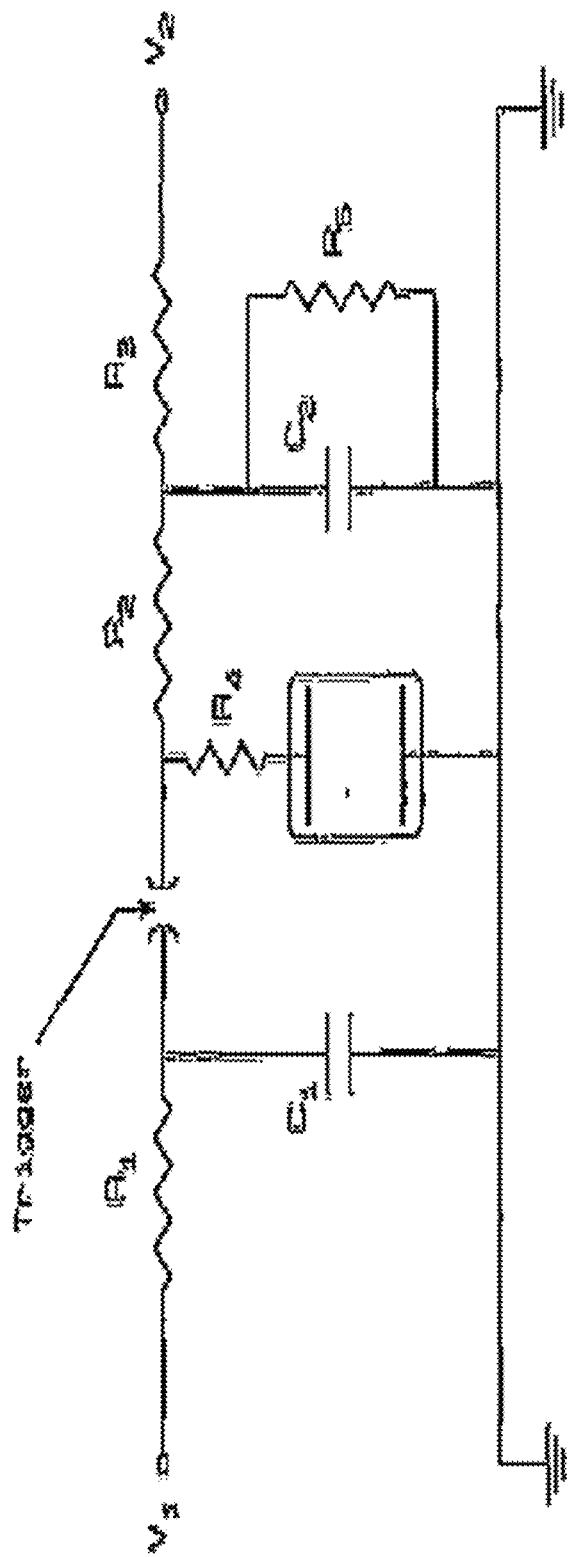
FIG. 1F illustrates electrical schematic of the Naval Research Laboratory plasma reflector.
Figure 1G:
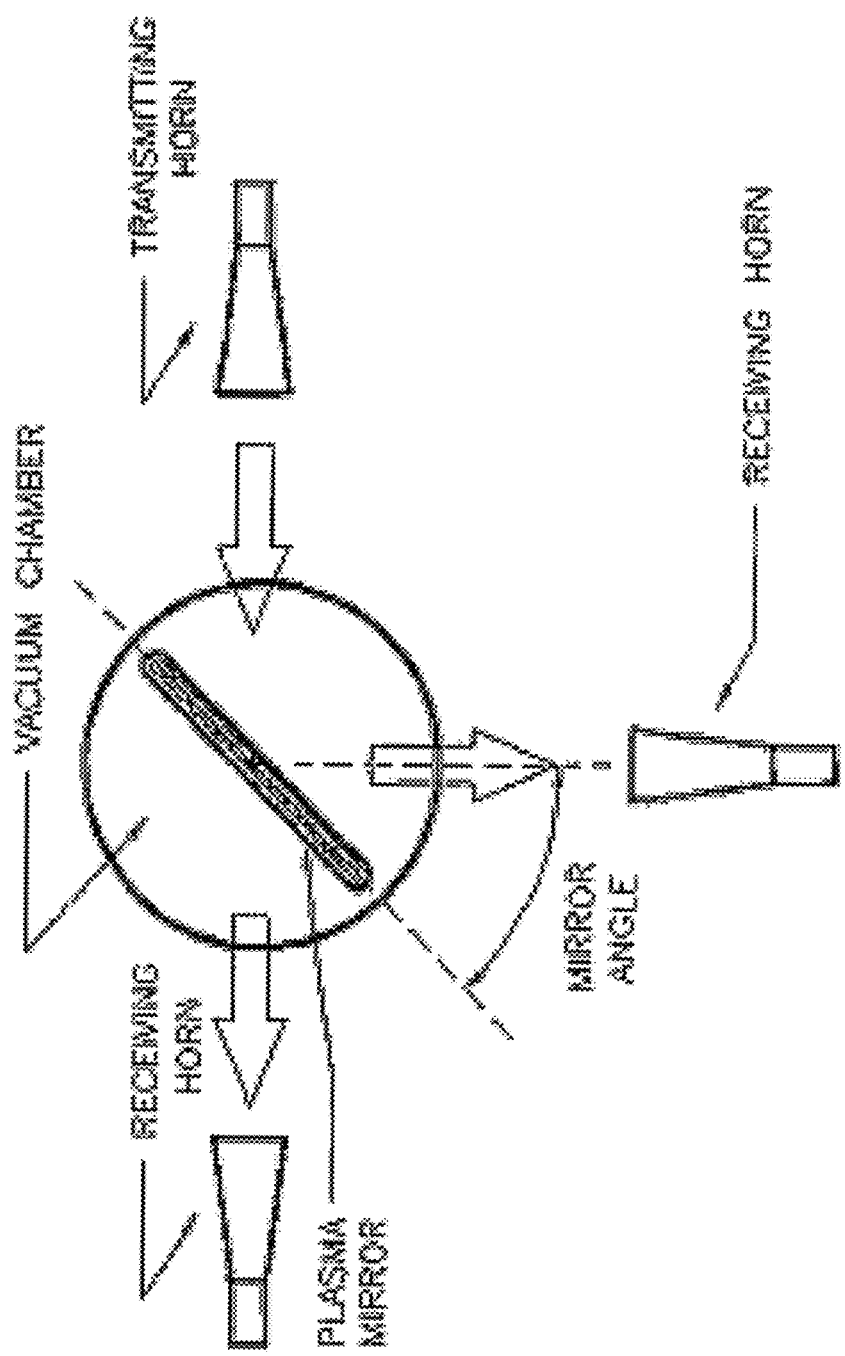
FIG. 1G illustrates a plasma reflector being used to steer and direct electromagnetic energy.

Ongoing research in this area has been performed in the Plasma Physics Division of the Naval Research Laboratory. One example of the research is found in [5]. A summary of the experimental setup is shown in FIGS. 1E, 1F and 1G. The microwaves used in this experiment are low power at 10.5 GHz. The plasma frequency, given by Eq. (1.6) and Eq. (1.7) must be greater than the frequency of these waves. Therefore, the electron density, $n_e$, must be greater than $1.4 \times 10^{12} \#/cm^3$ from Eq. (1.7). The planar sheet glow discharge is sustained with a low current provided by $V_2$. The currents required for $n_e > 1.4 \times 10^{12}$ are provided by the charged capacitor $C_1$ and a spark gap trigger. Pressures above 300 mTorr were avoided because the electron collision rate and hence absorption is not negligible in this frequency range.

Figure 1H:
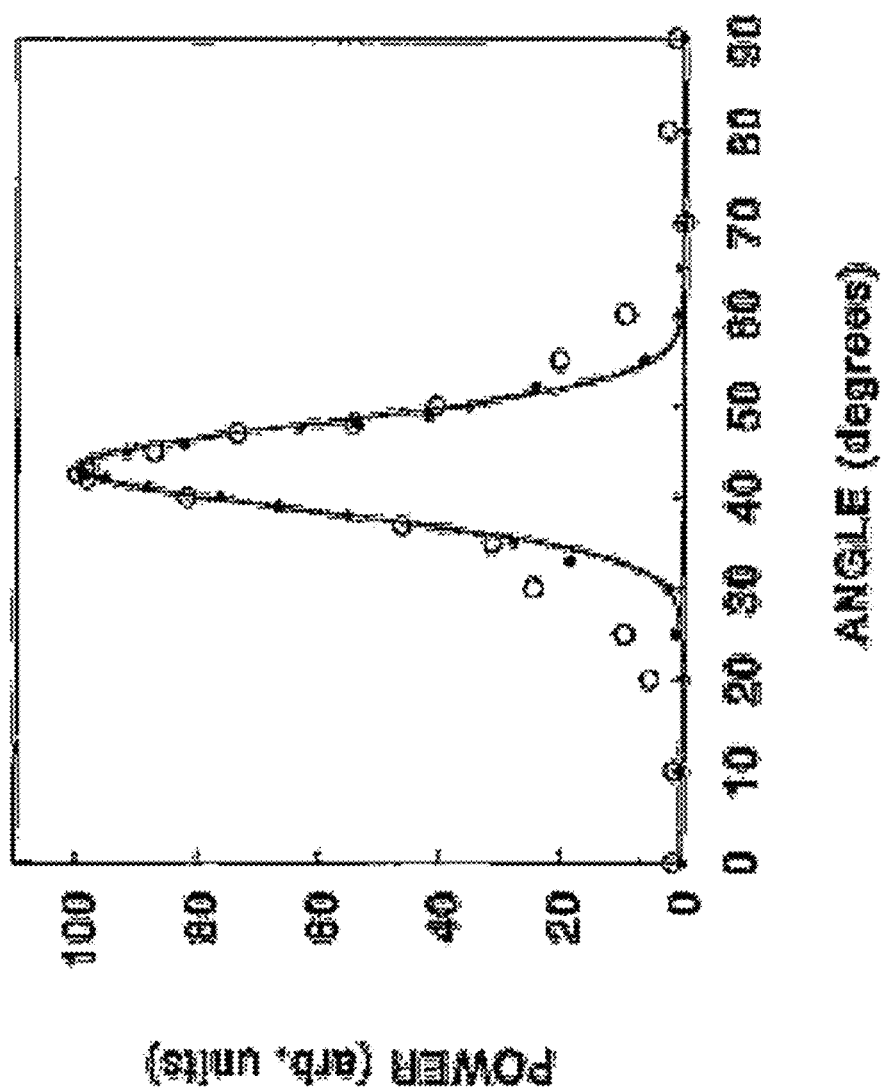
FIG. 1H illustrates steering properties of the plasma reflector are similar to that of a metal conductor.

Robson et. al showed that this plasma mirror, under the right conditions, reflects microwaves in the X-band similar to a metal plate. See FIG. 1H. Other types of discharges have been studied as possible microwave steering devices, such as an optically generated plasma [36].

Plasma Disrupter Device

In many cases, the disruption of microwaves through either reflection or absorption is desired. Woo and DeGroot showed that high power microwaves in air can cause breakdown and generate a plasma when the field strength is above a threshold value [39]. This can, in turn, either reflect or attenuate the incoming microwaves preventing transmission. The breakdown field required is given by:

$$E_{rms} \sim 32(p_{Torr}^2 + 2f_{GHz}^2)^{1/2} \quad (1.13)$$

Figure 1I:
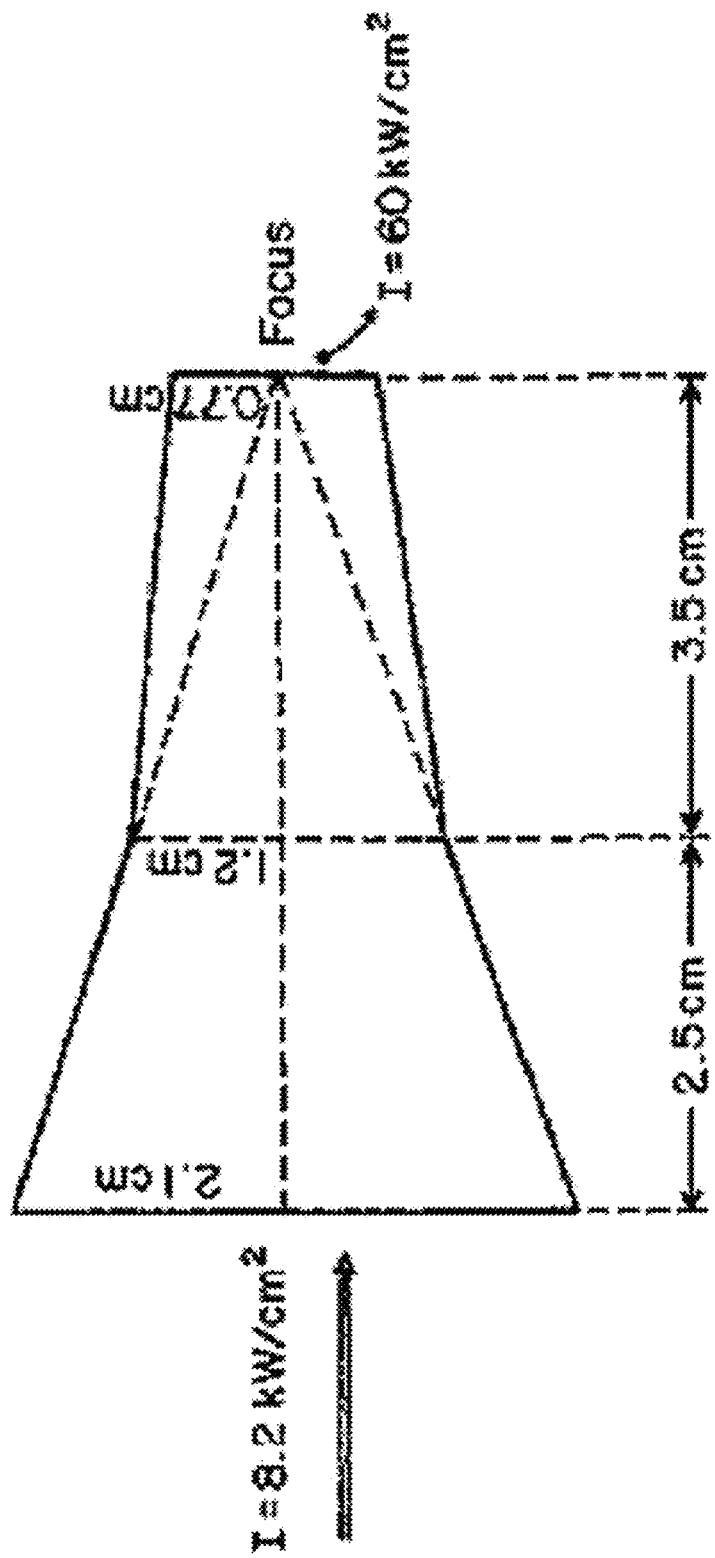
FIG. 1I illustrates a lens used to focus microwave power to a small point, thereby inducing breakdown.

At higher pressures absorption is dominant and increases with microwave power. At low pressures reflection is dominant. Either way, transmission of microwave power is decreased significantly when breakdown occurs. A focusing lens system can allow breakdown to occur even when incoming waves are below threshold (see FIG. 1I).

Counter Measure Against Electronic Attack

With the current development of high power microwave weapons and the threat of electromagnetic pulse (EMP) bombs, defense against these forms of warfare is an important study. High power microwaves can destroy solid state devices putting computers and electronic devices out of commission. Enclosing a device in a thick metal case can protect it from incoming waves in what is known as a Faraday Box. However, this option is not always available. Many devices must transmit EM waves and so must have some pathway for energy to go in and out of the shielded box. In many devices this pathway is a waveguide horn or an electrical power cord. This creates a vulnerability to electromagnetic attack.

Since it has been established that plasma and DC discharges in particular can be used to reflect electromagnetic energy, this effect can be used to shield and protect from electromagnetic attack. When energy entering the device through a waveguide or other electrical pathways exceeds a threshold value, the plasma can ignite and energy can be reflected or scattered away from or attenuated before it can reach the electrical circuit being protected. As seen in [39], this threshold is much too high for any practical shielding purposes. However, if this breakdown threshold can be brought down by adding a DC bias (DC discharge in Townsend mode) and by adjusting pressure, this solution suddenly becomes practical. Other parameters in the DC discharge can also be adjusted (such as current limit) in order to manipulate the amount of energy reflected and attenuated.

Constricted Glow Discharge

DC discharge, electrical arcing, lightning, and other processes both natural and man-made results in some sort of directed glow along an irregular column in space. This light is a consequence of recombination or de-excitation processes which are typically a by-product of a plasma glow discharge. In experiments and in nature, the center of the irregular column appears to be more luminous as compared to other parts of the column. This tends to imply that the central portion of the column has a larger plasma density or ionized discharge gas density. Further, the column appears to be stable over the time duration of the phenomena. This may imply that high currents generating magnetic fields tend to apply a magnetic pressure on the discharge thereby containing the discharge. It is not difficult to demonstrate that internal space charge effects tend to dominate over magnetic pressure effects in an isolated charged fluid of single specie moving with uniform drift velocity. If on the other hand, the energetic beam of electrons repel the cool thermal electron gas without significantly being affected by space charge effects, then the background ions can through Coulomb effects tend to counter and stabilize the internal space charge effects of the single charge species beam. This allows for the weak self-magnetic field from the beam to pinch the beam electrons and stabilize the pinch as long as the supply of energetic beam electrons is not degraded. Although not complete, this mechanism is commonly called electron channeling.

The propagation of charged beams transported through neutral gas or plasma has been studied in detail by many researchers. Often, the charged beam can propagate through the gas or plasma in a pinched mode [40-42] instead of breaking up as one would expect from like-charge coulomb driven particles. A common theory used to explain this phenomenon is such: When an electron beam enters a gas (or plasma) it ionizes this gas and ejects the light electrons. This neutralizes the beam's space charge and the electron beam can then constrict and propagate due its own magnetic forces; no external magnets are needed [40-48].

Researchers often ignore the transient nature of the problem and assume that plasma electrons are expelled instantaneously, or they use similar assumption for simplicity [40, 41, 43, 44, 47, 49]. The dynamics of the expulsion of plasma electrons is not often studied in detail. The neutralization time is sometimes estimated using a collision dominated model, but this is done under linearized assumptions [41, 50]. A complete transient model that retains non-linear terms is not readily available in literature. As such, the non-linear dynamic problem of plasma electron expulsion by an electron beam is addressed analytically under a variety of special conditions.

Since glow discharges under certain conditions show pinched propagation from cathode to anode, the mechanism described above may be the best explanation for this pinched mode. Bennett [51] discussed the feasibility of applying this specific magnetic confinement theory to glow discharges. He uses it to help explain breakdown phenomena by applying these principles to describe the formation of a pinched ion channel that is sufficiently dense to initiate emission at the cathode (initiate breakdown). However, Bennett does not consider the possibility of the secondary electron beam emitted at the cathode as being the focusing stimulus. He assumes that the transverse energy of the electrons is too great due to craters on the cathode, or collisions significantly affect the electron beam destroying its self-focusing properties. [51]. Since experiments suggest that self-pinching effects of the glow or positive plasma column region of the discharge tube under transient conditions exists at poor vacuum pressures (1 to 20 Torr), a mechanism to describe the pinch effect is sought.

Under rather rigid conditions based on physics, analytical solutions to the nonlinear, cold plasma, fluid equations describe the initial stages of electron channeling characterizing the dynamic behavior of the density of the background electron after beam introduction. The equilibrium time for the system to reach its lowest energy state namely quasi-neutrality due to Coulomb space charge effects is computed. The quasi-neutrality relaxation time is much longer that the threshold relaxation time for pinch initiation where Coulomb space charge effects are balanced by self-magnetic field effects. Pinch conditions and times are dependent upon beam velocity and the ratio of beam density to background plasma density. Normalized curves are developed identifying the parameter space leading to a pinched glow discharge.

Electron Expulsion and Electron Channeling Model

Model Description and Approximations

The plasma is assumed to be composed of three interpenetrating charged gas species: ion fluid and two electron fluids with significantly different initial states. It is hypothesized that the secondary electrons emitted from the cathode sustain the negative glow and plasma columns and stabilizes the glow in part with its self-magnetic fields. Part of the secondary electron population fuels ionization and excitation thereby sustaining the glow and in part becomes a part of the thermal electron population. The remainder of the secondary electrons suffers few collisions thereby retaining most of its energy and momentum. This group of electrons is in part responsible for the self-focusing effect of the negative glow region and the plasma column. The ion species is assumed massive enough under the time frame of the experiment such that its sluggish motion may be assumed nearly zero. A cool thermal electron fluid of nearly the same initial density of the ion fluid is assumed to have a zero initial drift velocity. Since this electron fluid and the ion fluid are cool, their thermal effects are neglected. An energetic electron fluid with uniform density is injected in the plasma medium. This beam is the conglomeration of the secondary electrons emitted from the cathode and accelerated through the cathode dark space region. Over the duration of the experiment, it is assumed:

The beam electrons can be energetic that the divergence of the electron beam due to space charge effects in the plasma medium are negligible over the duration of the experiment within the overall length of the plasma discharge; The electron beam can be cold and drifts with nearly constant velocity along the length of the plasma medium assumed to be the z-direction; Thermal effects among the cool thermal electrons and ions are neglected yet the multiple species gas has enough "thermal energy" to minimize recombination over the time of the experiment; Further, the injected electron beam can be a continuous source of energetic charge.

A beam drift velocity to be along the positive z-axis where the z-axis is centrally located within the plasma can be chosen. In order to neglect end and fringe effects, it is assumed that the plasma uniformly extends to infinity in the radial and z-directions. This implies that the plasma density is independent of the angle of azimuth in a cylindrical coordinate system. Let a be the radius of the electron beam. Since the plasma medium with injected electron beam can be assumed to be uniform initially at least over the electron beam cross section, the electric field generated by the non-neutral gas can have a radial component. Consequently, cool thermal electrons can experience a repulsive radial force due to the presence of the energetic electron beam. Because the electron beam continuously supplies energetic electrons as the cool thermal electrons are being repelled out of the beam's cross section, the energetic electron beam does not exhibit a net radial change in cross section and hence no change in radial velocity. An equilibrium point can arise where the net Coulomb force due to the stationary ions cancels the space charge forces of the electron beam resulting in an equilibrium situation based on the physics contained in this model. In reality, as equilibrium among space charge effects result, the magnetic field of the electron beam becomes significant and allows for the pinching of the electron beam.

Under the definitions and constraints listed above, the governing relations for the $j^{th}$ species are $$\frac{\partial n_j}{\partial t} + \vec{\nabla} \cdot [n_j \vec{v}_j] = 0 \tag{2.1}$$

$$m_j n_j \frac{d\vec{v}_j}{dt} = n_j q_j E_r \hat{r} \tag{2.2}$$

$$\oiint_S \vec{E} \varepsilon_o \cdot d\vec{S} = \int\int\int_V [q_b n_b + q_i n_i + q_e n_e(\vec{r}, t)] dV \tag{2.3}$$

where, independently, j=b, i, and e representing the beam electron fluid, cool thermal ion fluid, and the cool electron fluid respectively; $\vec{E}$ is the resultant electric field in vacuum with permittivity of free space, $\varepsilon_o$. Here, $m_j$, $n_j$, $q_j$, and $\vec{v}_j$ are respectively the mass, number density, the charge, and average fluid velocity of the jth species.

It follows from the initial conditions on the plasma medium with injection beam that: from quasi-neutrality, $n_{i0} \approx n_{e0} \approx n_0$, the cold plasma has no beam drift velocity, $\vec{v}_i = 0$, and $\vec{v}_e = 0$, and cold energetic electron beam velocity is $v_{rb} = 0$, and $v_{zb} = v_{z0}$. Here, the secondary electrons which generated the cool thermal plasma are neglected only for simplicity. From neglect of end effects implying that there is no longitudinal electric field, the cool thermal electrons only exhibit radial motion due to a uniform charge imbalance and the heavy ions are assumed static. With the aid of the continuity equation Eq. (2.1), the cool thermal ion number density is constant. Further, from the steady state condition implying that the divergence of the electron beam current density is zero, the electron beam density is constant with time. As a result, a radial electric field can be generated resulting from space charge effects. The cool thermal electrons can in turn respond to the presence of this field finding a condition of minimum energy. With the aid of Gauss's law, Eq. (2.3), and the high degree of cylindrical symmetry, the space charge electric field can be determined $$E_r(\vec{r}, t) = \frac{e[n_i - n_b - n_e(t)]}{2\varepsilon_0} r \tag{2.4}$$

where the number density of the electron specie as a whole responds to the field uniformly with respect to space. Eq. (2.2) can also be cast into an energy conservation relation $$\frac{1}{2} m_e v_e^2 + q_e V = \varepsilon_{e0} \tag{2.5}$$

$$v_e^2(t = 0^-) = 0 \text{ and } n_b(t = 0^-) = 0 \tag{2.6}$$

$$\therefore \varepsilon_{e0} = 0$$

From Eq. (2.4) and the definition of potential, an explicit expression for the quasi-static voltage can be obtained.

$$V(\vec{r}, t) = \frac{-e[n_i - n_b - n_e(t)]}{4\varepsilon_0} r^2 \tag{2.7}$$

The following normalized definitions have been defined in a self-consistent manner for time $\tilde{t} = \omega_{pe} t$, background electron density $\tilde{n}_e(\tilde{t})=n_e(t)/n_{eo}$, background ion density $\tilde{n}_i=n_i/n_{eo}$, electron beam density $\tilde{n}_b=n_b/n_{eo}$, beam current $\tilde{I}=I[e\pi a^2 n_{eo} c]^{-1}$, voltage $\tilde{V}=eV[m_e c^2]^{-1}$, axial length $\tilde{l}=l\omega_{pe}/c$, velocity $\tilde{v}=v/c$, cylindrical radius $\tilde{r}=r/a$, and force $\tilde{F}=F[am_e\omega_{pe}^2]^{-1}$. Here $\omega_{pe}=[e^2 n_{eo}/\varepsilon_o m_e]^{1/2}$ is the electron plasma frequency, a is the initial radius of the electron beam, c is the speed of light, $m_e$ is the mass of an electron, $-e$ is the charge of an electron, and $\varepsilon_o$ is the permittivity of free space. Therefore, we can re-express Eq. (2.7) as $$\tilde{V}(\tilde{r},\tilde{t}) = \frac{-a^2\omega_{pe}^2[\tilde{n}_i - \tilde{n}_b - \tilde{n}_e(\tilde{t})]}{4c^2}\tilde{r}^2 \qquad (2.8)$$

making use of Eq. (2.8) and Eq. (2.5) and assuming that the initial energy of the cool thermal electron fluid is nearly zero, the radial velocity of the of the thermal electron fluid as a function of the electron fluid density is $$\tilde{v}_{re} = \tilde{r}\frac{\omega_{pe}a}{c\sqrt{2}}\sqrt{\tilde{n}_e(\tilde{t}) - \tilde{n}_i + \tilde{n}_b} \qquad (2.9)$$

For a uniformly distributed electron density, the continuity for the thermal electrons given by Eq. (2.1) along with Eq. (2.9) yields the internally self-consistent relation $$\frac{d\tilde{n}_e(\tilde{t})}{d\tilde{t}} + \sqrt{2}\,[\tilde{n}_e(\tilde{t}) - \tilde{n}_i + \tilde{n}_b]^{1/2}\tilde{n}_e(\tilde{t}) = 0 \qquad (2.10)$$

Solution of Differential Equation Using Perturbation Approaches

In an aspect, before the beam is introduced, due to quasi-neutrality, the background electron density should equal the background ion density. As t approaches infinity, the background electron density can decrease to zero if the ion density is lower than the beam density. This is because the imbalance in charge density can never be equalized and the electric force can continue to eject electrons until none are left. As t approaches infinity, the background electron density can decrease to the difference between the ion density and the beam density. This is because as soon as this point is reached, the charge imbalance in the system can no longer exist and the electric force can be equal zero. These results are summarized in Table 2.1 below.

TABLE 2.1

Initial and final conditions of the background electron density

|  | $n_b \geq n_i$ | $n_b \leq n_i$ |
| --- | --- | --- |
| t = 0 | $n_e = n_i$ | $n_e = n_i$ |
| t → ∞ | $n_e \to 0$ | $n_e \to n_i - n_b$ |

Case 1: $\tilde{n}_b=\tilde{n}_i$

Under the special case in which the initial energetic electron beam density equals the ion beam density, Eq. (2.10) leads to the normalized nonlinear cool thermal electron density $$\tilde{n}_e(\tilde{t}) = \frac{1}{\frac{1}{2}\tilde{t}^2 + \sqrt{2}\,\tilde{t} + 1} \qquad (2.11)$$

One may allow $n_{oe}\geq n_{oi}$ or $n_{eo}\geq n_{io}$.

Case 2:

$$\tilde{n}_b > \tilde{n}_i \frac{\tilde{n}_e(t)}{\tilde{n}_b - \tilde{n}_i} << 1$$

In this case it is assumed that $\tilde{n}_e(t)<<(\tilde{n}_b-\tilde{n}_i)$. Equation (2.10) leads to the normalized nonlinear cool thermal electron density is $$\tilde{n}_e(\tilde{t}) = \frac{2(\tilde{n}_b - \tilde{n}_i)e^{-\tilde{t}\sqrt{2(\tilde{n}_b-\tilde{n}_i)}}}{2(\tilde{n}_b - \tilde{n}_i) + 1 - e^{-\tilde{t}\sqrt{(\tilde{n}_b-\tilde{n}_i)}}} \qquad (2.12)$$

This expression is valid under the assumption that energetic beam electron density is much larger than twice the initial plasma density. The electron number density in Eq. (2.12) can be extended beyond the initial quasi-neutral state, that is $\tilde{n}_i\neq 1$.

Case 3: $\tilde{n}_i-0.5\tilde{n}_e(t)>>\tilde{n}_b$

Consider the approximation that $\tilde{n}_i-0.5\tilde{n}_e(t)>>\tilde{n}_b$. With the neglect of a nonlinear effect, Eq. (2.10) leads to the nonlinear cool thermal electron density $$\tilde{n}_e(\tilde{t}) = \tilde{n}_i - \tilde{n}_b + \frac{2\left[\sqrt{2(\tilde{n}_b+1-\tilde{n}_i)} - (\tilde{n}_i-\tilde{n}_b)\tilde{t}\right]^2}{\left[\sqrt{2(\tilde{n}_b+1-\tilde{n}_i)}\,\tilde{t} - \frac{1}{2}(\tilde{n}_i-\tilde{n}_b)\tilde{t}^2 + 2\right]^2} \qquad (2.13)$$

As time approaches zero, the density of the cool thermal charge equals the background ion density as required for quasi-neutrality. This relation is meaningful only over the time interval $0\leq\tilde{t}\leq\tilde{t}_{max3}$ where $$\tilde{t}_{max3} = \frac{\sqrt{2(\tilde{n}_b+1-\tilde{n}_i)}}{(\tilde{n}_i-\tilde{n}_b)} \qquad (2.14)$$

is the point in time where a minimum energy state is attained.

Case 4a: $\tilde{n}_i-0.5\tilde{n}_e(t)<<\tilde{n}_b$, $\tilde{n}_i>\tilde{n}_b$ Equation (2.10) may be simplified to yield the following normalized cool thermal electron density $$\tilde{n}_e(\tilde{t}) = (\tilde{n}_i - \tilde{n}_b) + \frac{(\tilde{n}_b+1-\tilde{n}_i)e^{-2\left[\frac{(\tilde{n}_i-\tilde{n}_b)}{4}\tilde{t}^2 + \frac{(\tilde{n}_i-\tilde{n}_b)}{\sqrt{2(\tilde{n}_b+1-\tilde{n}_i)}}\tilde{t}\right]}}{\left\{1+\sqrt{\frac{\pi(\tilde{n}_b+1-\tilde{n}_i)}{2(\tilde{n}_i-\tilde{n}_b)}}\,e^{\left[\frac{(\tilde{n}_i-\tilde{n}_b)}{2(\tilde{n}_b+1-\tilde{n}_i)}\right]}G(\tilde{t})\right\}^2} \qquad (2.15)$$

-continued $$G(\tilde{t}) = \left[ \text{erf}\left( \frac{\tilde{t}}{2}\sqrt{\tilde{n}_i - \tilde{n}_b} + \sqrt{\frac{(\tilde{n}_i - \tilde{n}_b)}{2(\tilde{n}_b + 1 - \tilde{n}_i)}} \right) - \text{erf}\left( \sqrt{\frac{(\tilde{n}_i - \tilde{n}_b)}{2(\tilde{n}_b + 1 - \tilde{n}_i)}} \right) \right] \quad (2.16)$$

At the initial point in time, the quasi-neutrality among thermal charge species is satisfied. The theory is valid for $0 < \tilde{t} < \tilde{t}_{max4a}$ where $$\tilde{t}_{max4a} = \frac{1}{z_o \tilde{A}}\left[\frac{z_o}{z(t_{max4a})} - 1\right] = \sqrt{\frac{2}{(\tilde{n}_b + 1 - \tilde{n}_i)}}\left[\sqrt{\frac{\tilde{n}_b + 1 - \tilde{n}_i}{\tilde{n}_i - \tilde{n}_b}} - 1\right] \quad (2.17)$$

for the equilibrium condition to be satisfied. Consequently, for $0 < \tilde{t} < \tilde{t}_{max\ 4a}$, the condition $\tilde{n}_i \geq \tilde{n}_e(t) > 2(\tilde{n}_i - \tilde{n}_b)$.

Case 4b: $\tilde{n}_i \geq \tilde{n}_e(\tilde{t}) > 0$, $\tilde{n}_b > \tilde{n}_i$ Consider the case when the energetic electron beam density is greater than the background ion density. Equation (2.10) may be simplified to yield the following normalized cool thermal electron density $$\tilde{n}_e(\tilde{t}) = -(\tilde{n}_b - \tilde{n}_i) + \frac{(\tilde{n}_b + 1 - \tilde{n}_i)e^{2\left[\frac{(\tilde{n}_i-\tilde{n}_b)}{4}\tilde{t}^2 + \frac{(\tilde{n}_i-\tilde{n}_b)}{\sqrt{2(\tilde{n}_b+1-\tilde{n}_i)}}\tilde{t}\right]}}{\left\{ 1 + \sqrt{\frac{2(\tilde{n}_b + 1 - \tilde{n}_i)}{(\tilde{n}_b - \tilde{n}_i)}}\ e^{-\left[\frac{(\tilde{n}_b - \tilde{n}_i)}{2(\tilde{n}_b+1-\tilde{n}_i)}\right]}F(\tilde{t}) \right\}^2} \quad (2.18)$$

where $$F(\tilde{t}) = \int_{\tau_o(0)}^{\tau(\tilde{t})} e^{u^2}\, du \quad (2.19)$$

$$\tau(\tilde{t}) = \frac{\tilde{t}}{2}[\tilde{n}_b - \tilde{n}_i]^{1/2} + \left[\frac{(\tilde{n}_b - \tilde{n}_i)}{2(\tilde{n}_b + 1 - \tilde{n}_i)}\right]^{1/2} \quad (2.20)$$

and $\tau_o = \tau(\tilde{t}=0)$. At the initial point in time, $\tilde{t}=0$, the cool thermal electron density satisfies the quasi-neutral condition; $\tilde{n}_e(\tilde{t}=0)=1$. The relation only has meaning over the time duration $0 \leq \tilde{t} \leq \tilde{t}_{max\ 4b}$ where $$\tilde{t}_{max4b} = \sqrt{2}\left[\frac{1}{\sqrt{\tilde{n}_b - \tilde{n}_i}} - \frac{1}{\sqrt{\tilde{n}_b + 1 - \tilde{n}_i}}\right] \quad (2.21)$$

FIG. 2B shows that case 4b can be accurate as $\tilde{n}_b$ approaches 1. When $\tilde{n}_b$ is greater than but near one, within the validity of this perturbation, the majority of electrons are expelled from the electron beam region. When the beam density approaches 10 times the ion density, less than 10% of the total electrons are expelled from the region within the validity of the theory. This implies that this perturbation case is only significant over a very narrow parameter space. It can be shown that the other perturbation techniques presented do not agree well within this narrow parameter space.

Plotting and Comparison of Solutions

A comparison of the different cases within their valid parameter space is conducted against the numerical solution of Eq. (2.10). Initially, quasi-neutrality condition is assumed implying that the number of background ion charges approximately equals the number of background electron charges. In each of the four graphs, the numerical solution is the solid line. A thin vertical dashed line designates the maximum time a particular perturbation technique is valid.

In all plots, the solid line is the exact numerical solution from Eq. (2.10). The remaining curves are (a) dashed line—Case 3 (vertical line corresponds to the maximum normalized time for Case 3), (b) the dash line—Case 1, (c) the dashed line—Case 2 and the dashed-dotted line—Case 4b, and (d) dashed line—Case 2 and the dashed-dotted line—Case 4b (vertical line corresponds to maximum normalized time for Case 4b). (e) dashed line—Case 3, dot-dashed line—Case 4a.

Figures 2, 2C, 3:
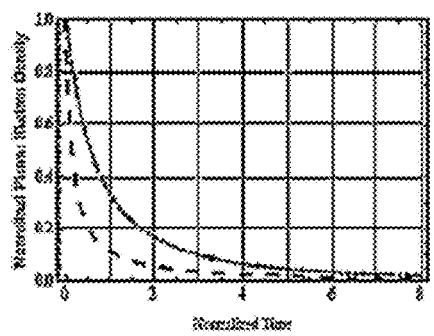
Figures 2, 2C, 3, 4:
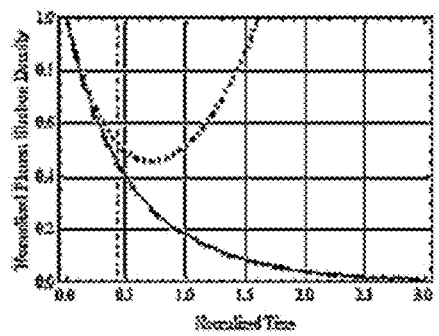
Figures 2, 2C, 3, 4, 5:
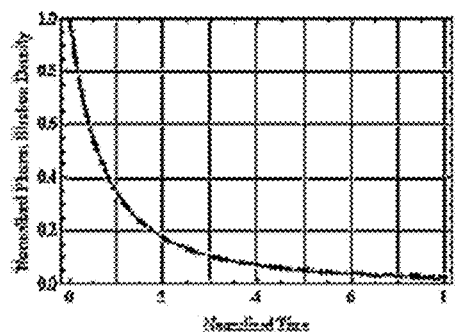

When the normalized beam density is less than one as illustrated in FIG. 2C-1, Case 3 [Eq. (2.13)] most closely fits the numerical solution for times up to $\tilde{t}_{max3}$. At this time, the background electron density has reached its anticipated asymptotic value. Therefore, for times exceeding $\tilde{t}_{max3}$ the dynamics of the beam exceed the validity of the model. Under appropriate conditions, pinch effects on the electron beam are anticipated. In FIG. 2C-2, the numerical solution and Case 1 [Eq. (2.11)] are identical. This is anticipated since Eq. (2.11) is the analytical solution to Eq. (2.10) for $\tilde{n}_b=1$. When the beam density is slightly larger than the initial electron plasma density (initial background electron density), Case 4b [Eq. (2.18)] tends to show good agreement with the numerical result as illustrated in FIG. 2C-3. Although Case 2 [Eq. (2.18)] is valid at the asymptotes it deviates significantly from the numerical curve. This is reasonable since Case 2 is valid for $(\tilde{n}_b \gg 1)$. When the normalized density is two $(\tilde{n}_b=2)$, Case 2 matches identically with the numerical solution over all time as illustrated in FIG. 2C-4. Here, Case 4b only shows good to reasonable agreement up to its maximum normalized time given by Eq. (2.21). In FIG. 2C-5, Case 4a shows good agreement with Case 3 and the numerical solution. This is due to $\tilde{t}_{max\ 4a}$ approaching infinity as $\tilde{n}_b$ approaches one from the left. Also, $\tilde{t}_{max3}$ approaches infinity as $\tilde{n}_b$ approaches one from the left. So, neither $\tilde{t}_{max4a}$ nor $\tilde{t}_{max3}$ are shown in FIG. 2C-5 since they do not fit on the plotted time scale. Case 4a only works well as $\tilde{n}_b \to 1^-$, so Case 3 is a better solution for the range $\tilde{n} < 1$.

To summarize, perturbation techniques have been identified to allow for nonlinear analytical solutions of Eq. (2.10) covering the entire parameter space. Good agreement with the numerical solution results if: a) $\tilde{n}_b<1$, Case 3 [Eq. (2.13)]; b) $\tilde{n}_b=1$, Case 1 [Eq. (2.10)]; c) $\tilde{n}_b \to 1^+$, Case 4b [Eq. (2.18)]; and d) $\tilde{n}_b \gg 1$, Case 2 [Eq. (2.12)] are used.

Beam Divergence

The cylindrical beam approximation is examined based on time of flight and relaxation times. The relaxation time is the time duration when estimated self-magnetic field forces balance the opposing internal beam forces such as space charge forces and pressure gradient forces. Consider the Coulomb force of an infinitely long cylindrical beam of uniform volume charge density, $\rho_v = -e\tilde{n}_b n_{eo}$. Even though the background charge is treated as being quasi-neutral, the beam electron density is normalized to the background charge, $n_b = n_{eo}\tilde{n}_b$ where the symbolic notation $\tilde{n}_b$ is retained, and the electron beam density is posed as being nearly constant implying $\tilde{n}_b = n_{bo}/n_{eo}$. Assuming the charge distribution as a whole does not significantly change its electric field properties in the duration of the experiment leading to pinch, the force acting on and trajectory of a single beam electron on the outer perimeter of the beam is followed. For the beam radius normalized to 'a', the initial diameter of the beam, the force acting on a single charge is $$\vec{F} = \frac{\tilde{n}_b}{2\tilde{r}(\tilde{t})}\hat{r} \qquad (2.22)$$

where $\tilde{r}(\tilde{t})$ is the time varying radius of the individual electron being followed. The radial trajectory equation constraining the initial radial electron beam velocity to be zero at $\tilde{r}=1$ is $$\frac{d\tilde{r}}{d\tilde{t}} = [\tilde{n}_b \ln(\tilde{r})]^{1/2} \qquad (2.23)$$

As a worst case scenario, the distribution of background and beam electrons at time $\tilde{t}=0$ is assumed constant over all space. The free beam expansion time, the amount of time it takes for the cylindrical beam to deform to 10% of its original radius in the presence of space charge effects, is $$\tilde{T}_{fe}(10\%) = \sqrt{\frac{2}{5\tilde{n}_b}} \qquad (2.24)$$

An allowable 20% radial expansion yields a normalized free expansion time of $$\tilde{T}_{fe}(20\%) = \sqrt{2} \times \tilde{T}_{fe}(10\%) \qquad (2.25)$$

Time Required to Pinch

As background thermal electrons are expelled from the electron beam region, the background ions generate a focusing Coulomb force that partially or totally compensates the beam's repulsive space charge force. The ion space charge force when added to the beam's self space charge and self-magnetic forces result in beam expansion or contraction depending on the relative magnitudes of the competing forces. Summing the Coulomb and magnetic space charge forces acting on the beam electrons assuming the beam is non-relativistic gives $$\vec{F}_T(\tilde{t}, \tilde{r}) = \frac{\tilde{r}}{2}[\tilde{n}_b(1 - \tilde{u}_b^2) + \tilde{n}_e(t) - \tilde{n}_i]\hat{r} \qquad (2.26)$$

It is assumed that background electrons move slowly generating an insignificant self magnetic field and, in the presence of the electron beam's self-magnetic field, experience an insignificant change in trajectory internal to the electron beam. Further, the background ion specie is assumed stationary and the electron beam density is nearly cylindrically symmetric over the time duration of the pinch. The electron beam's temporal and spatial profiles over the cross section of the beam at the beam input is constant implying that a constant supply of new energetic beam electrons passes through a fictitious area of constant radius. These new beam electrons reinforce and sustain the cylindrical beam approximation.

In the case where the beam is less dense than the background plasma ($\tilde{n}_b < 1$) the pinch time is given as $$\tilde{T}_{pinch} = \frac{\tilde{n}_b - \tilde{n}_i - \sqrt{2(\tilde{n}_b + 1 - \tilde{n}_i)(\tilde{n}_b \tilde{V})}}{(\tilde{n}_i - \tilde{n}_b)\sqrt{\tilde{n}_b \tilde{V}}} + \frac{\left(\left[(\tilde{n}_i - \tilde{n}_b)^2 + 4(\tilde{n}_i - \tilde{n}_b)\sqrt{2(\tilde{n}_b + 1 - \tilde{n}_i)(\tilde{n}_b \tilde{V})} + (6\tilde{n}_b - 6\tilde{n}_i + 2)\tilde{n}_b \tilde{V}\right]^{1/2}\right)}{\left((\tilde{n}_i - \tilde{n}_b)\sqrt{\tilde{n}_b \tilde{V}}\right)} \qquad (2.27)$$

In the case where the beam density is just as dense as the background ion density $\tilde{n}_b = \tilde{n}_i$, the pinch time yields $$\tilde{T}_{pinch} = \sqrt{\frac{1}{\tilde{n}_i \tilde{V}}} - \sqrt{2} \qquad (2.28)$$

When the beam is denser than the plasma ($\tilde{n}_b \gg 1$) the pinch time is expressed as $$\tilde{T}_{pinch} = \frac{-1}{\sqrt{2(\tilde{n}_b - \tilde{n}_i)}} \ln\left[\frac{(\tilde{n}_i - \tilde{n}_b[1 - 2\tilde{V}])(2\tilde{n}_b - 2\tilde{n}_i + 1)}{(1 + 2\tilde{V})\tilde{n}_b - \tilde{n}_i}\right] \qquad (2.29)$$

Figure 2D:
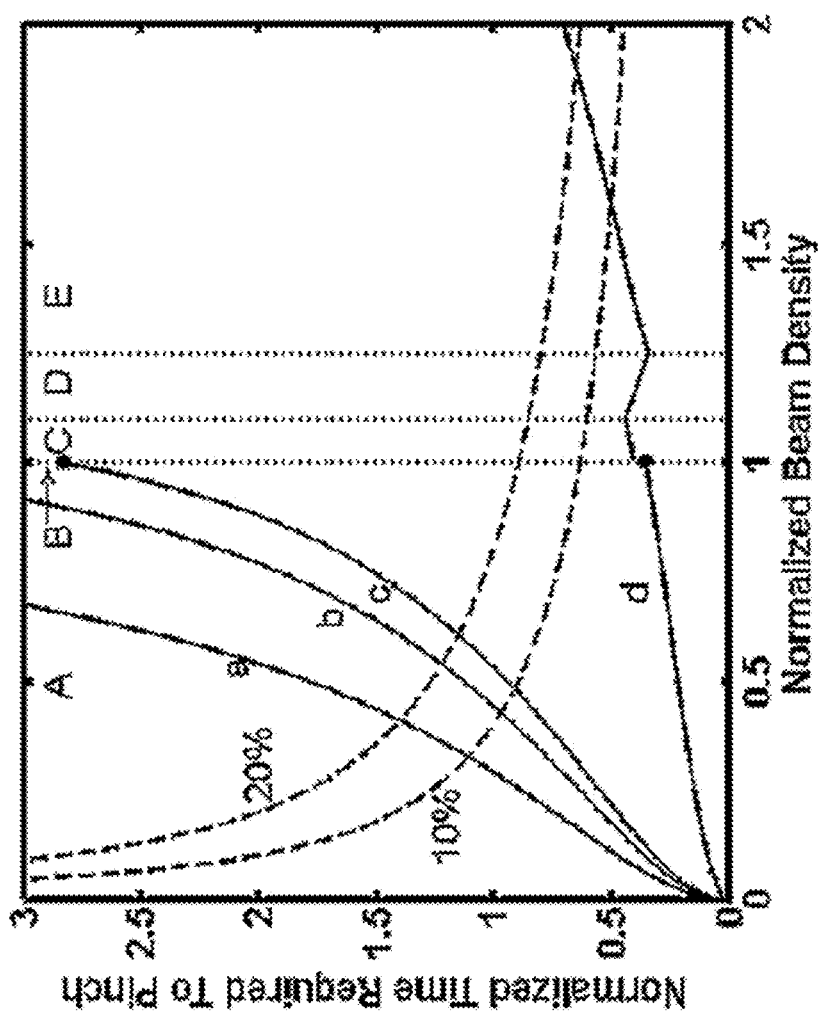
FIG. 2D illustrates a normalized time required for the beam to achieve equilibrium and transition from expansion to contraction.

FIG. 2D depicts the normalized pinch time $\tilde{T}_{pinch}$ over the entire normalized beam density $\tilde{n}_b$ parameter space bounded by the free expansion time $\tilde{T}_{fe}$ of the electron beam (dashed curve) given by Eqs. (2.24) and (2.25). The plot is divided into 5 discrete regions labeled as A, B, C, D, and E. Region A corresponds to the parameter space $\tilde{n}_b < 1$. Eq. (2.13) [Case 3] is used to characterize the pinch time in this region. Region B is the $\tilde{n}_b = 1$ point. The exact nonlinear solution to the density equation (Case 1, Eq. (2.11)) is used. The pinch time is identified as a large dot in the figure. Case 4b [Eq. (2.18)] describes the pinch time in region C where $\tilde{n}_b \to 1^+$. The extent of this region was chosen such that the error between the exact nonlinear solution and the approximate solution deviated by no more than 10% difference in final time (final time estimated to be the time elapsed after reaching 90% of the final value). Region E, where the parameter space $\tilde{n}_b \gg 1$, is characterized by the approximate solution Case 2 [Eq. (2.12)]. As $\tilde{n}_b$ approaches 1, Case 2 deviates significantly from the exact solution. Consequently, the normalized density that demarcates the 10% error from the exact solution provides an upper bound for region D. In region D, the approximate solutions from either extremes yield an error that exceeds 10%. In this region, one can interpolate between the endpoints of region C and E to obtain a reasonable pinch time since the approximation in regions C (Case 4b) and E (Case 2) respectively overestimates and underestimates the background electron density as shown in FIG. 2D.

The pinch time was plotted for four normalized voltages (and corresponding beam or discharge voltages): a) $\tilde{V}$=0.001 (511 V), b) $\tilde{V}$=0.032 (16.38 kV), c) $\tilde{V}$=0.0556 (28.5 kV), and d) $\tilde{V}$=0.32 (163.8 kV). Because a classical theory was applied, line d is the limiting maximum normalized voltage for the validity of the theory. Line a corresponds to a beam (discharge) voltage of about 500 V. So, the region bounded by the free expansion time curve (dashed line) and lines a and d gives rise to the parameter space where the nearly uniform cylindrical beam approximation is valid. Further, the beam can exhibit pinch because of a combination of electron channeling and self-magnetic focusing. Typically, a glow discharge voltage can fall between curves a and b (500V and 16 KV). For a particular beam voltage (glow discharge voltage), as the beam density increases relative to the plasma density, the beam takes longer to pinch assuming the pinch time is less than the free expansion time. It is also observed that as the beam approaches a relativistic condition, the normalized beam density can exceed one implying that magnetic focusing effects is significant.

From this plot it can be stated that an electron beam that is accelerated through a potential difference of 500 V (a common value for a glow discharge, which corresponds to $\tilde{V}\approx0.001$) can pinch only if the electron beam density is less than about 40% of the initial plasma density yielding a pinch time of about $1.5\omega_{pe}$. For $\tilde{n}_b$>0.4, the cylindrical beam assumption becomes less valid and theoretical pinch predictions should be accepted only with reservation.

Experimental Exploration of the Constricted Glow Discharge
Setup and Apparatus

It was observed that a glow discharge can constrict under certain operating conditions, and an experimental apparatus was constructed to observe the phenomenon.

A DC discharge tube was constructed that is basically a parallel plate capacitor placed within a vacuum chamber. A description of the specifics of the construction can be found in reference [52]. This tube can be modified and used for these examples.

Figures 1, 3A:
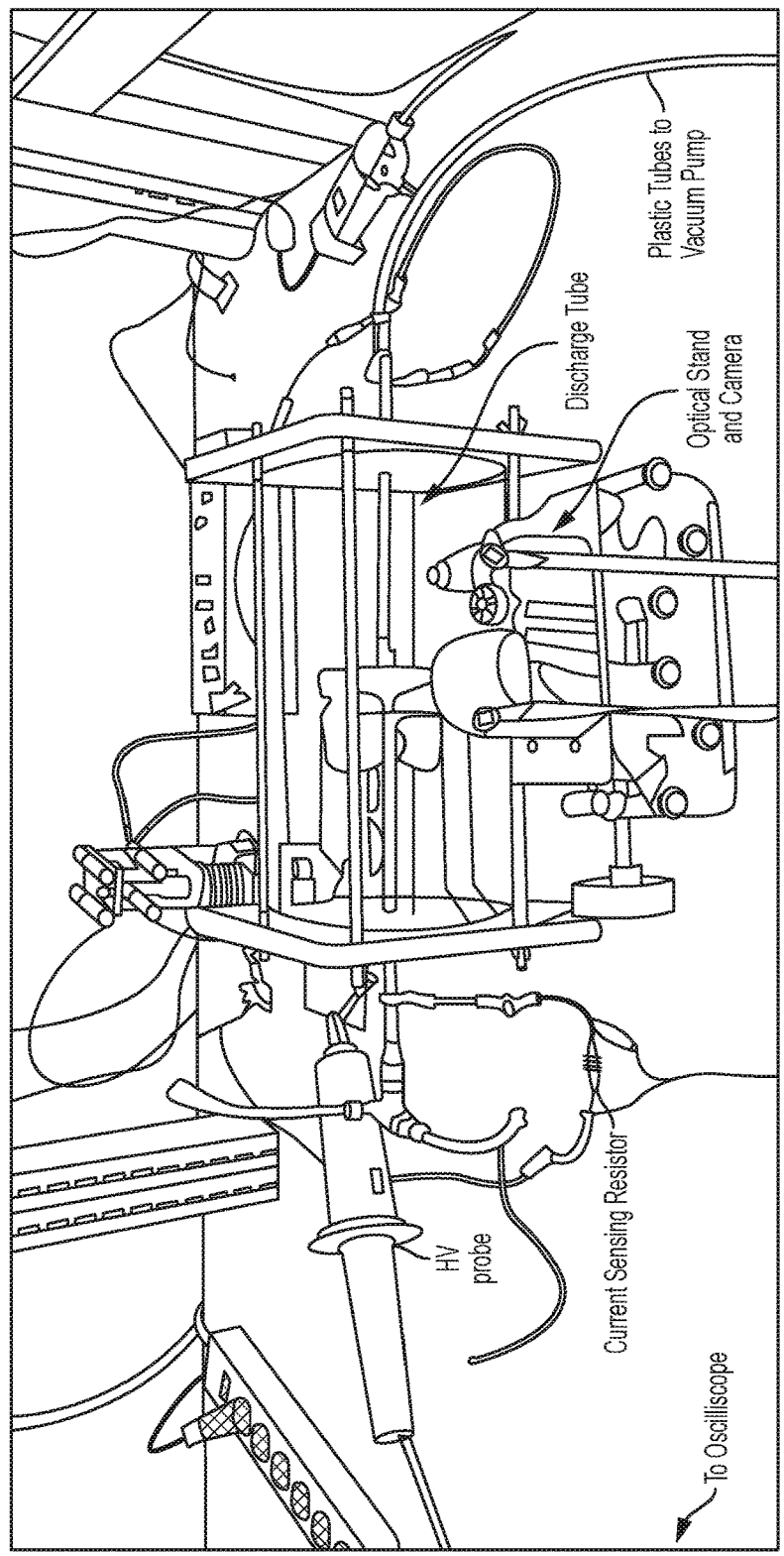
Figures 2, 3A:
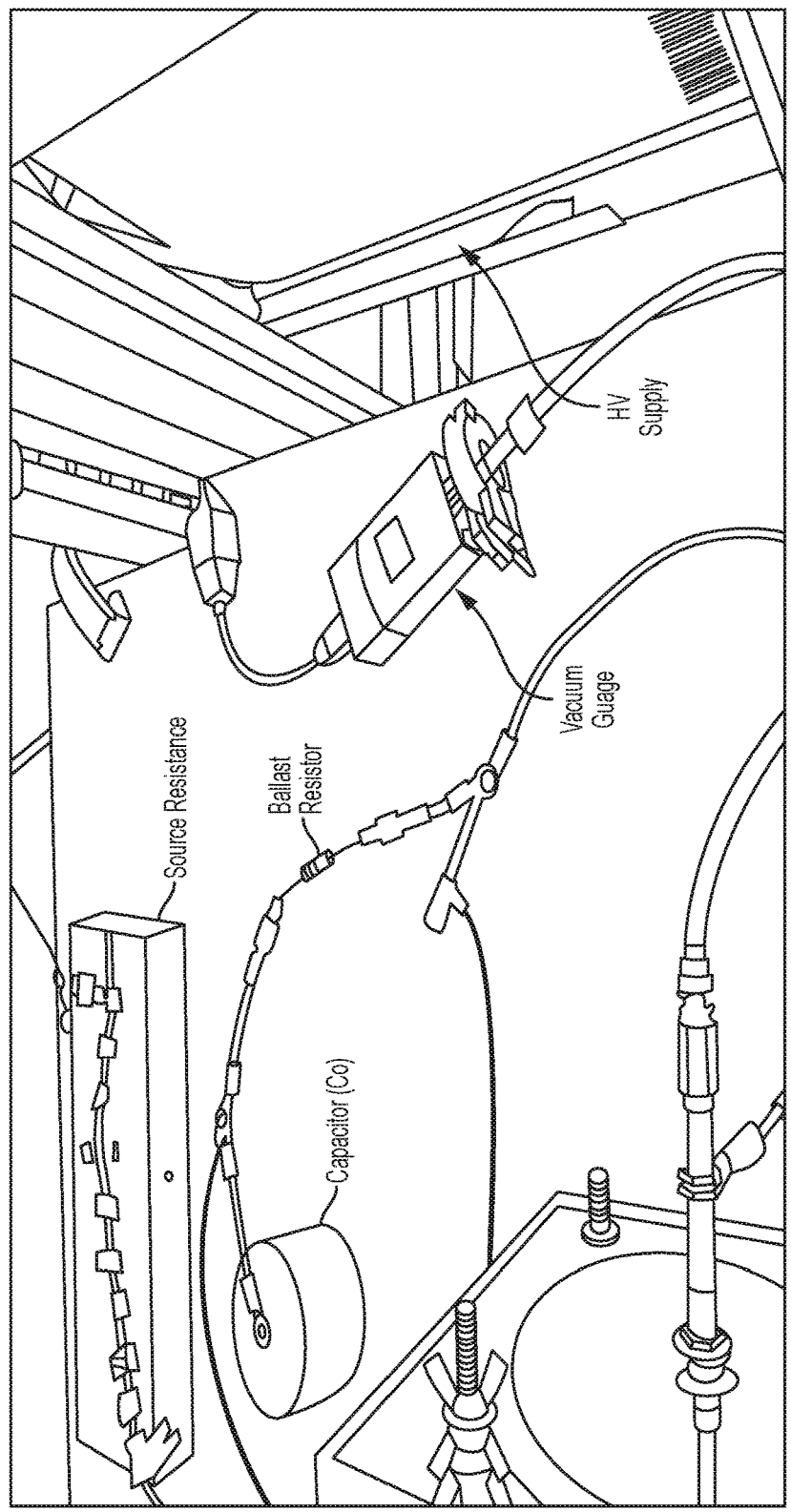

The experimental setup of an electrical discharge tube is shown in FIGS. 3A-1 and 3A-2. Two different vantage points are shown in FIGS. 3A-1 and 3A-2, with labels identifying important features. The important features of the setup are identified by labels. FIG. 3A-2 depicts the electrical setup for the pulsed glow discharge. In an aspect, a high power supply (which is to the right and not fully pictured, but is labeled in FIG. 3A-2) connects to the source resistance, which is connected to a shunt capacitor. This capacitor also connects to a ballast resistance, which in turn leads to the parallel plate discharge tube. Finally, the vacuum gauge is also labeled in the figure, which displays the pressure of the discharge tube.

In FIG. 3A-1, the left side pictures the electrical diagnostics, including a high voltage probe, current sensing resistor, and an oscilloscope (the oscilloscope is outside of the picture view, but it's labeled with an arrow pointing to the left edge of the photograph). On the right side of FIGS. 3A-1 and 3A-2, a discharge tube is pictured along with the plastic vacuum tubing that leads to the vacuum pump. The vacuum pump is not pictured. Finally, the camera and optical stand are labeled. The camera can also be mounted above the discharge tube on a bench mount that points downwards. This mount is not pictured.

As an example, a Plexiglas cylindrical tube (OD 8") can be placed between two Lexan® polymer square plates and bolted together with rubber Viton sheets at both connections to provide a vacuum seal. All threaded lamp pipe kit brass tubes protrude from both Lexan ends into the chamber with aluminum plates attached to the inner end of the tubes. These circular plates face each other forming a parallel plate capacitor. They are both 4" in diameter, ⅛" thick and constructed from 6061 aluminum alloy (98% pure aluminum) and have been placed 1.18" (3 cm) apart. The copper tubes are connected to external vacuum components as well as external electrical circuitry. This allows for control of the chamber pressure. It also allows a voltage to be placed across the parallel plates. If this voltage exceeds a certain value (e.g., the breakdown voltage dictated by the Paschen curve) then breakdown can occur and plasma can be produced between the plates. This plasma can be either a glow discharge or an arc discharge.

Figure 3B:
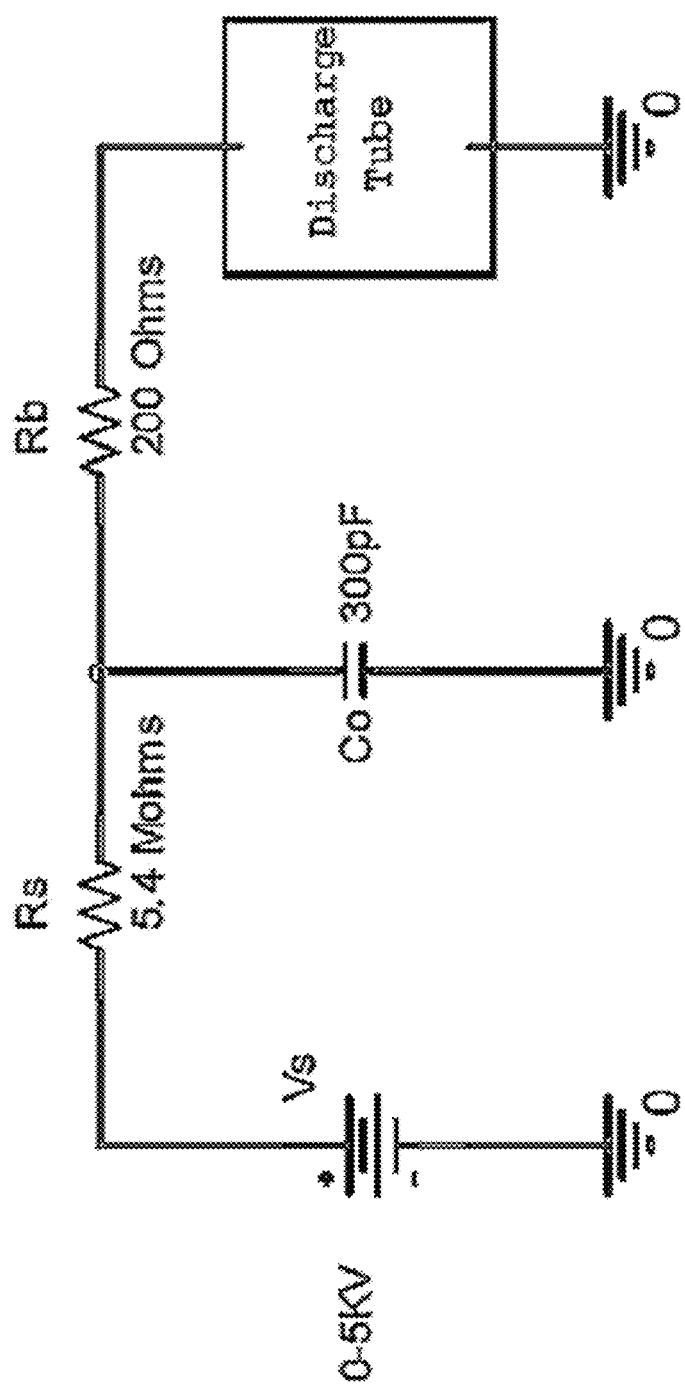
FIG. 3B illustrates external electrical system design for the pulsed glow discharge system. Actual values change depending on experiment.

The tube can be operated in two different modes depending on the external circuitry. One mode is a pulsed glow mode, as shown in FIG. 3B. In this mode, high voltage pulses are applied to the aluminum plates, which can lead to a pulsed breakdown across the plates. The maximum voltage pulses up to 5 kV and current draws of 5 A have been observed in the discharge. This amount of current and power is not sustainable at DC, but is very stable in this pulsed mode circuit. This system allows high voltage and high current operation without arcing.

The system operates by using a high voltage power supply to slowly feed a capacitor bank with current, which slowly increases the capacitor bank voltage. This capacitor bank is connected to the discharge tube and when it reaches the breakdown voltage of the tube (this voltage can depend on the pressure and distance of separation according to the Paschen curve) breakdown occurs, plasma is formed between the plates, and current begins to flow through the system quickly. The voltage across the plates drops quickly once breakdown occurs which causes the capacitor bank to release its excess charge. The current is slowed by a ballast resistor placed between the capacitor and discharge tube. Once the capacitor bank reaches the voltage of the tube, no more current can be conducted and the glow discharge is extinguished. The capacitor bank is then slowly fed until it reaches the breakdown voltage again, and the process repeats. By changing the source resistance ($R_s$) and source voltage ($V_s$), the repetition rate can be controlled. By changing the capacitance ($C_0$) and ballast resistance ($R_b$), the pulse length can be controlled. By changing the ballast resistance ($R_b$), the peak current of the pulse can be controlled.

In an aspect, there can be four system parameters that can be varied in order to change the properties of the glow discharge. They are peak current, current pulse width, pulse repetition rate, and pressure. Control of these parameters is achieved by varying four control inputs. These are the vacuum system, capacitor, ballast resistor, and voltage source. However, it is not completely clear cut; all of these parameters are coupled. When increasing the pressure, the breakdown voltage increases and therefore the peak current increases as well. Changing the ballast resistance can give control over the peak current, but it also changes the pulse width because pulse width is dependent upon resistance multiplied by capacitance. Changing the capacitance can give control of the pulse width, but it also affects the repetition rate because a large capacitor takes longer to charge than a small capacitor. The only control input that has no effect on the other parameters is the voltage of the high voltage supply. Table 3.1 summarizes the control inputs and the system parameters.

TABLE 3.1

Control inputs and the direct and indirect parameters they affect

| Control Input | Direct Parameter | Indirect Parameter |
|---|---|---|
| Vacuum system | Pressure | Peak Current |
| Capacitance | Pulse Width | Repetition Rate |
| Ballast Resistor | Peak Current | Pulse Width |
| Voltage | Repetition Rate | None |

Figure 3C:
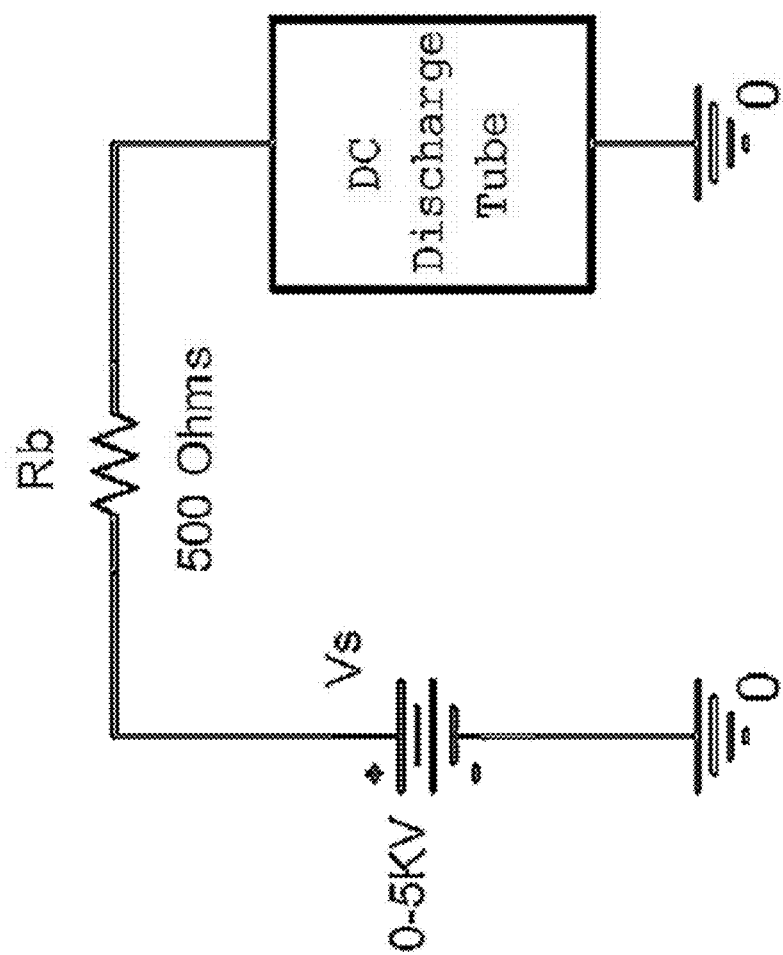
FIG. 3C illustrates a DC discharge electrical schematic.

The other mode that the discharge tube can be operated in is a purely DC mode. The high voltage power supply is connected directly to the discharge tube and the DC voltage breaks down the air between the plates and a DC glow discharge is established. The current can be controlled by the ballast resistance and power supply voltage, as shown in FIG. 3C.

In an aspect, as pressure and current are increased, the risk of an arc occurring can be increased. In order to observe the intense pinched column in the glow discharge, the tube can be operated at medium to high currents and high pressures relative to conventional glow discharges. The high currents and pressures can lead to arcs and streamers when the tube is operated in DC mode. This can prevent observation of the intense pinched glow discharge. Also, at these high powers the DC discharge tube can heat up tremendously. In pulsed mode at ~3 to 5 kV, it can be possible to achieve very high currents (>0.05 A) at high pressures (>3 Torr) without arcing. Under these operating conditions a very intense pinched column can be observed. Consequently, the apparatus can be operated mostly in a pulsed mode.

Figure 3D:
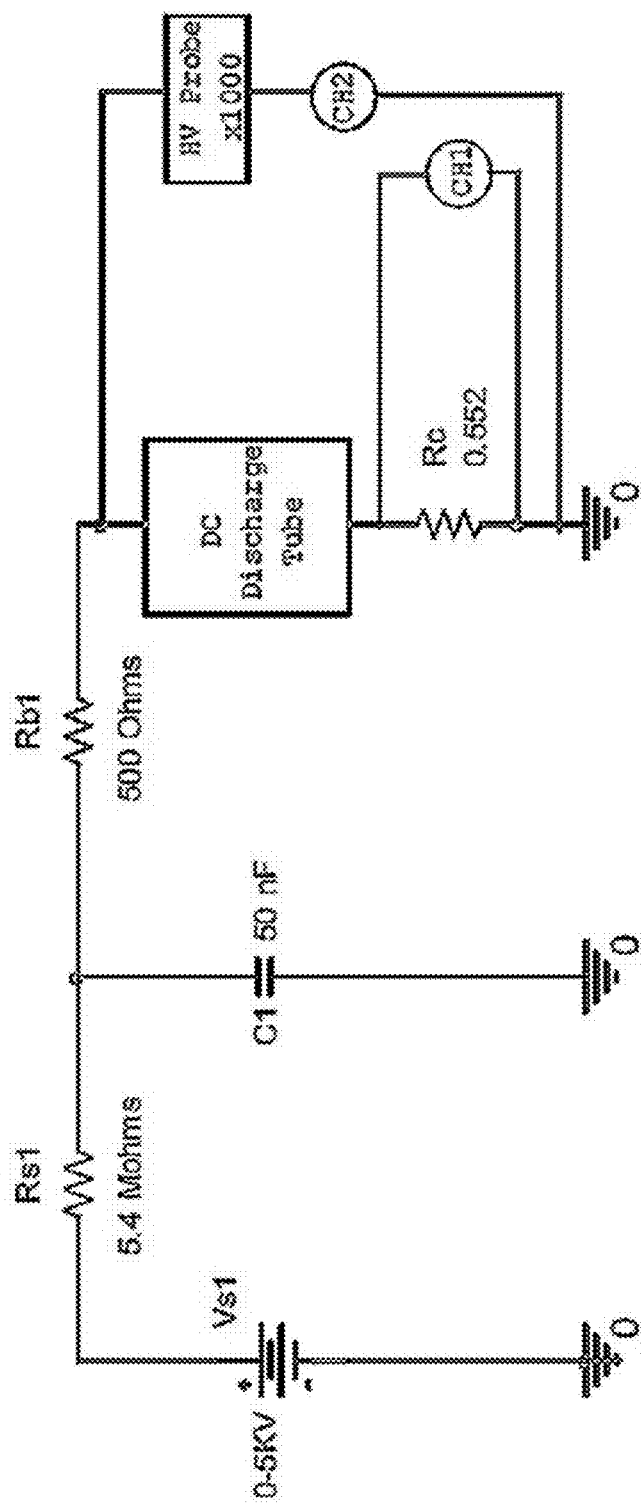
FIG. 3D is a schematic view of external electrical system including voltage and current probes.

In an aspect, voltage and current of the glow discharge can be measured by external probes as shown in FIG. 3D. The voltage can be measured by a 1000×1 HV probe (e.g., Tektronix P6015). The external probe can be valid for rise times greater or equal to 4.5 ns.

Figure 3E:
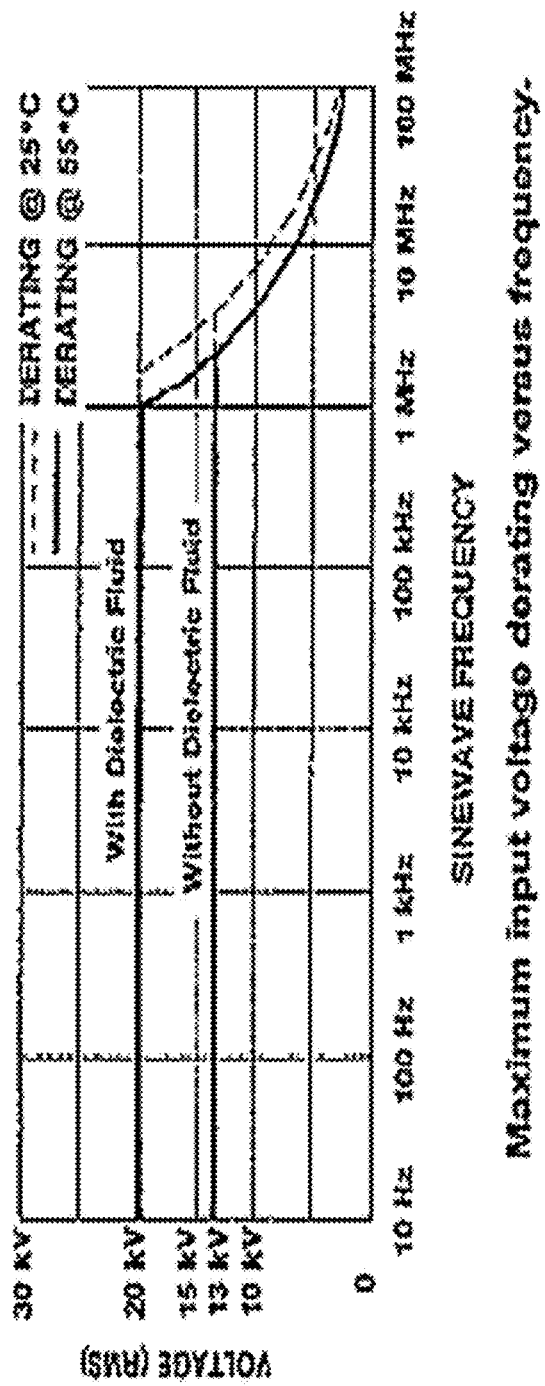
FIG. 3E illustrates maximum input voltage derating versus frequency.

FIG. 3E and FIG. 3F illustrate technical specifications of the external probe. The current can be measured by a series resistor placed between the discharge tube and ground. This shunt resistor has a resistance of 1.7520. The plasma glow is examined using a digital camera with a 30 frames per second frame rate. As the electrons and ions in the glow discharge recombine and/or de-excite, they can emit light. It is assumed that the light intensity can be proportional to the plasma density since twice as many particles can emit twice as many photons. If a line is drawn from the cathode to the anode, then the camera can be pointed perpendicular to this line. Each pulse is captured by one frame and the frames are then separated using the video editing program Corel Video Studio Pro X4. Since the frames are spaced 33 ms apart and the pulses last for less than 1 ms, the cameras cannot capture any time resolution of the glow. Instead, as the shutter opens it gathers a time averaged image of the pinch. It is assumed that the equilibrium pinch is established very quickly (which the theory supports) so that the time averaged pinch seen in the frames is a good representation of the equilibrium pinch. The frames are then processed using Matlab code to determine the equilibrium spatial characteristics of the pinch.

Figures 1, 3G:
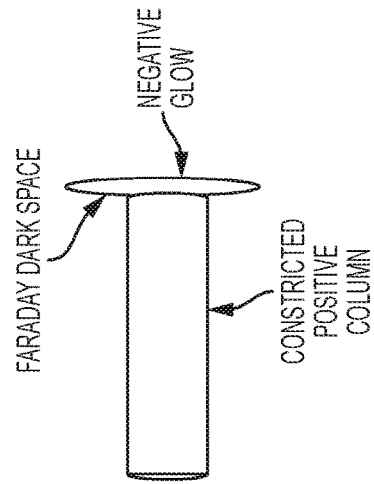
FIG. 3G illustrates frame extracted from a single glow discharge pulse at pressure 10 Torr, Io=1.1A, and 300 pF capacitance. (3G-1) Shows the common shape of the constricted glow including the various regions. (3G-2) Shows the plate positions when the glow is off and flashlight is shined on them.
Figures 2, 3G:
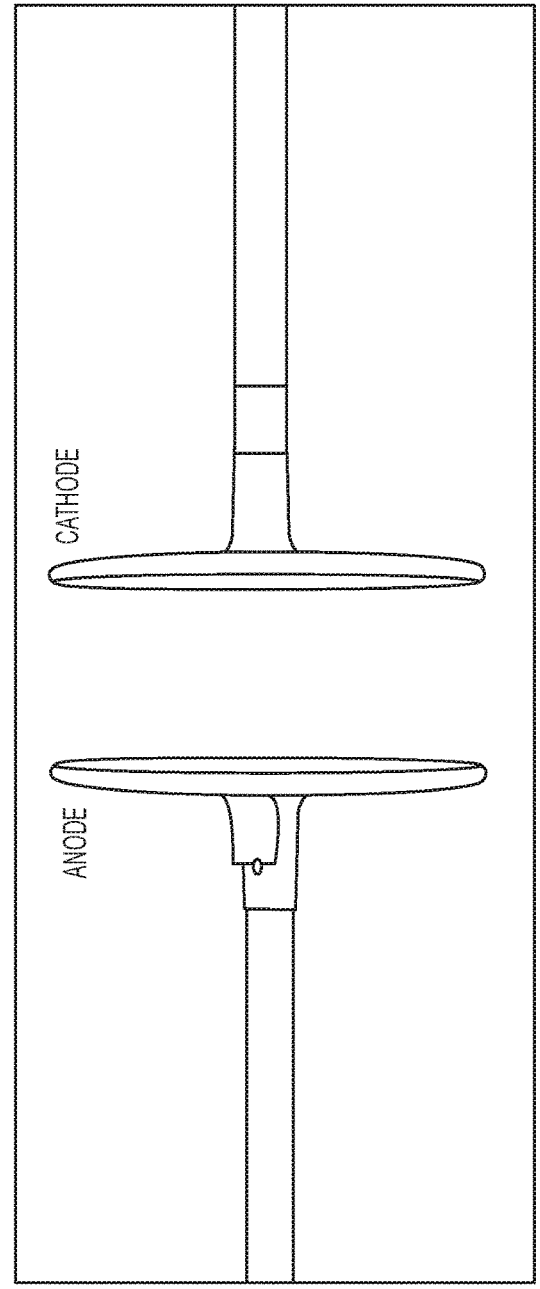

FIG. 3G-1 illustrates a frame extracted from a single glow discharge pulse at pressure 10 Torr, Io=1.1 A, and 300 pF capacitance. FIG. 3G-1 illustrates common shape of the constricted glow in a plurality of regions. FIG. 3G-2 illustrates the plate positions when the glow is off and flashlight is shined on them. The cathode is on the right and the anode is on the left in FIG. 3G-2.

In an aspect, the disclosed apparatus can comprise a plurality of vacuum connectors (e.g., Swagelok Ultra-Torr™ series connectors). The vacuum connectors can move minimum pressure to 0.5 Torr. It also allowed the pressure to be held at a specific pressure for much longer. The pump can be a pump with a variable pump rate. This was done to control the pressure of the tube by varying the pump speed. In an aspect, changing the pump speed can change rate at which a pressure is achieved. In the end, the pressure was controlled by bringing the chamber to the specific pressure and closing off all valves. In an aspect, a gas tank can be connected to the apparatus.

In an aspect, the electrodes can be sanded down regularly using 400 to 2500 grain size sand paper, followed by a cleaning with alcohol and lint free cloth. Thus, any pits or impurities can be removed in the cathode and anode.

Table 3.2 gives a list of the various components mentioned above as well as a description of each component.

TABLE 3.2

List of experimental components and specifications.

| Component | Description |
|---|---|
| Aluminum Plates | Alloy 6061 (98% aluminum), 4" Diameter, ⅛" Thick, 1³⁄₁₆" separation between plates |
| Chamber | Plexiglas cylinder, 8" OD |
| Walls | Two square Lexan end plates 1 cm thick |
| Capacitor Bank | Composed of ~5 nF capacitors linked in parallel, number of capacitors controls total capacitance |
| Ballast Resistors | High Power Ohmite resistors, series L225j 225 W continuous, 2,250 W peak and 2 W ceramic resistors. |
| HV Probe | Tektronix P6015, Bandwidth 75 MHz, Valid for rise time >4.5 ns |
| Current Sensor | 1.752 Ω, low inductance shunt resistor |
| Oscilloscope | Tektronix TDS 784C, 1 GHz, 4GSa/s, 1 MΩ or 50 Ω channels, 4 channels total |
| Power Supply | Gamma model #RR5 200R, 0-5 KV, 0-2 A continuous |
| Vacuum Pump | Agilent Triscroll 300 Inverter Dry Scroll Pump |
| Neutral Gas | Las Vegas air. From 2 to 20 Torr |
| Vacuum Connectors | Swagelok Ultra-Torr series |
| Vacuum Sensor | Varian PCG-750 |
| Secondary Camera | Fujifilm Finepix S2000HD, 10 Mpxls, 27 mm, 30 frames/sec, |
| Main Camera | Fujifilm Finepix S2950, 14 Mpxls, 28 mm, 30 frames/sec |

Formation of the Pinched Glow Discharge, Including Radius Studies

In an aspect, image processing techniques can be used to analyze the equilibrium pinch of the plasma. For example, after the desired frame is separated, it is imported into Matlab for image processing. If pulsed glow repetition rate is slower than 30 Hz, then each frame can comprise one single pulsed glow. If the repetition rate is faster than 30 Hz, then each frame can comprise multiple pulsed glows at nearly the exact same operating conditions. Since the operating conditions can be the same, then these multiple pulses can be nearly identical and can appear in the image to be one single pulse and they are treated as such.

Figure 3H:
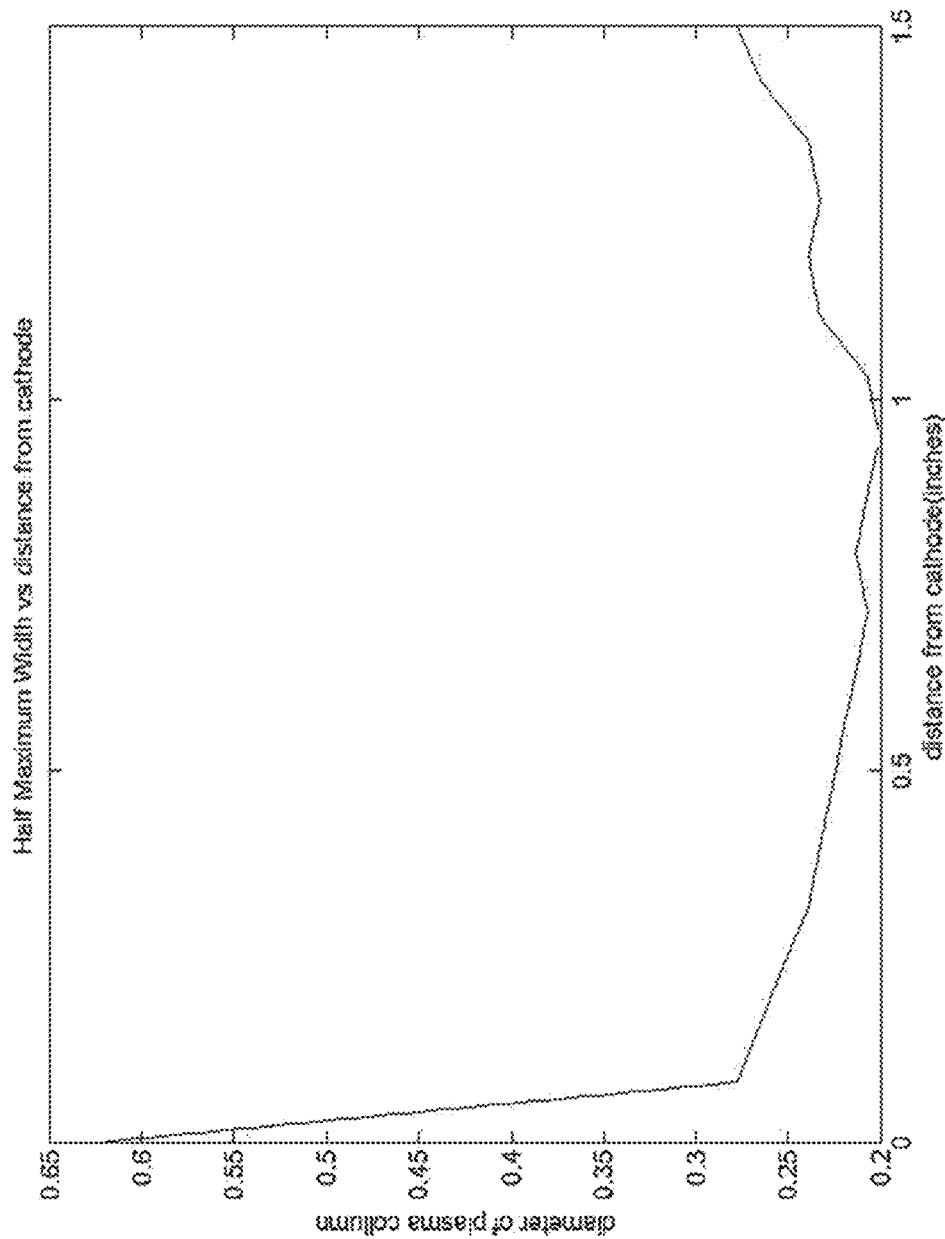
FIG. 3H illustrates common shape of the constricted glow.

The image processing techniques can be used to measure the pinch radius by looking at the light emissions. Using the image processing code, the full width half maximum (FWHM) of the light emission can be measured at the center of the discharge where the pinch column exists. Under the assumption that light can be emitted in the region of space where plasma exists, the diameter of the plasma pinch can be approximately equal the FWHM of the light emission. Thus, the image processing code can measure the diameter of the plasma column as seen in FIG. 3H. The horizontal axis is the distance from the cathode in the direction of the anode. Note the large radius at the cathode (horizontal axis=0) is due to the large radius of the negative glow. Also, a minimum is reached at the midpoint, and the radius increases again near the anode. The horizontal axis is the distance from the cathode in the direction of the anode. Note the large radius at the cathode (horizontal axis=0) is due to the large radius of the negative glow. A minimum can be reached at the midpoint, and the radius increases again near the anode. From experiments performed using the system described herein, it was found that a stable pinch could be created in a glow discharge at high pressures (above 5 Torr) if a pulsed system is employed. Under DC conditions, the glow destabilizes into damaging arcs, and the desired pinch is not observed. When the pulsed system is initiated at pressures above 5 Torr, a constricted glowing column is observed between the plates. This column wanders around the cathode, sometimes resting upon a spot on the cathode for a long period of time. If the pressure is decreased below 5 Torr, the column disperses and the glow covers nearly the entire plate.

In the set of experiments described here, the following conditions were attempted. The pressure was varied from 1 Torr to 20 Torr. The ballast resistance was varied from 166Ω to 2.98 kΩ. The voltage source varied from 1 kV to 5 kV. The capacitance was varied from 165 pF to 3881 pF. These conditions lead to the following measurement ranges: peak currents from 44 mA to 3.2 A, pulse widths between 1.5 μs and 15 μs, and repetition rates between 10 Hz and 5000 Hz. The peak current, breakdown voltage, pulse width, and repetition rate were recorded from the oscilloscope. The glow diameter (full width half maximum) along with peak intensity (in pixels) was extracted from the image processing code. Some data points were too dim to extract image data. The signal to noise ratio was too low.

From this data, conclusions can be drawn about the effect the various experimental conditions have on the pinch radius. Within the range of conditions published here, the stable plasma column diameter is mostly a function of pressure and seems nearly independent of all other parameters. Repetition rate has a small effect on the diameter, but it is not as important as pressure.

Figure 3I:
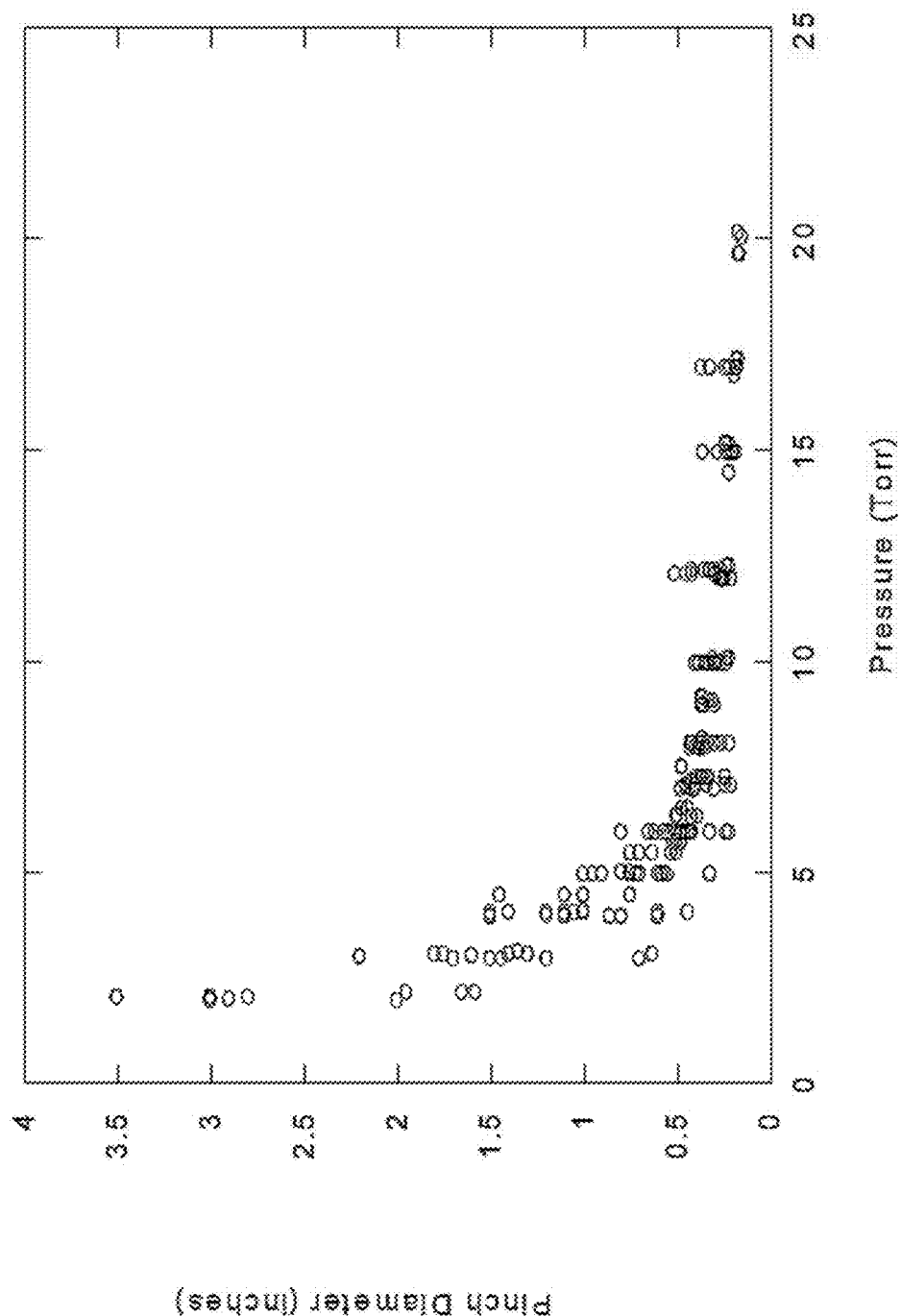
FIG. 3I illustrates complete set of pinch diameter versus pressure data.
Figure 3J:
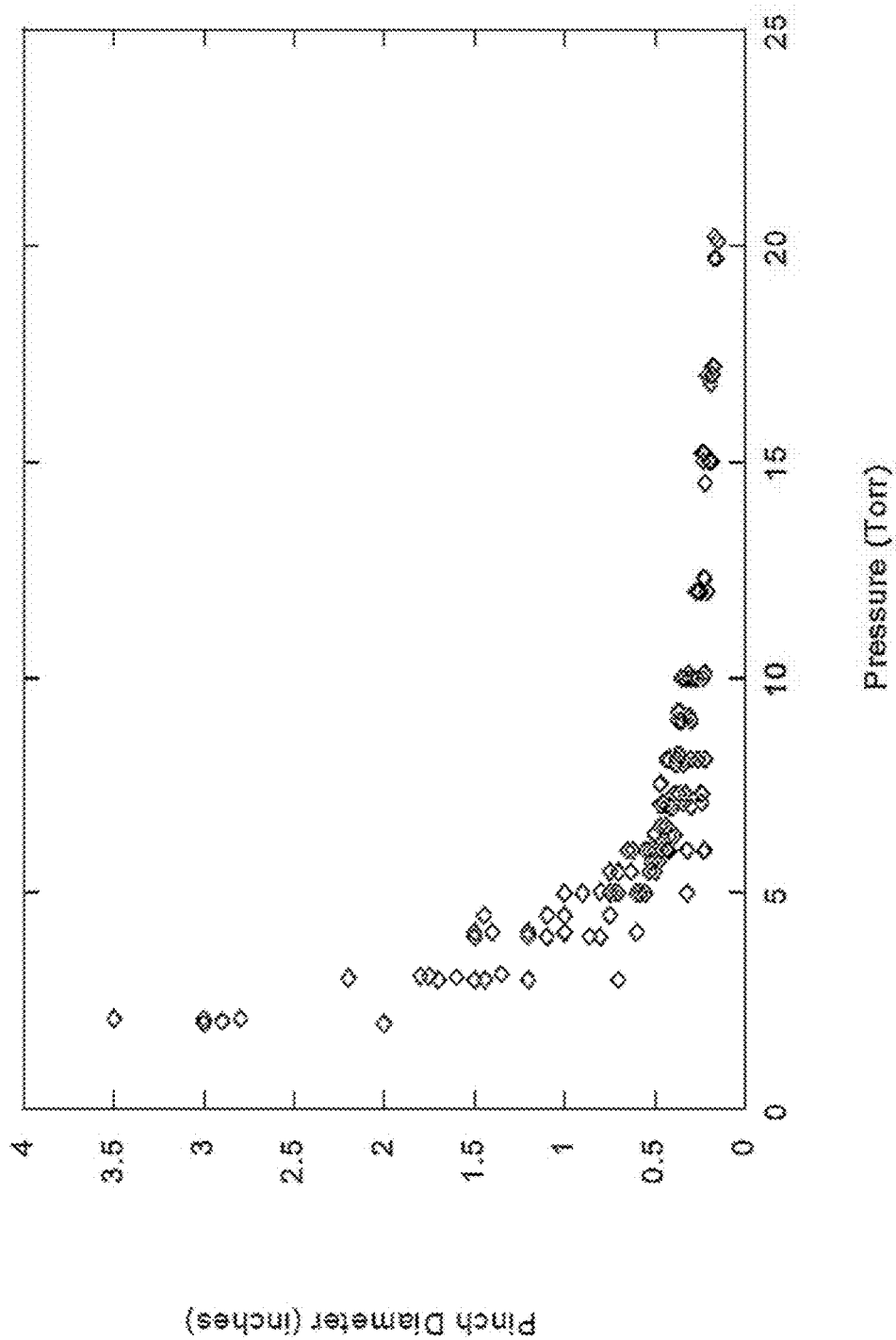
FIG. 3J illustrates pinch diameter versus pressure for all data points with repetition rates between 100 and 1000 Hz.

There is an asymptotic behavior of pinch diameter with pressure. At low pressures between 1-3 Torr, the glow discharge nearly fills the entire area of the plates. As the pressure is increased to 4 or 5 Torr, the glow area begins to quickly form a column and the radius decreases greatly. At 6 Torr, and a diameter of half an inch, the column reaches a point where it pinches further with increasing pressure, but it does so slowly. From 6 Torr up to 20 Torr, the diameter decreases slowly from 0.5" to 0.2". FIG. 3I illustrates complete set of pinch diameter versus pressure data. Other parameters vary widely, but have little effect. Peak currents range from 46 mA to 3,196 mA. Pulse width varies from 1.5 μs to 15 Repetition rate ranges from 10 to 5000 Hz. Other parameters vary widely, but have little effect. Peak currents range from 46 mA to 3,196 mA. Pulse width varies from 1.5 μs to 15 Repetition rate ranges from 10 to 5000 Hz. The spread in diameter at the high pressures (after pinch formation) is due to changes in repetition rate. FIG. 3J illustrates pinch diameter versus pressure for all data points with repetition rates between 100 and 1000 Hz. Peak currents range from 46 mA to 3,196 mA. Pulse width varies from 1.5 μs to 15 μs. Peak currents can range from 46 mA to 3,196 mA. Pulse width varies from 1.5 μs to 15 μs.

The variance in measured diameter at the lower pressures is probably due to a low signal to noise ratio. When the glow is diffuse and covers a large area of the cathode, the light is very dim and the image processing code becomes less reliable.

Figure 3K:
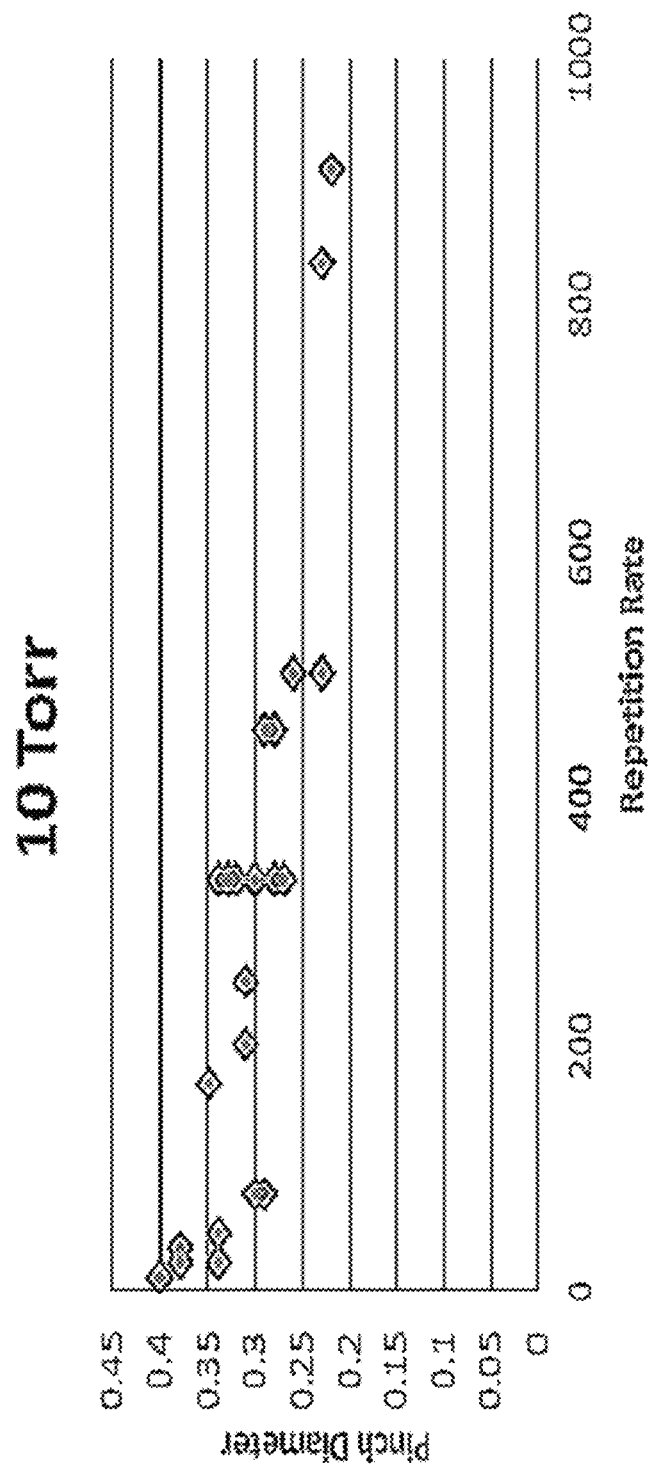
FIG. 3K illustrates pinch diameter as a function of repetition rate at 10 Torr.

In order to observe the effect of repetition rate, the same data was plotted versus repetition rate holding pressure at 10 Torr. The plot is shown in FIG. 3K. This seems to imply that each pulse has some influence on the subsequent pulse. In addition, the next pulse is always positioned approximately were the last pulse ended, with only minor deviations.

Figure 3L:
FIG. 3L illustrates pinch diameter plotted against peak current.

As for peak current, increasing it does increase the peak light intensity, but seems to have no effect upon the plasma column radius. This implies that as current increases beam electrons must be occupying the same radius. The pinch diameter is plotted versus peak current at 10 Torr using the same data set in FIG. 3L. In this plot repetition rate varies from 75 to 900 Hz and pulse width varies from 1.5 μs to 12 μs. Effect that peak current has on pinch diameter is minimal. In this plot repetition rate varies from 75 to 900 Hz and pulse width varies from 1.5 μs to 12 μs.

In the range of pulse widths that were used in this experiment, pulse width seems to have little effect upon the radius. However, increasing the capacitance can increase the pulse width while simultaneously decreasing the pulse repetition rate due to longer charging times. The change in repetition rate does affect radius. Thus, care must be taken to keep the repetition rate high or else the beam can expand slightly when changing the capacitance. As a side note, a set of experiments were performed with an enormously large capacitance and pulse widths nearing one second. Under these conditions, the discharge was in the form of an explosive arc, covering the entire region between the plates with an explosive white light and making a loud noise. This explosive arc tended to damage the plates and cloud the tube walls. So there seems to be a total beam energy limit, due to a large pulse width, in which temperature effects destabilize the pinch and change the results significantly. This destabilizing energy limit was not determined experimentally at this time.

In an aspect, the shape of the constricted stable plasma column can reach a minimum near the midpoint between the plates, and bows up slightly towards the anode. The diameter near the cathode can be large due to the large diameter of the negative glow.

Transient Oscilloscope Studies

Figures 1, 3M:
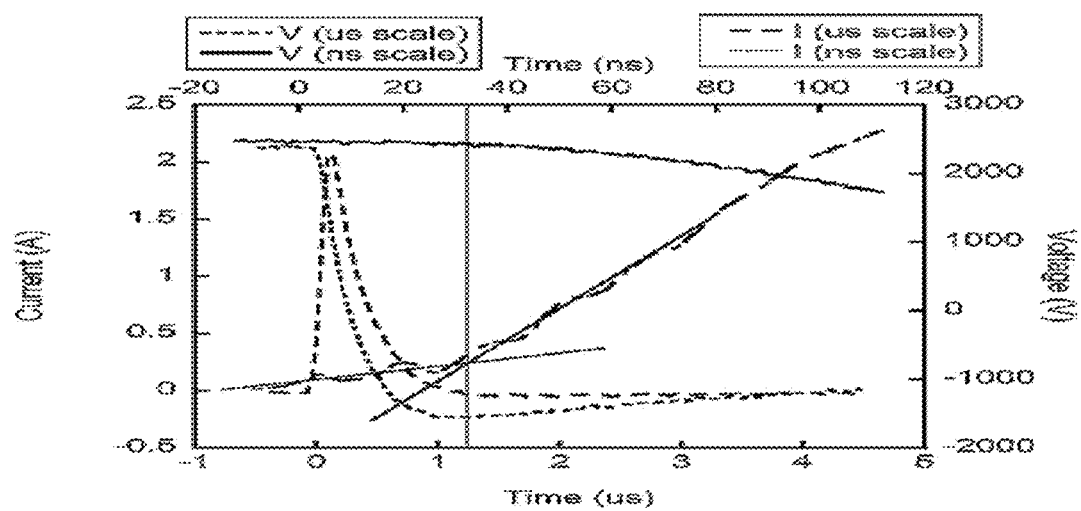
Figures 2, 3M:
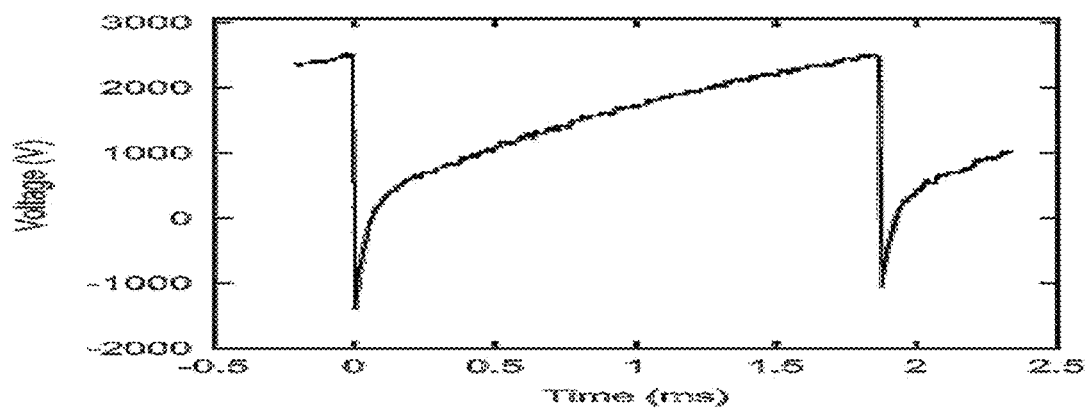

To obtain a better understanding about the current and voltage characteristics of the initial portion of this pulsed discharge, oscilloscope data was saved for the following experimental conditions: pressure of 10 Torr (due to the good pinched plasma column at this pressure), ballast resistance of 158Ω, capacitance of 300 pF, and repetition rate around 600 Hz. The raw data results are shown in FIG. 3M. The breakdown voltage is measured to be 2500 V. The voltage stays nearly constant while the current rises rapidly. However, by the time the current reaches its peak, the voltage drops quickly to large negative values. The (a) transient nature on both μs and ns time scales and the (b) the transient nature with pulse repetition rate on a ms time scale. The thin solid sloped lines in (a) illustrate the change in slope of the current on the nanosecond scale indicating a transition in the nature of the discharge load. This transition line is argued to be the sheath formation time. The thin solid vertical line illustrates the intersection point to be around 30 ns. The (a) pulse width is 1 μs and (b) the pulse repetition period is 1.87 ms yielding a duty cycle of 0.053%.

If one observes the current closely, and ignores the small oscillations, two straight lines with two distinct slopes can be observed. These slopes can be extremely useful in modeling techniques as can be described herein. It is believed that these slopes characterize the loading effects of plasma describing plasma formation and pinch.

Three different time scales are plotted in FIG. 3M. The nanosecond time scale shows the initial development of the glow discharge and the initial rise in current. As was noted, the voltage stays nearly constant in this time scale. The microsecond time scale shows the entire current pulse and the subsequent voltage drop. Note that the current does not go negative (at least not significantly enough to be measured at this vertical scale), but the voltage does. Finally, the millisecond time scale shows the capacitor charging cycle. This includes charging to the breakdown voltage, discharging quickly, and subsequently recharging.

Figure 3N:
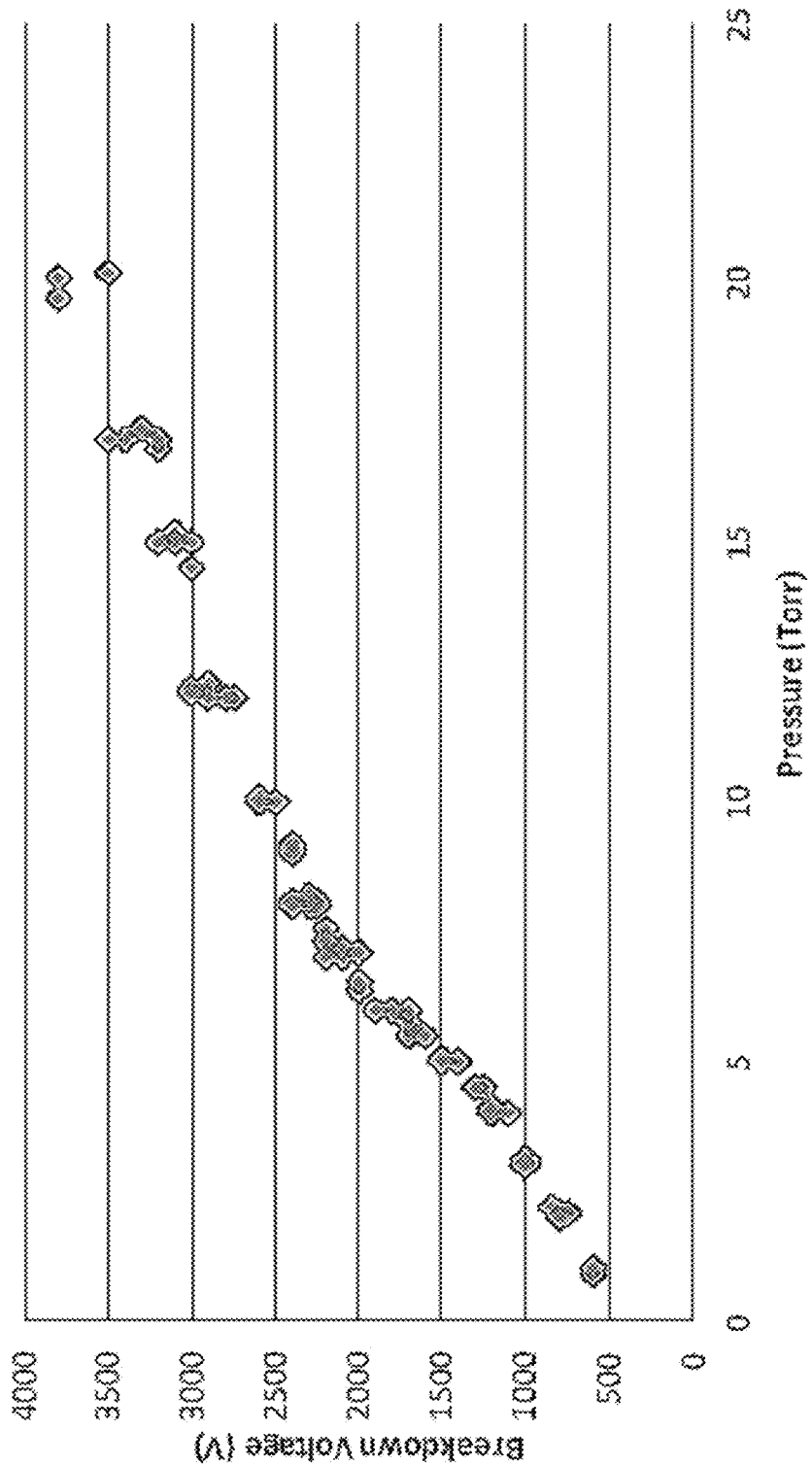
FIG. 3N illustrates measured breakdown voltage with plate separation equal to 3 cm.

The breakdown voltage can be measured for the experiments described herein and plotted as a function of pressure. The plate separation can be 3 cm. As can be seen in FIG. 3N the system is on the right side of the Paschen curve. This is important because as pressure increases, so does the breakdown voltage. As a note, the measured breakdown voltage was compared to published breakdown voltages and was found to be 8% higher. This could be due to a number of possible factors, such as slight composition changes, humidity or temperature. The error is not significant enough for this work to investigate further.

The presently designed and enabled system creates pulses of stable constricted plasma in the form of a glow discharge. Many characteristics of the discharge can be controlled, including pressure, pulse rate, pulse width, and peak current.

The underlying approximations of the theory of enabled formation of normalized curves which identify the parameter space leading to a pinched glow discharge are observed and justified. This has been done with simple particle collision studies. The theory has been applied to multi-pulsed glow discharges with small duty cycles and ambient pressures at 2 Torr and 10 Torr. Further, different regimes of the transient nature of the discharge are identified based on discharge voltage, current, and energy measurements recorded herein.

Beam Collision Studies, Sheath Discussions, and Transient Current Observations

The beam can be assumed to propagate through the system without suffering a significant number of large angle collisions. Consequently, the collisional properties of a pulsed glow discharge can be delineated. An estimate of the electron beam's ability to initiate and sustain background electron beam repulsion leading to closure and a pinch condition is examined A very simple, crude, inelastic binary collision model following the collision cascade in one dimension based solely on the beam's initial drift energy has been developed to aid in the study.

In experiment, the initial discharge voltage is much larger than the steady state or near steady state voltage. Typically, a 500 ns discharge voltage fall time results as the discharge voltage approaches an equilibrium state, shown in FIG. 3M. The number of beam electrons available to the pinch is dictated by the discharge potential or the breakdown voltage and the capacitance of the discharge electrode assembly just prior to breakdown. Within the fall time duration, pinch formation is visibly noticeable. This implies that the pinch time is less than the fall time.

Within a Monte Carlo purview and the validity of this simple model, it is intended to show that the beam electrons can have the potential to yield a pinch condition. Elastic collisions are treated as inelastic collisions for simplicity. Since the number of charges is large, small angle collisions are more prominent than large angle collisions implying that the electron can exhibit a nearly straight line trajectory until an inelastic collision occurs. To account for all collisions, at energies up to and including 100 eV, the total cross section for the nitrogen molecule is used. At energies greater than 100 eV only the ionization cross section is used since the total collision cross section approaches that of the ionization cross section.

The maximum energy loss due to the kinetic energy gain of next generation background charges is 15 eV based on other's estimates. The first ionization potential of atomic nitrogen is the energy threshold lost in the inelastic energy collision. Although it is a weak assumption to impose that all collisions are in the forward direction since the electron is much lighter than the ion, boundary conditions impose that the electric field between parallel plate electrodes is tangential to the to the pinch column and hence must penetrate the column. Consequently, this electric field helps to motivate the average drift direction.

As breakdown evolves inside the gas initiated by a number of mechanisms, electrons and ions are generated and the ionized gas begins to form a plasma with its special shielding properties. The potential difference forms across the sheath thereby increasing the electric field strength. If the electric field is high enough, some electrons can have high enough energy to overcome the work function of the metal becoming a free charge. Other charges are released by ion collisions with the cathode plate. The released charge gain energy in the relatively short distance of the sheath possibly suffering some collisions in the sheath. Typically, the energy gained exceeds the energy where the collision cross section is a maximum. Consequently, as pressure increases the probability that a collision occurs can decrease allowing the high energy electron a greater probability of reaching the anode with substantial energy suitable for initiating and sustaining a pinch.

Figure 4A:
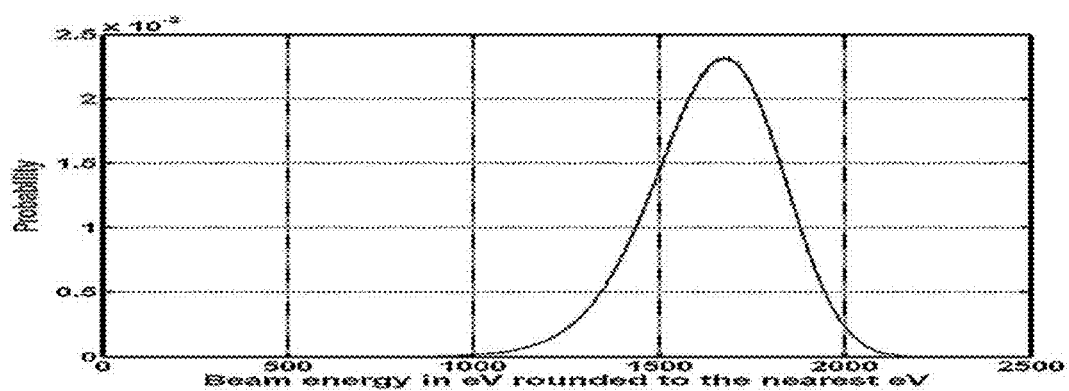
FIGS. 4A-D illustrates averaged probability mass function based on 100 simulations characterizing the discrete energy probability that beam electrons can have upon drifting the distance between the plates.
Figure 4B:
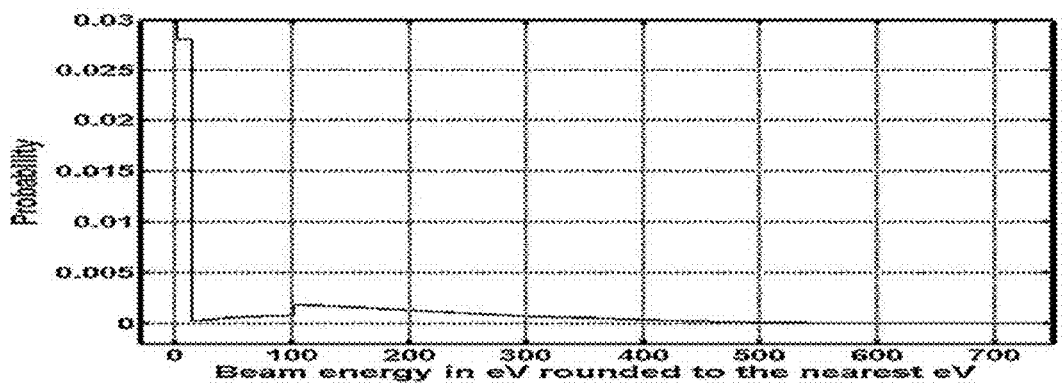

The probability mass function (PMF) averaged over 100 simulations for pressures at 10 Torr (2.5 keV initial electrode discharge voltage) FIG. 4A and 2 Torr (750 eV initial electrode discharge voltage) FIG. 4B is examined. The 3 cm distance of separation between the electrode parallel plates is the approximate distance traversed by the beam in FIG. 4A and FIG. 4B. When the ambient pressure is 10 Torr about half of the electron population has over half of its initial energy by the time it reaches the anode along a straight line path. In this case, a well defined pinch will form. The electron beam energy in the 2 Torr case is nearly expended by the time the beam reaches the anode. In this case, a defined pinch does nearly expended by the time the beam reaches the anode. There is not enough energy for pinch formation. Instead, a dispersed plasma will be generated about the electrode cross section. All collisions are treated as inelastic collisions between electrons and $N_2$ gas molecules based on the total collision cross section for electron energies from 0 to 100 eV and only electron-impact ionization cross section for electron energies greater that 100 eV.

The collision simulations are based on the assumption that the electron beam can accelerate fully through the sheath and enter the remainder of the plasma with an initial energy based on the full potential difference of the sheath. So, the sheath properties of the experiment need to be discussed, in order to check the validity of this model.

Figure 4C:
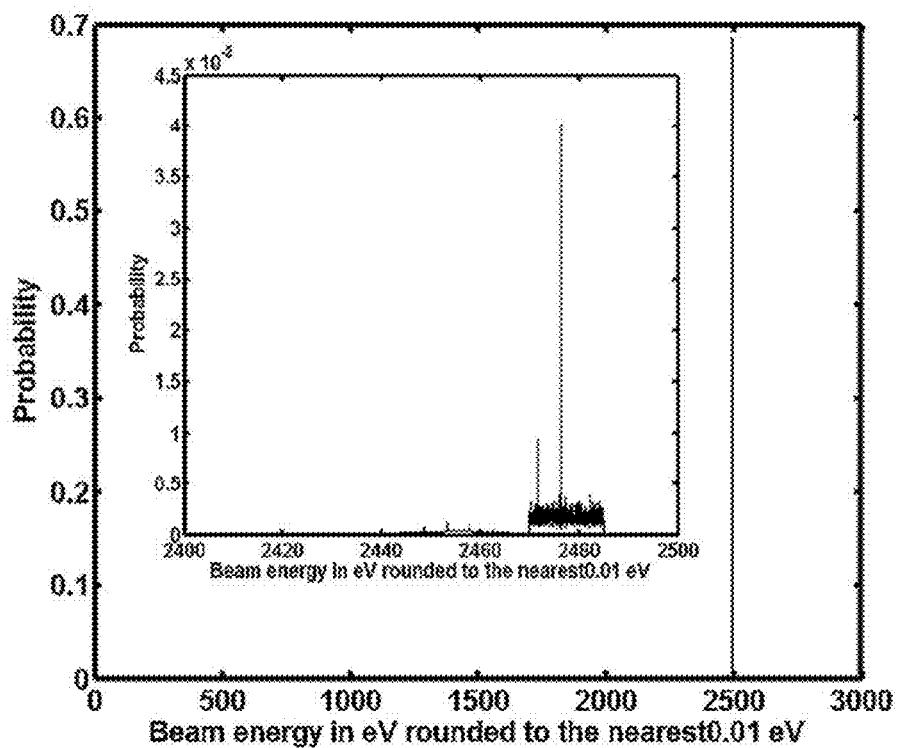
Figure 4D:
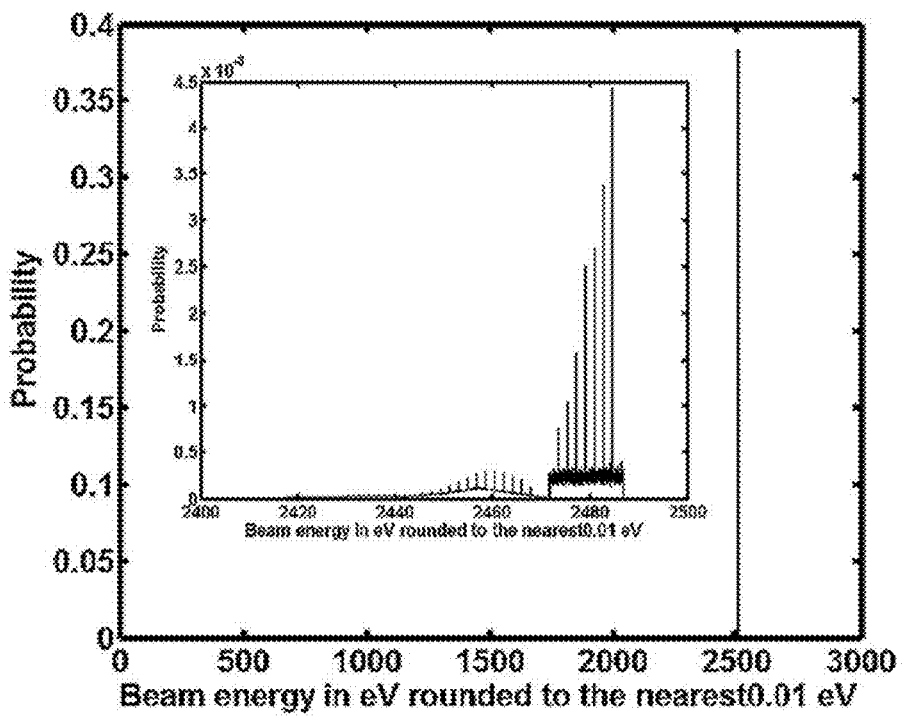

Similar to the collision cascade study through the plasma like medium of the discharge, a collision cascade study for the secondary electrons starting at rest at the cathode was examined treating all collisions as inelastic even though the total collision cross section was used for incident electron energies less than and equal to 100 eV. The simulation was modified to include the intense electric field that resides in the cathode sheath after sheath formation. Typically, the electrons suffer between 0 to 3 collisions in the dark space region with nearly 70% (0.1 mm dark space thickness), as shown in FIG. 4C and 40% (0.25 mm dark space thickness) as shown in FIG. 4D not suffering a collision as they pass through the sheath region. Because the cathode dark space region is not measurable at the higher pressure even though the negative glow covers a small fraction of the plates' surface, it is anticipated that better than 70% of the accelerating electrons can enter the plasma-like discharge with kinetic energy equal to the full potential energy of the sheath. Further, beam dynamics at the cathode sheath are more significant than at the anode sheath since the potential difference across the anode sheath is small typically with the plasma being the higher potential. Energy and current contributions in the anode region are assumed small compared to that in the cathode region.

The picture that the beam simulation paints is this: before sheath formation, the electric field can be low and nearly constant between the plates. This causes the beam electrons to be low in energy and the collision cross section to be relatively large. Electron beam collisions cannot be neglected in this case, and the three-fluid theory as presented cannot be applied. After sheath formation, the electric field in the sheath can be extremely high and a large majority of the electrons do not suffer a collision in this region. This large majority can enter the plasma region with the full potential difference of the sheath. At these high energies, the collision cross section is very low and most of the beam particles can retain a majority of their energy. In this case, collisions can be neglected and the theory as developed can be applied without violating any assumptions. The sheath formation time can be extracted from the measured current form. Therefore, the theory can be applied at the point in time at which the current changes slope as shown in FIG. 3M. As a final note, the simulation results of the collision cascade at low pressures were poor and so the application of the theory at low pressures is doubtful. However no pinch is seen at these pressures, so this is not a limitation.

Expected Behavior of the Discharge from Theoretical and Experimental Arguments

Initially at the start of the discharge, the potential difference between the plates is determined by a Paschen curve voltage dependent on gas type, gas pressure and plate separation. The Paschen curve breakdown voltage has a minimum point for a particular gas pressure (P), plate separation product (d); $(Pd)_{min}$. When the $Pd > (Pd)_{min}$ (operating on the right side of the knee of the Paschen curve), the breakdown voltage rises. This is a consequence of the charge particle favorably suffering many collisions but never have enough time to accelerate to high enough energies to perform significant ionization. As a result, an avalanche threshold for the collision cascade is not achieved and closure does not result.

Once breakdown does occur, it is anticipated that the breakdown processes can be observed in the transient nature of the formation of the discharge. The impedance nature of the discharge changes since the nature of the discharge changes. This results in a noticeable change in the rate of the discharge current. Qualitatively, the current rises slowly in the initial formation of the discharge and abruptly changes to a much faster rise time due to an increase in ion bombardment at the cathode and therefore an increase in secondary electron emission from the newly formed sheath. The abrupt change in the loading effects of the system is seen in transient current measurements as shown in FIG. 3M. Therefore the sheath formation time can be extracted by measuring the transient current.

Initially, the generated charge cannot accelerate to high energies because the gas density is too high. After the sheath forms, shielding effects can become significant and the voltage drop should be concentrated in this region. Because of this shielding effect, sheath formation allows for charges to accelerate to higher energies over shorter distances since the mean free paths become comparable to the sheath distance. This allows the majority of electrons that are emitted at the cathode (through secondary electron emission) to accelerate through the entire potential change without suffering collision. The small length of the sheath cannot be observed with the naked eye. The cathode sheath lies between the cathode electrode and the negative glow region. Typically, the negative glow region for glow discharges at high pressure (3-20 Torr) can be a very bright, relatively large diameter, thin disk located almost on the cathode electrode.

Experimentally, the discharge voltage retains its high transient value in the regime of the steep current rate. This suggests that the electrons injected into the plasma region do have a large initial energy nearly equal to that of the plasma discharge voltage measured across the plate electrodes since the typical DC glow architecture is nearly quasineutral in the positive plasma column, negative glow region, and the Faraday dark space region. The high energy (secondary) electrons injected in the glow have a lower probability of suffering collisions as they drift in the plasma column. A percentage can be lost to the plasma medium to sustain the plasma. The remainder of the continuously replenished beam can repel the background electrons until the nearly stationary ions begin to form the electron channel. The self magnetic field can aid in the focusing process. As the discharge potential drops, this in turn results in a shift in the forth coming secondary electron beam energy. The probability of ionization collision becomes greater and eventually the discharge is extinguished until the discharge electrode potential builds up to the Paschen voltage or some breakdown voltage that may be lower since the discharge may have some residual charge present.

In an aspect, the radius of the pinched plasma discharge is smaller (even as much as an order of magnitude) compared to the radius of the negative discharge glow. Further, the glow is not an arc discharge. Moreover, the glow tends to establish its formation away from the edges of the plate electrodes where electric field enhancement tends to exist. If the duty factor of the pulsing network is not too low, a sequence of pulse discharges can form in nearly the same location as the previous discharge. The persistent nature of the discharge can on occasion remain stabilized in a localized region or the discharge can creep along the plate surface. The discharge geometry tends to exhibit a cylindrical to conical shape. The later shape tends to have a smaller diameter near the center of the discharge. Drifting or creep tends to occur more often when the plates have just been polished.

An actual structure of a device effecting the pulse protection on a standard electronic device may be described as:

An electronic system comprising an external source (e.g., antenna, electrical outlet) or an external load (e.g., electrical, electromagnetic, optical, electro-mechanical, mechanical devices) and the electronics being protected, and positioned between the source or load and the electronics is a plasma disrupter device to protect the electronics against electromagnetic pulse coupled to wires leading to the electronics, the plasma disrupter device comprises a gas pressurized waveguide or grounded metallic box or suitable Faraday shield fully or partially enclosing one or two opposed pairs of electrodes, a first pair of opposed electrodes having a ground connection on one electrode of the first pair and a high bias voltage applied the second electrode of the first pair of opposed electrodes, and, if required, the second pair of opposed electrodes in series between the external source or load and the electronics being protected. The gas pressurized waveguide or grounded metallic box or suitable Faraday shield can operate as pressures approximately between 3 Torr and 20 Torr. In an aspect, to assist in tuning and observing functional aspects of the plasma disruptor device, a housing containing possibly the waveguide and the electrodes can have a plurality of RF transparent windows. Upon interception of an electromagnetic pulse that would otherwise damage, if not destroy the electronic circuitry, the plasma disrupter device is auto-triggered as an electromagnetic surge impacts the first electrode pair when biased. As an example, the electronic device can comprise computers, video equipment, broadcasting equipment, medical equipment, electric locomotives, receivers, transmitters, radios, cell phones, broadcast towers, and the like.

Theory and experiment were constructed about a unique, stable, center seeking plasma pinch based upon electron beam channeling, charge neutralization, and self-magnetic mechanisms. A parameter space dependent on the electron beam and plasma characteristics was obtained that identifies the conditions that lead to pinch.

Image Processing Code and Results

Figure 5A:
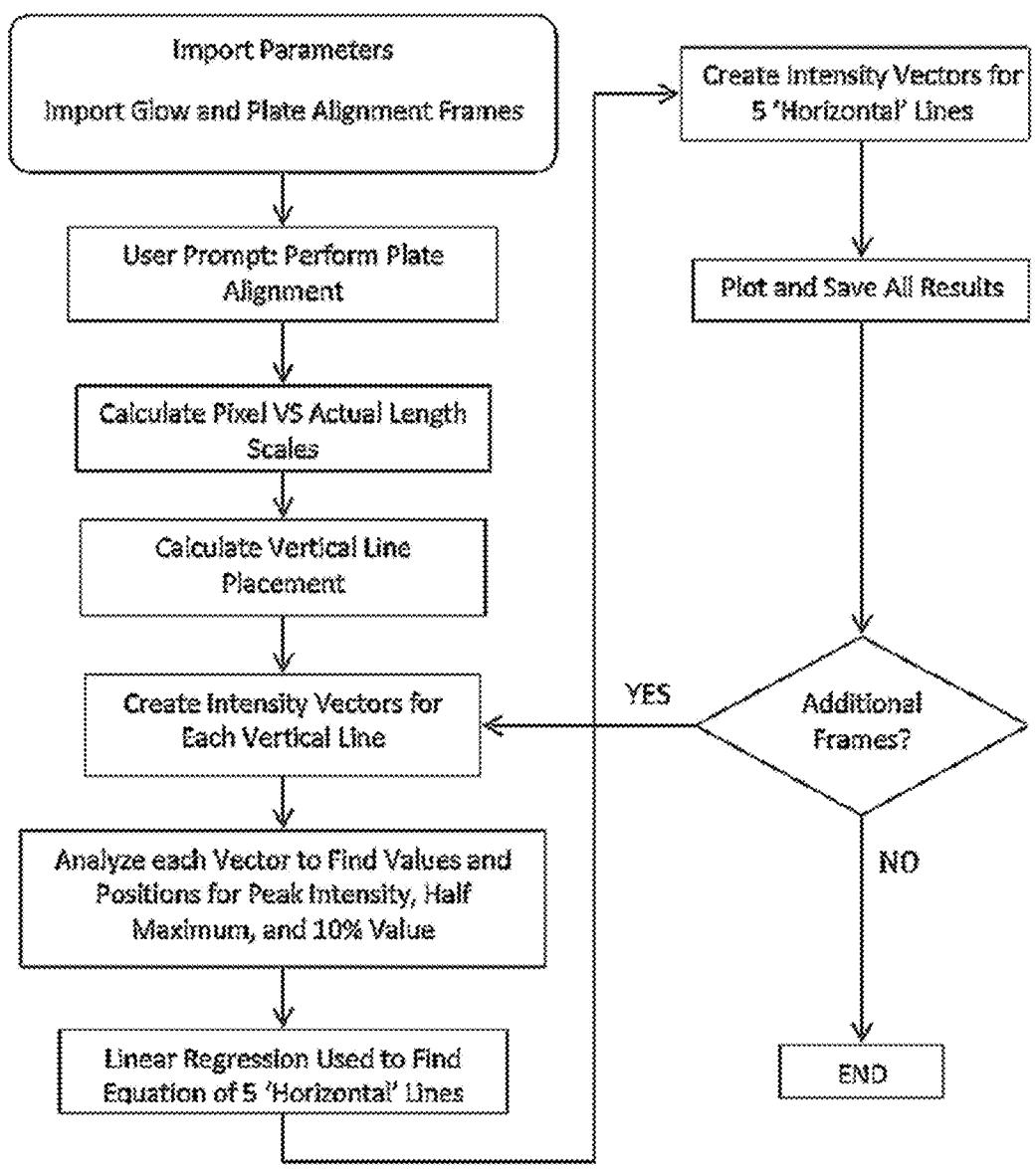
FIG. 5A is a flow chart for image processing code.

An image processing code developed with MATLAB assesses the optical photographs of the glow discharge. FIG. 5A contains a flow chart of the code developed. A typical pulsed discharge to be evaluated is pictured in FIG. 5B. FIG. 5C provides a reference view of the electrodes when the experiment is illuminated with an external light source. The intensity of the discharge is evaluated along a number of straight line paths to characterize the glow discharge captured electronically. As illustrated in FIG. 5D, the numerous vertical slices of the discharge that were evaluated allows for a study on the uniformity of both the discharge radius and the discharge intensity along the discharge. FIG. 5E illustrates examples of the image processing code output plots. The top plots (5E-1)-(5E-22) are intensity plots along the vertical lines. Plots (5E-23)-(5E-27) are the intensity plots along the horizontal lines. Finally, the pinch diameter FWHM is plotted as a function of z in plot (5E-28). Maximum diameter near z=0 is due to the negative glow region, which is larger in dimension than the pinched positive column.

In an aspect, this code can be modified to observe a drift or curve in the plasma column. The center of the light intensity is measured from cathode to anode and plotted as a function of distance. This extracts any change in height due to magnetic field steering. The light intensity is measured along a cross section of the image (along a vertical line) and after subtracting the noise level, the center of light intensity is calculated similar to a center of mass calculation.

$$y_0(x = const) = \frac{1}{\int_0^\infty I(x = const, y)dy} * \int_0^\infty y * I(x = const, y)dy \quad (3.1)$$

Figure 5B:
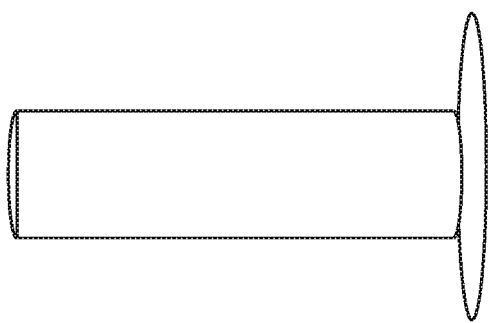
FIG. 5B is an example frame of equilibrium pinch.
Figure 5C:
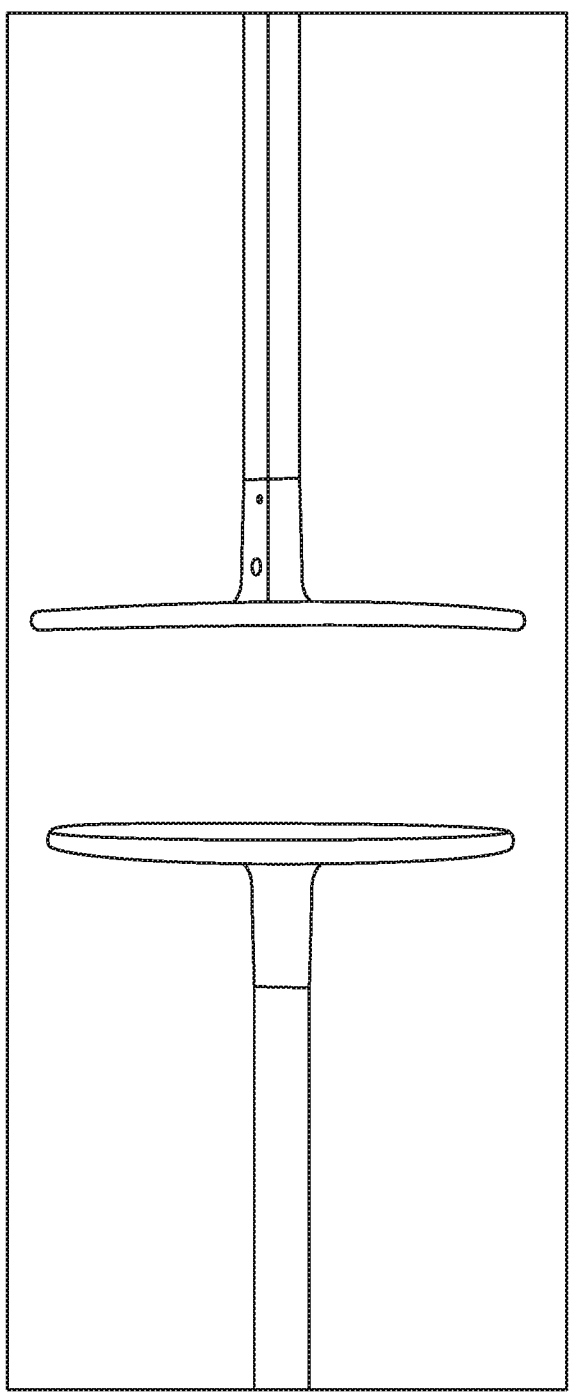
FIG. 5C illustrates an example frame used for plate alignment.
Figure 5D:
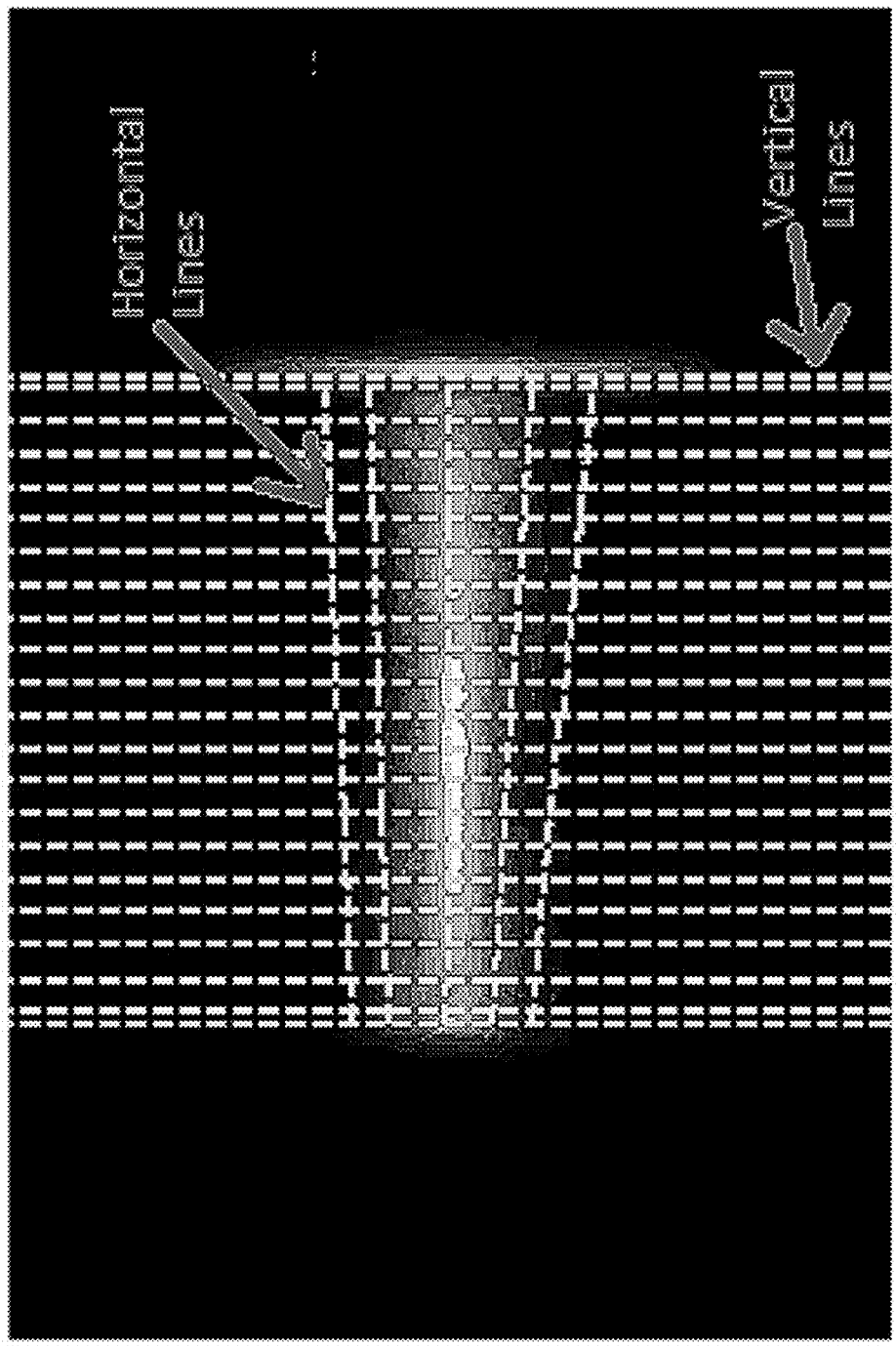
FIG. 5D is a plot showing line placement used for analysis.
Figures 1, 5E:
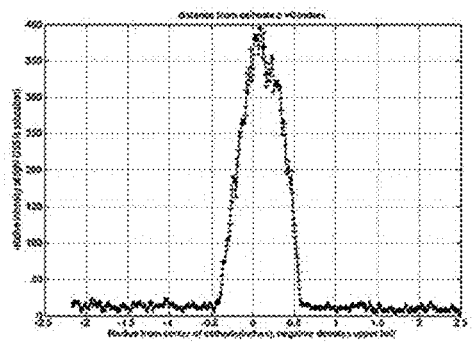
Figures 2, 5E:
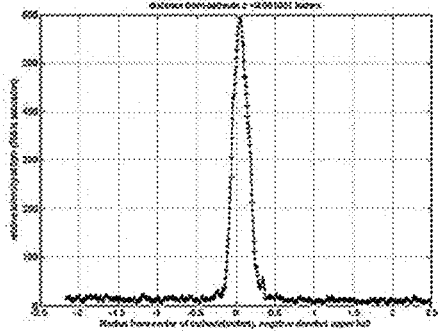
Figures 3, 5E:
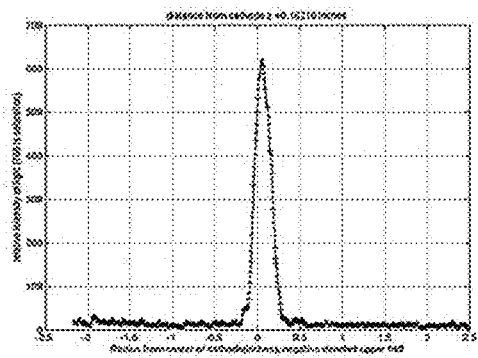
Figures 4, 5E:
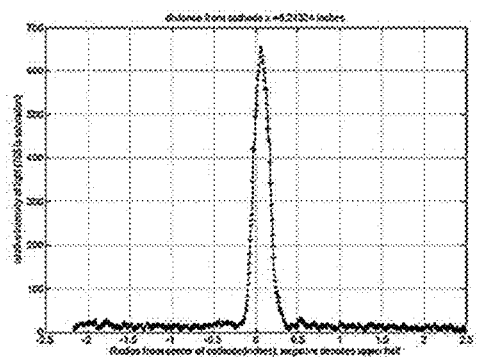
Figures 5, 5E:
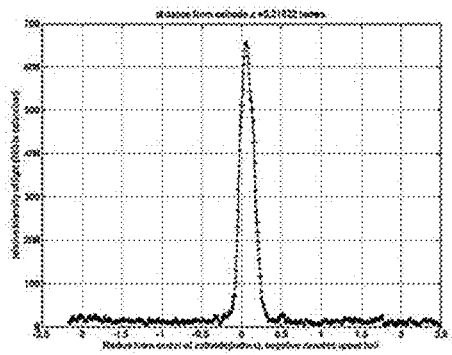
Figures 5, 5E, 6:
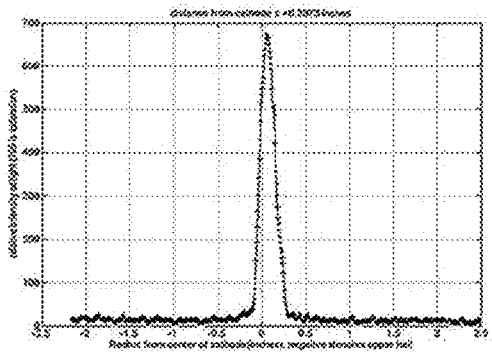
Figures 5, 5E, 6, 7:
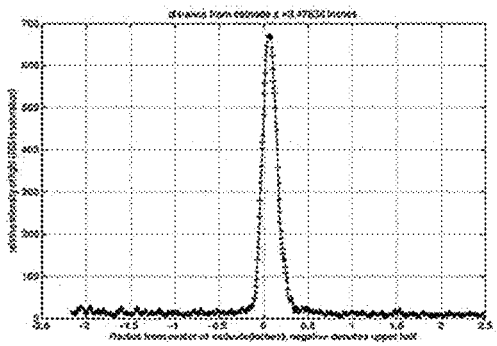
Figures 5, 5E, 6, 7, 8:
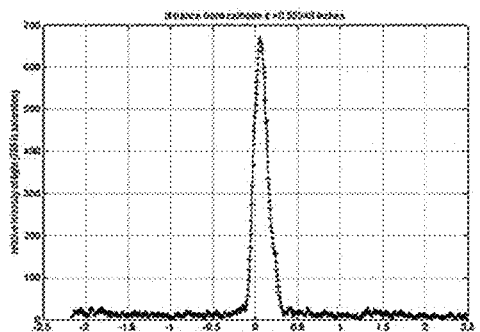
Figures 5, 5E, 6, 7, 8, 9:
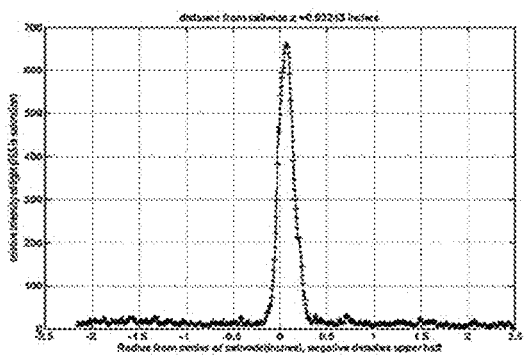
Figures 5, 5E, 6, 7, 8, 9, 10:
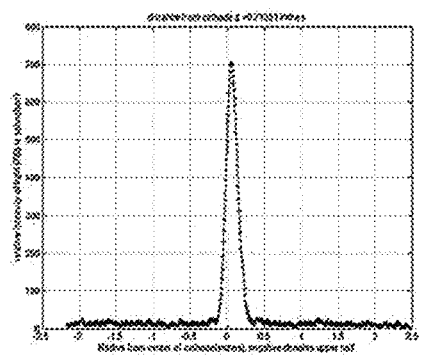
Figures 5, 5E, 6, 7, 8, 9, 10, 11:
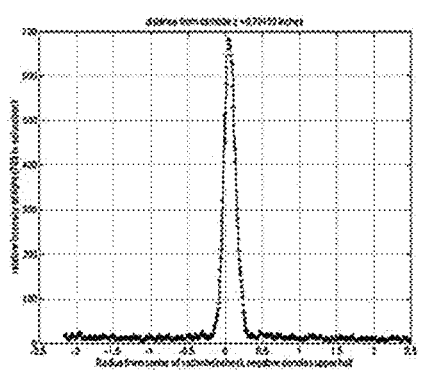
Figures 5, 5E, 6, 7, 8, 9, 10, 11, 12:
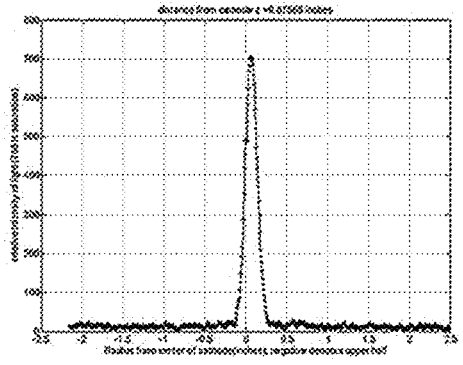
Figures 5, 5E, 6, 7, 8, 9, 10, 11, 12, 13:
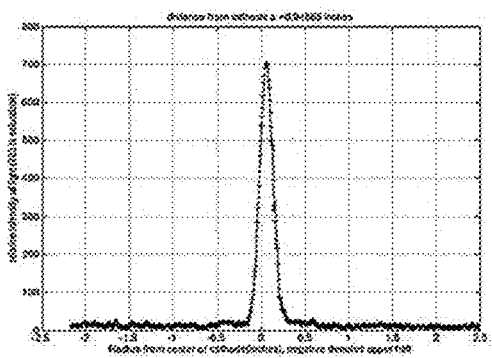
Figures 5, 5E, 6, 7, 8, 9, 10, 11, 12, 13, 14:
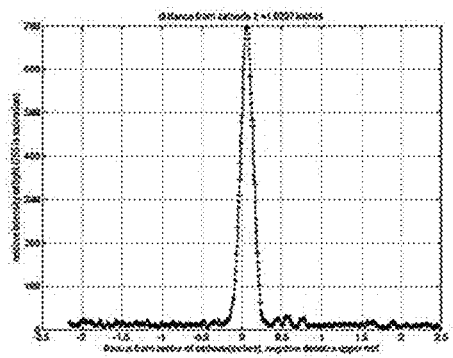
Figures 5, 5E, 6, 7, 8, 9, 10, 11, 12, 13, 14, 15:
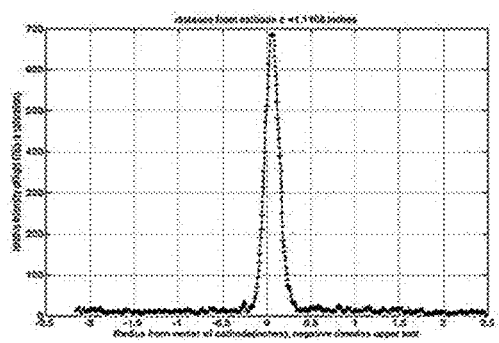
Figures 5, 5E, 6, 7, 8, 9, 10, 11, 12, 13, 14, 15, 16:
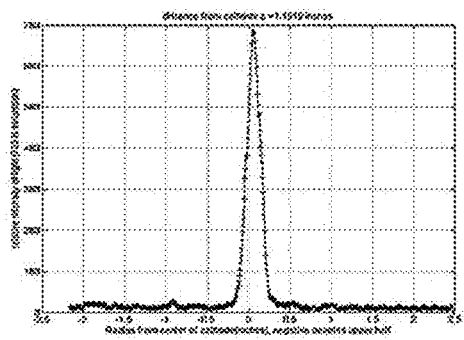
Figures 5, 5E, 6, 7, 8, 9, 10, 11, 12, 13, 14, 15, 16, 17:
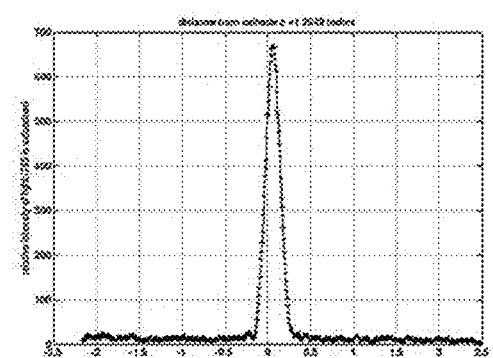
Figures 5, 5E, 6, 7, 8, 9, 10, 11, 12, 13, 14, 15, 16, 17, 18:
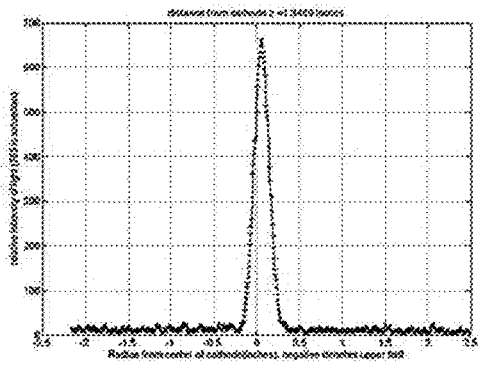
Figures 5, 5E, 6, 7, 8, 9, 10, 11, 12, 13, 14, 15, 16, 17, 18, 19:
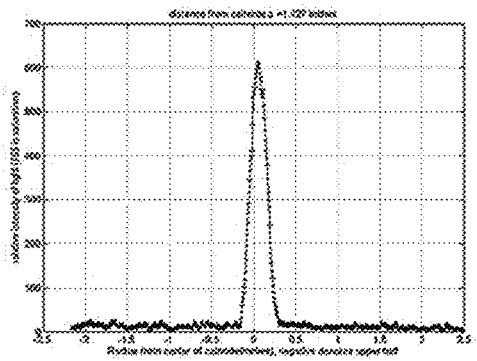
Figures 5, 5E, 6, 7, 8, 9, 10, 11, 12, 13, 14, 15, 16, 17, 18, 19, 20:
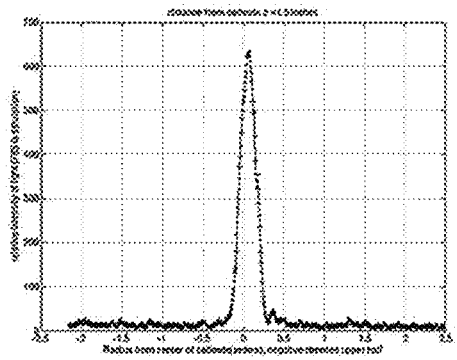
Figures 5, 5E, 6, 7, 8, 9, 10, 11, 12, 13, 14, 15, 16, 17, 18, 19, 20, 21:
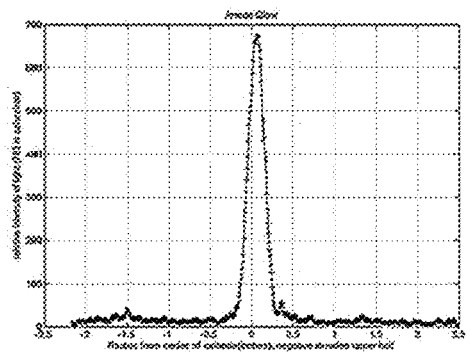
Figures 5, 5E, 6, 7, 8, 9, 10, 11, 12, 13, 14, 15, 16, 17, 18, 19, 20, 21, 22:
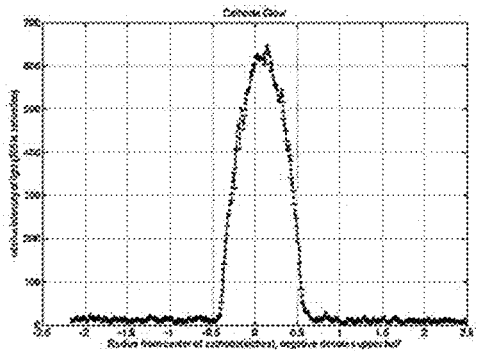
Figures 5, 5E, 6, 7, 8, 9, 10, 11, 12, 13, 14, 15, 16, 17, 18, 19, 20, 21, 22, 23:
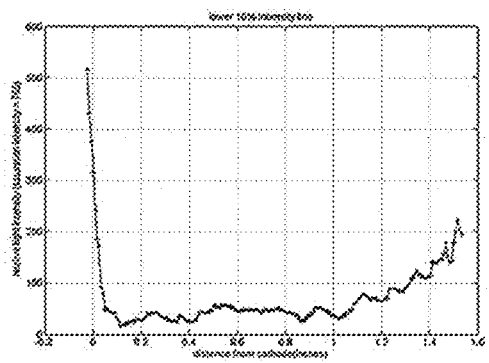
Figures 5, 5E, 6, 7, 8, 9, 10, 11, 12, 13, 14, 15, 16, 17, 18, 19, 20, 21, 22, 23, 24:
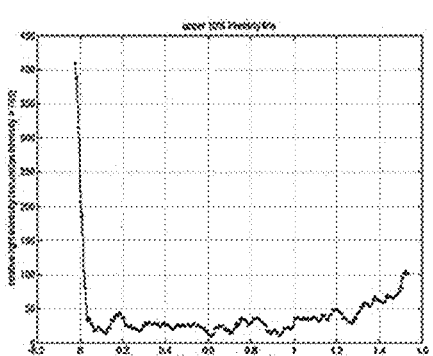
Figures 5, 5E, 6, 7, 8, 9, 10, 11, 12, 13, 14, 15, 16, 17, 18, 19, 20, 21, 22, 23, 24, 25:
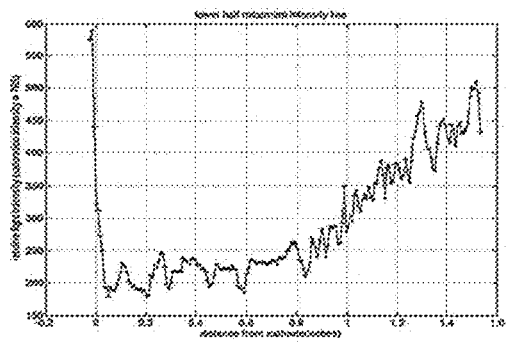
Figures 5, 5E, 6, 7, 8, 9, 10, 11, 12, 13, 14, 15, 16, 17, 18, 19, 20, 21, 22, 23, 24, 25, 26:
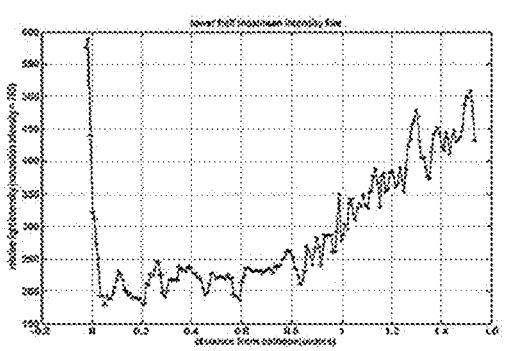
Figures 5, 5E, 6, 7, 8, 9, 10, 11, 12, 13, 14, 15, 16, 17, 18, 19, 20, 21, 22, 23, 24, 25, 26, 27:
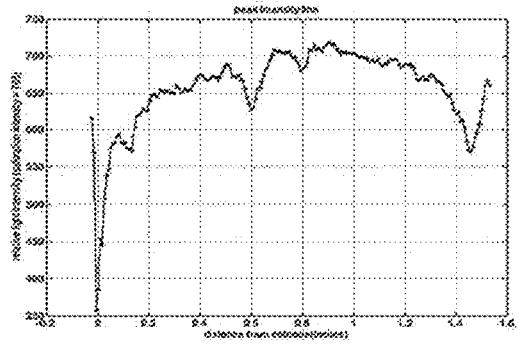
Figures 5, 5E, 6, 7, 8, 9, 10, 11, 12, 13, 14, 15, 16, 17, 18, 19, 20, 21, 22, 23, 24, 25, 26, 27, 28:
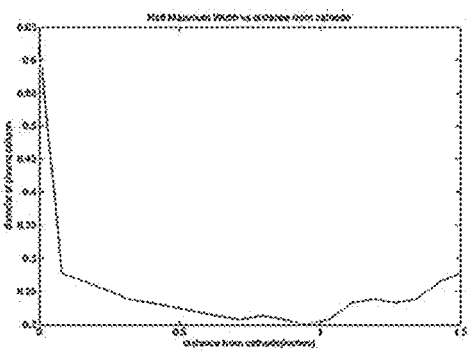

The parameters leading to the results in FIGS. 5B and 5E are listed in Table 5.1.

TABLE 5.1

Conditions of the glow discharge used in this example.

| | |
|---|---|
| Ballast Resistance | 377 Ω |
| Pressure | 14.5 Torr |
| Capacitance | 165 pF |
| Voltage Supply | 4.5 kV |
| Peak Current | 1427 mA |
| Pulse Width | 1.5 μs |
| Time Between Pulses | 2 ms |

Pinch Radius Studies: Full Data Table

Below in Table D.1 is a list of the experimental data that was used in the above descriptions. The first column is the pressure of the discharge tube in Torr. The second column is the ballast resistance. Column three is the capacitor bank capacitance. The fourth column ($V_b$) corresponds to the maximum voltage read on the oscilloscope. This is also the voltage at the first sign of electrical discharge. The fifth column ($V_{neg}$) is the negative voltage that the discharge tube swings to after discharge. The sixth column is the peak current of the discharge. The pulse width, in column seven, is the approximate pulse width, estimated by visually estimating the start and stop time of the current pulse on the oscilloscope. In column eight, pulse rate is found by visually estimating the time between consecutive discharges and inverting. For column nine, the image processing results are observed, and the pinch diameter at the very midpoint of the discharge (midpoint between cathode and anode) is recorded. Lastly, column ten, the peak digital intensity is found by observing the peak intensity plot and recording the peak digital value along the discharge (neglecting the negative column and anode glow).

TABLE D.1

List of the experimental data used

| Pressure (Torr) | $R_b$ (Ωa) | Co (pF) | $V_b$ (V) | $V_{neg}$ (V) | Io (mA) | Pulse Width (us) | Pulse Rate (Hz) | Midpoint Diameter FWHM (inches) | Peak Intensity (digital) |
|---|---|---|---|---|---|---|---|---|---|
| 2.05 | 510 | 165 | 750 | −250 | 182.65 | 1.5 | 1000 | 2.9 | 50 |
| 2.1 | 377 | 165 | 750 | −250 | 222.6 | 1.5 | 1000 | 2.8 | 60 |
| 3.06 | 377 | 165 | 1000 | −400 | 319.63 | 1.5 | 1000 | 1.6 | 110 |
| 3.15 | 510 | 165 | 1000 | −400 | 256.85 | 1.5 | 1000 | 1.35 | 100 |
| 4 | 510 | 165 | 1200 | −500 | 313.93 | 1.5 | 909.091 | 0.8 | 130 |
| 4 | 377 | 165 | 1200 | −500 | 399.54 | 1.5 | 909.091 | 0.86 | 130 |
| 4.5 | 377 | 165 | 1250 | −600 | 456.62 | 1.5 | 666.667 | 0.75 | 160 |

TABLE D.1-continued

List of the experimental data used

| Pressure (Torr) | $R_b$ (Ωa) | Co (pF) | $V_b$ (V) | $V_{neg}$ (V) | Io (mA) | Pulse Width (us) | Pulse Rate (Hz) | Midpoint Diameter FWHM (inches) | Peak Intensity (digital) |
|---|---|---|---|---|---|---|---|---|---|
| 4.5 | 510 | 165 | 1250 | −600 | 342.47 | 1.5 | 666.667 | 0.75 | 155 |
| 5 | 510 | 165 | 1500 | −750 | 399.54 | 1.5 | 555.556 | NR | NR |
| 5 | 377 | 165 | 1500 | −750 | 527.97 | 1.5 | 555.556 | NR | NR |
| 5.5 | 377 | 165 | 1700 | −800 | 599.32 | 1.5 | 454.545 | 0.5 | 225 |
| 5.5 | 510 | 165 | 1700 | −800 | 456.62 | 1.5 | 454.545 | 0.53 | 225 |
| 5.75 | 510 | 165 | 1700 | −800 | 485.16 | 1.5 | 400 | 0.48 | 210 |
| 5.75 | 377 | 165 | 1700 | −800 | 627.85 | 1.5 | 400 | 0.52 | 250 |
| 6 | 377 | 165 | 1800 | −1000 | 713.47 | 1.5 | 312.5 | 0.5 | 225 |
| 6 | 510 | 165 | 1800 | −1000 | 542.24 | 1.5 | 333.333 | 0.46 | 200 |
| 6.35 | 510 | 165 | 2000 | −1000 | 570.78 | 1.5 | 500 | 0.39 | 375 |
| 6.35 | 377 | 165 | 2000 | −1000 | 799.09 | 1.5 | 500 | 0.42 | 400 |
| 7 | 377 | 165 | 2100 | −1250 | 856.16 | 1.5 | 454.545 | 0.41 | 375 |
| 7 | 510 | 165 | 2100 | −1250 | 627.85 | 1.5 | 454.545 | 0.4 | 350 |
| 8 | 510 | 165 | 2250 | −1250 | 684.93 | 1.5 | 333.333 | 0.38 | 360 |
| 8 | 377 | 165 | 2250 | −1250 | 913.24 | 1.5 | 333.333 | 0.38 | 400 |
| 9 | 377 | 165 | 2400 | −1500 | 998.86 | 1.5 | 500 | 0.3 | 525 |
| 9 | 510 | 165 | 2400 | −1500 | 742.01 | 1.5 | 500 | 0.3 | 500 |
| 10 | 510 | 165 | 2500 | −1500 | 799.09 | 1.5 | 454.545 | 0.28 | 500 |
| 10 | 377 | 165 | 2500 | −1500 | 1141.6 | 1.5 | 454.545 | 0.29 | 540 |
| 14.5 | 377 | 165 | 3000 | −1800 | 1426.9 | 1.5 | 500 | 0.22 | 700 |
| 14.5 | 510 | 165 | 3000 | −1800 | 998.86 | 1.5 | 500 | 0.22 | 700 |
| 20.2 | 510 | 165 | 3500 | −2200 | 1284.2 | 1.5 | 333.333 | 0.17 | 675 |
| 20.2 | 377 | 165 | 3500 | −2200 | 1855 | 1.5 | 333.333 | 0.17 | 700 |
| 2 | 247 | 165 | 800 | −300 | 199.77 | 1.5 | 333.333 | 3 | 35 |
| 2.1 | 166 | 165 | 800 | −300 | 256.85 | 1.5 | 333.333 | 3.5 | 30 |
| 3.05 | 166 | 165 | 1000 | −500 | 353.88 | 1.5 | 333.333 | 2.2 | 40 |
| 3.1 | 247 | 165 | 1000 | −500 | 291.1 | 1.5 | 333.333 | 1.8 | 50 |
| 4 | 247 | 165 | 1200 | −600 | 371 | 1.5 | 333.333 | 1.5 | 50 |
| 4 | 166 | 165 | 1200 | −600 | 445.21 | 1.5 | 333.333 | 1.1 | 60 |
| 4.5 | 166 | 165 | 1250 | −700 | 502.28 | 1.5 | 333.333 | 1.1 | 90 |
| 4.5 | 247 | 165 | 1250 | −700 | 428.08 | 1.5 | 333.333 | 1.1 | 80 |
| 5 | 247 | 165 | 1400 | −800 | 485.16 | 1.5 | 333.333 | 0.9 | 100 |
| 5 | 166 | 165 | 1400 | −800 | 570.78 | 1.5 | 333.333 | 0.7 | 100 |
| 5.5 | 166 | 165 | 1600 | −1000 | 684.93 | 1.5 | 333.333 | 0.7 | 160 |
| 5.5 | 247 | 165 | 1600 | −1000 | 570.78 | 1.5 | 333.333 | 0.7 | 150 |
| 5.77 | 247 | 165 | 1700 | −1000 | 627.85 | 1.5 | 333.333 | 0.5 | 175 |
| 5.78 | 166 | 165 | 1700 | −1000 | 730.59 | 1.5 | 333.333 | 0.5 | 160 |
| 6 | 166 | 165 | 1800 | −1100 | 799.09 | 1.5 | 333.333 | 0.53 | 220 |
| 6 | 247 | 165 | 1800 | −1100 | 684.93 | 1.5 | 333.333 | 0.55 | 220 |
| 6.38 | 247 | 165 | 2000 | −1200 | 742.01 | 1.5 | 333.333 | 0.5 | 220 |
| 6.4 | 166 | 165 | 2000 | −1200 | 856.16 | 1.5 | 333.333 | 0.5 | 240 |
| 7.05 | 166 | 165 | 2100 | −1300 | 970.32 | 1.5 | 333.333 | 0.43 | 320 |
| 7.05 | 247 | 165 | 2100 | −1300 | 799.09 | 1.5 | 333.333 | 0.43 | 300 |
| 8.2 | 247 | 165 | 2300 | −1400 | 856.16 | 1.5 | 333.333 | 0.36 | 380 |
| 8.2 | 166 | 165 | 2300 | −1400 | 998.86 | 1.5 | 333.333 | 0.37 | 440 |
| 9 | 166 | 165 | 2400 | −1500 | 1084.5 | 1.5 | 333.333 | 0.35 | 450 |
| 9 | 247 | 165 | 2400 | −1500 | 913.24 | 1.5 | 333.333 | 0.35 | 430 |
| 10 | 247 | 165 | 2500 | −1500 | 998.86 | 1.5 | 333.333 | 0.3 | 500 |
| 10 | 166 | 165 | 2500 | −1500 | 1198.6 | 1.5 | 333.333 | 0.3 | 500 |
| 12 | 166 | 165 | 2750 | −1800 | 1369.9 | 1.5 | 333.333 | 0.26 | 550 |
| 12 | 247 | 165 | 2750 | −1800 | 1141.6 | 1.5 | 333.333 | 0.25 | 525 |
| 15 | 247 | 165 | 3000 | −2000 | 1369.9 | 1.5 | 333.333 | 0.23 | 580 |
| 15 | 166 | 165 | 3000 | −2000 | 1541.1 | 1.5 | 333.333 | 0.23 | 600 |
| 16.8 | 166 | 165 | 3200 | −2200 | 1826.5 | 1.5 | 333.333 | 0.19 | 690 |
| 16.8 | 247 | 165 | 3200 | −2200 | 1426.9 | 1.5 | 333.333 | 0.19 | 680 |
| 4.02 | 998 | 165 | 1200 | −450 | 228.31 | 2 | 333.333 | 1.2 | 40 |
| 4.02 | 670 | 165 | 1200 | −450 | 313.93 | 2 | 333.333 | 1.1 | 45 |
| 4.5 | 670 | 165 | 1300 | −600 | 371 | 2 | 333.333 | 1.45 | 60 |
| 4.5 | 998 | 165 | 1300 | −600 | 279.68 | 2 | 333.333 | 1 | 55 |
| 5 | 998 | 165 | 1500 | −600 | 296.8 | 2 | 333.333 | 1 | 80 |
| 5 | 670 | 165 | 1500 | −600 | 485.16 | 2 | 333.333 | 0.7 | 100 |
| 5.5 | 670 | 165 | 1600 | −750 | 313.93 | 2 | 333.333 | 0.63 | 120 |
| 5.5 | 998 | 165 | 1600 | −750 | 342.47 | 2 | 333.333 | 0.75 | 110 |
| 6 | 998 | 165 | 1800 | −800 | 399.54 | 2 | 333.333 | 0.65 | 160 |
| 6 | 670 | 165 | 1800 | −800 | 542.24 | 2 | 333.333 | 0.5 | 180 |
| 6.55 | 670 | 165 | 2000 | −1000 | 599.32 | 2 | 333.333 | 0.47 | 200 |
| 6.55 | 998 | 165 | 2000 | −1000 | 399.54 | 2 | 333.333 | 0.44 | 200 |
| 7.05 | 998 | 165 | 2100 | −1000 | 456.62 | 2 | 333.333 | 0.47 | 240 |
| 7.05 | 670 | 165 | 2100 | −1000 | 627.85 | 2 | 333.333 | 0.45 | 250 |
| 7.55 | 670 | 165 | 2200 | −1100 | 656.39 | 2 | 333.333 | 0.47 | 275 |
| 7.55 | 998 | 165 | 2200 | −1100 | 456.62 | 2 | 333.333 | 0.47 | 250 |
| 8.1 | 998 | 165 | 2250 | −1100 | 456.62 | 2 | 333.333 | 0.38 | 290 |
| 8.1 | 670 | 165 | 2250 | −1100 | 684.93 | 2 | 333.333 | 0.42 | 280 |

TABLE D.1-continued

List of the experimental data used

| Pressure (Torr) | $R_b$ (Ωa) | Co (pF) | $V_b$ (V) | $V_{neg}$ (V) | Io (mA) | Pulse Width (us) | Pulse Rate (Hz) | Midpoint Diameter FWHM (inches) | Peak Intensity (digital) |
|---|---|---|---|---|---|---|---|---|---|
| 9 | 670 | 165 | 2400 | −1250 | 713.47 | 2 | 333.333 | 0.36 | 340 |
| 9 | 998 | 165 | 2400 | −1250 | 485.16 | 2 | 333.333 | 0.37 | 325 |
| 10 | 998 | 165 | 2500 | −1250 | 525.11 | 2 | 333.333 | 0.33 | 400 |
| 10 | 670 | 165 | 2500 | −1250 | 770.55 | 2 | 333.333 | 0.32 | 410 |
| 12 | 670 | 165 | 2800 | −1500 | 856.16 | 2 | 333.333 | 0.26 | 500 |
| 12 | 998 | 165 | 2800 | −1500 | 627.85 | 2 | 333.333 | 0.25 | 475 |
| 15.2 | 998 | 165 | 3100 | −1750 | 799.09 | 2 | 333.333 | 0.23 | 550 |
| 15.2 | 670 | 165 | 3100 | −1750 | 1027.4 | 2 | 333.333 | 0.22 | 550 |
| 17 | 670 | 165 | 3200 | −2000 | 1141.6 | 2 | 333.333 | 0.21 | 590 |
| 17 | 998 | 165 | 3200 | −2000 | 913.24 | 2 | 333.333 | 0.19 | 575 |
| 5.05 | 1210 | 165 | 1500 | −600 | 313.93 | 2.2 | 333.333 | 0.8 | 60 |
| 5.05 | 2030 | 165 | 1500 | −600 | 199.77 | 2.2 | 333.333 | 0.8 | 50 |
| 6 | 2030 | 165 | 1700 | −700 | 285.39 | 2.2 | 333.333 | 0.65 | 100 |
| 6 | 1210 | 165 | 1700 | −700 | 399.54 | 2.2 | 333.333 | 0.62 | 110 |
| 7.1 | 1210 | 165 | 2100 | −800 | 456.62 | 2.2 | 333.333 | 0.45 | 200 |
| 7.2 | 2030 | 165 | 2100 | −800 | 371 | 2.2 | 333.333 | 0.42 | 180 |
| 8.1 | 2030 | 165 | 2300 | −900 | 399.54 | 2.2 | 333.333 | 0.42 | 225 |
| 8.1 | 1210 | 165 | 2300 | −900 | 513.7 | 2.2 | 333.333 | 0.43 | 250 |
| 9.2 | 1210 | 165 | 2400 | −1100 | 542.24 | 2.2 | 333.333 | 0.37 | 320 |
| 9.2 | 2030 | 165 | 2400 | −1100 | 450.91 | 2.2 | 333.333 | 0.36 | 275 |
| 10 | 2030 | 165 | 2500 | −1100 | 456.62 | 2.2 | 333.333 | 0.34 | 325 |
| 10 | 1210 | 165 | 2500 | −1100 | 570.78 | 2.2 | 333.333 | 0.33 | 340 |
| 12 | 1210 | 165 | 2800 | −1200 | 684.93 | 2.2 | 333.333 | 0.27 | 450 |
| 12 | 2030 | 165 | 2800 | −1200 | 570.78 | 2.2 | 333.333 | 0.27 | 425 |
| 15.2 | 2030 | 165 | 3100 | −1500 | 742.01 | 2.2 | 333.333 | 0.24 | 500 |
| 15.2 | 1210 | 165 | 3100 | −1500 | 799.09 | 2.2 | 333.333 | 0.23 | 550 |
| 17 | 1210 | 165 | 3400 | −1800 | 856.16 | 2.2 | 333.333 | 0.18 | 560 |
| 17 | 2030 | 165 | 3400 | −1800 | 856.16 | 2.2 | 333.333 | 0.175 | 525 |
| 19.7 | 2030 | 165 | 3800 | −1800 | 998.86 | 2.2 | 333.333 | 0.16 | 575 |
| 19.7 | 1210 | 165 | 3800 | −1800 | 998.86 | 2.2 | 333.333 | 0.17 | 610 |
| 2.05 | 2980 | 165 | 800 | −100 | 62.785 | 2.5 | 1000 | 3 | 30 |
| 2.05 | 2980 | 165 | 800 | −100 | 62.785 | 2.5 | 333.333 | NR | NR |
| 2.1 | 1870 | 165 | 800 | −100 | 114.16 | 2.5 | 1000 | 3 | 35 |
| 2.1 | 1870 | 165 | 800 | −100 | 114.16 | 2.5 | 333.333 | NR | NR |
| 3 | 1870 | 165 | 1000 | −200 | 154.11 | 2.5 | 1000 | 1.5 | 50 |
| 3 | 1870 | 165 | 1000 | −200 | 154.11 | 2.5 | 333.333 | NR | NR |
| 3 | 2980 | 165 | 1000 | −200 | 142.69 | 2.5 | 1000 | 1.44 | 50 |
| 3 | 2980 | 165 | 1000 | −200 | 142.69 | 2.5 | 333.333 | NR | |
| 4.08 | 2980 | 165 | 1200 | −300 | 154.11 | 2.5 | 1000 | 1 | 55 |
| 4.08 | 2980 | 165 | 1200 | −300 | 154.11 | 2.5 | 333.333 | NR | |
| 4.13 | 1870 | 165 | 1200 | −300 | 199.77 | 2.5 | 1000 | 1 | 65 |
| 4.13 | 1870 | 165 | 1200 | −300 | 199.77 | 2.5 | 333.333 | NR | NR |
| 5 | 1870 | 165 | 1500 | −500 | 245.43 | 2.5 | 1000 | 0.56 | 150 |
| 5 | 1870 | 165 | 1500 | −500 | 245.43 | 2.5 | 333.333 | NR | NR |
| 5.05 | 2980 | 165 | 1500 | −500 | 228.31 | 2.5 | 1000 | 0.75 | 130 |
| 5.05 | 2980 | 165 | 1500 | −500 | 228.31 | 2.5 | 333.333 | NR | 55 |
| 6 | 2980 | 165 | 1800 | −500 | 342.47 | 2.5 | 1000 | 0.43 | 325 |
| 6 | 2980 | 165 | 1800 | −500 | 342.47 | 2.5 | 333.333 | NR | 100 |
| 6 | 1870 | 165 | 1800 | −500 | 342.47 | 2.5 | 1000 | 0.43 | 325 |
| 6 | 1870 | 165 | 1800 | −500 | 342.47 | 2.5 | 333.333 | NR | NR |
| 7.3 | 1870 | 165 | 2200 | −800 | 399.54 | 2.5 | 333.333 | 0.37 | 190 |
| 7.3 | 2980 | 165 | 2200 | −800 | 399.54 | 2.5 | 333.333 | 0.36 | 180 |
| 8 | 2980 | 165 | 2300 | −700 | 450.91 | 2.5 | 333.333 | 0.34 | 230 |
| 8 | 1870 | 165 | 2300 | −700 | 456.62 | 2.5 | 333.333 | 0.38 | 250 |
| 9.1 | 1870 | 165 | 2400 | −1000 | 468.04 | 2.5 | 333.333 | 0.33 | 300 |
| 9.1 | 2980 | 165 | 2400 | −1000 | 468.04 | 2.5 | 333.333 | 0.31 | 250 |
| 10 | 2980 | 165 | 2500 | −1000 | 513.7 | 2.5 | 333.333 | 0.28 | 325 |
| 10 | 1870 | 165 | 2500 | −1000 | 559.36 | 2.5 | 333.333 | 0.27 | 375 |
| 12.3 | 1870 | 165 | 2900 | −1200 | 627.85 | 2.5 | 333.333 | 0.22 | 475 |
| 12.3 | 2980 | 165 | 2900 | −1000 | 679.22 | 2.5 | 333.333 | 0.23 | 425 |
| 15 | 2980 | 165 | 3100 | −1200 | 799.09 | 2.5 | 333.333 | 0.18 | 500 |
| 15 | 1870 | 165 | 3100 | −1500 | 856.16 | 2.5 | 333.333 | 0.2 | 500 |
| 17.2 | 1870 | 165 | 3300 | −1500 | 856.16 | 2.5 | 333.333 | 0.18 | 550 |
| 17.2 | 2980 | 165 | 3300 | −1500 | 856.16 | 2.5 | 333.333 | 0.17 | 500 |
| 20.1 | 2980 | 165 | 3800 | −1600 | 1027.4 | 2.5 | 333.333 | 0.15 | 550 |
| 20.1 | 1870 | 165 | 3800 | −1600 | 1141.6 | 2.5 | 333.333 | 0.15 | 590 |
| 0.9 | 510 | 300 | 600 | 0 | 45.662 | 2000 | 5000 | NR | 45 |
| 2 | 510 | 300 | 800 | −200 | 171.23 | 2000 | 2857.14 | NR | 120 |
| 2 | 510 | 300 | 800 | −200 | 171.23 | 2000 | 2000 | NR | 70 |
| 3 | 510 | 300 | 1000 | −350 | 85.616 | 2000 | 5000 | NR | 400 |
| 3 | 510 | 300 | 1000 | −350 | 256.85 | 2000 | 1666.67 | NR | 130 |
| 3 | 510 | 300 | 1000 | −350 | 256.85 | 2000 | 1000 | 0.7 | 80 |
| 4 | 510 | 300 | 1100 | −200 | 142.69 | 2000 | 2500 | NR | 480 |

TABLE D.1-continued

List of the experimental data used

| Pressure (Torr) | $R_b$ (Ωa) | Co (pF) | $V_b$ (V) | $V_{neg}$ (V) | Io (mA) | Pulse Width (us) | Pulse Rate (Hz) | Midpoint Diameter FWHM (inches) | Peak Intensity (digital) |
|---|---|---|---|---|---|---|---|---|---|
| 4 | 510 | 300 | 1100 | −400 | 313.93 | 2000 | 1666.67 | NR | 280 |
| 4 | 510 | 300 | 1100 | −400 | 313.93 | 2000 | 1250 | 0.6 | 220 |
| 5 | 510 | 300 | 1400 | −600 | 399.54 | 2000 | 2000 | NR | 480 |
| 5 | 510 | 300 | 1400 | −600 | 399.54 | 2000 | 1111.11 | NR | 360 |
| 5 | 510 | 300 | 1400 | −600 | 399.54 | 2000 | 833.333 | 0.55 | 250 |
| 5 | 510 | 300 | 1400 | −600 | 399.54 | 2000 | 500 | NR | 100 |
| 6 | 510 | 300 | 1800 | −700 | 342.47 | 2000 | 1666.67 | NR | 650 |
| 6 | 510 | 300 | 1800 | −800 | 570.78 | 2000 | 833.333 | 0.32 | 520 |
| 6 | 510 | 300 | 1800 | −800 | 570.78 | 2000 | 333.333 | 0.42 | 230 |
| 7.3 | 510 | 300 | 2200 | −1100 | 684.93 | 2000 | 500 | 0.24 | 480 |
| 7.3 | 510 | 300 | 2200 | −1100 | 684.93 | 2000 | 250 | 0.39 | 180 |
| 8.1 | 510 | 300 | 2400 | −1300 | 713.47 | 2000 | 666.667 | 0.22 | 550 |
| 8.1 | 510 | 300 | 2400 | −1300 | 713.47 | 2000 | 250 | 0.37 | 240 |
| 10.1 | 510 | 300 | 2600 | −1300 | 799.09 | 2000 | 909.091 | 0.22 | 650 |
| 10.1 | 510 | 300 | 2600 | −1300 | 799.09 | 2000 | 500 | 0.23 | 540 |
| 10.1 | 510 | 300 | 2600 | −1300 | 799.09 | 2000 | 250 | 0.31 | 270 |
| 12 | 510 | 300 | 2800 | −1500 | 913.24 | 2000 | 769.231 | 0.21 | 660 |
| 12 | 510 | 300 | 2800 | −1500 | 913.24 | 2000 | 500 | 0.21 | 550 |
| 12 | 510 | 300 | 2800 | −1500 | 913.24 | 2000 | 250 | 0.25 | 380 |
| 15 | 510 | 300 | 3200 | −1900 | 970.32 | 2000 | 666.667 | 0.2 | 730 |
| 15 | 510 | 300 | 3200 | −1900 | 970.32 | 2000 | 357.143 | 0.2 | 650 |
| 15 | 510 | 300 | 3200 | −1900 | 970.32 | 2000 | 250 | 0.19 | 520 |
| 1 | 510 | 3881 | 600 | 80 | 171.23 | 15000 | 666.667 | NR | 55 |
| 2 | 510 | 3881 | 800 | 30 | 342.47 | 15000 | 400 | NR | 100 |
| 2 | 510 | 3881 | 800 | 30 | 342.47 | 15000 | 250 | NR | 60 |
| 3 | 510 | 3881 | 1000 | −50 | 485.16 | 13000 | 285.714 | NR | 120 |
| 3 | 510 | 3881 | 1000 | −50 | 485.16 | 13000 | 222.222 | NR | 110 |
| 3 | 510 | 3881 | 1000 | −50 | 485.16 | 13000 | 166.667 | NR | 75 |
| 4 | 510 | 3881 | 1200 | −50 | 627.85 | 12000 | 250 | 0.8 | 180 |
| 4 | 510 | 3881 | 1200 | −50 | 627.85 | 12000 | 166.667 | NR | 140 |
| 4 | 510 | 3881 | 1200 | −50 | 627.85 | 12000 | 125 | NR | 90 |
| 5 | 510 | 3881 | 1400 | −200 | 799.09 | 13000 | 200 | 0.58 | 350 |
| 5 | 510 | 3881 | 1400 | −200 | 799.09 | 13000 | 142.857 | 0.58 | 250 |
| 5 | 510 | 3881 | 1400 | −200 | 799.09 | 13000 | 83.3333 |  | 150 |
| 6 | 510 | 3881 | 1800 | −400 | 1084.5 | 12000 | 125 | 0.22 | 530 |
| 6 | 510 | 3881 | 1800 | −400 | 1084.5 | 12000 | 125 | 0.42 | 420 |
| 6 | 510 | 3881 | 1800 | −400 | 1084.5 | 12000 | 66.6667 | 0.45 | 300 |
| 7.3 | 510 | 3881 | 2200 | −500 | 1255.7 | 12000 | 100 | 0.33 | 450 |
| 7.3 | 510 | 3881 | 2200 | −500 | 1255.7 | 12000 | 66.6667 | 0.36 | 300 |
| 7.3 | 510 | 3881 | 2200 | −500 | 1255.7 | 12000 | 33.3333 | 0.34 | 150 |
| 8.1 | 510 | 3881 | 2300 | −500 | 1312.8 | 12000 | 83.3333 | 0.33 | 410 |
| 8.1 | 510 | 3881 | 2300 | −500 | 1312.8 | 12000 | 58.8235 | 0.36 | 350 |
| 8.1 | 510 | 3881 | 2300 | −500 | 1312.8 | 12000 | 28.5714 | NR | 170 |
| 10 | 510 | 3881 | 2500 | −600 | 1455.5 | 12000 | 76.9231 | 0.29 | 420 |
| 10 | 510 | 3881 | 2500 | −600 | 1455.5 | 12000 | 45.4545 | 0.34 | 370 |
| 10 | 510 | 3881 | 2500 | −600 | 1455.5 | 12000 | 22.2222 | 0.34 | 200 |
| 12.2 | 510 | 3881 | 3000 | −800 | 1655.3 | 12000 | 58.8235 | 0.26 | 480 |
| 12.2 | 510 | 3881 | 3000 | −800 | 1655.3 | 12000 | 38.4615 | 0.3 | 450 |
| 12.2 | 510 | 3881 | 3000 | −800 | 1655.3 | 12000 | 30.303 | 0.32 | 240 |
| 12.2 | 510 | 3881 | 3000 | −800 | 1655.3 | 12000 | 22.2222 | 0.32 | 250 |
| 12.2 | 510 | 3881 | 3000 | −800 | 1655.3 | 12000 | 16.6667 | 0.35 | 240 |
| 12.2 | 510 | 3881 | 3000 | −800 | 1655.3 | 12000 | 10 | 0.42 | 180 |
| 15 | 510 | 3881 | 3200 | −800 | 1883.6 | 12000 | 50 | 0.22 | 550 |
| 15 | 510 | 3881 | 3200 | −800 | 1883.6 | 12000 | 28.5714 | 0.28 | 350 |
| 15 | 510 | 3881 | 3200 | −800 | 1883.6 | 12000 | 14.2857 | 0.36 | 250 |
| 17 | 510 | 3881 | 3500 | −900 | 1997.7 | 12000 | 40 | 0.22 | 550 |
| 17 | 510 | 3881 | 3500 | −900 | 1997.7 | 12000 | 33.3333 | 0.24 | 400 |
| 17 | 510 | 3881 | 3500 | −900 | 1997.7 | 12000 | 20 | 0.32 | 350 |
| 17 | 510 | 3881 | 3500 | −900 | 1997.7 | 12000 | 12.5 | 0.37 | 320 |
| 2.2 | 167 | 300 | 850 | −300 | 285.39 | 2000 | 2500 | 1.58 | 140 |
| 2.2 | 167 | 300 | 850 | −300 | 285.39 | 2000 | 2000 | 1.65 | 100 |
| 2.2 | 167 | 300 | 850 | −300 | 285.39 | 2000 | 1428.57 | 1.95 | 70 |
| 3.1 | 167 | 300 | 1000 | −500 | 399.54 | 2000 | 2500 | 0.63 | 340 |
| 3.1 | 167 | 300 | 1000 | −500 | 399.54 | 2000 | 2500 | 1.3 | 220 |
| 3.1 | 167 | 300 | 1000 | −500 | 399.54 | 2000 | 1428.57 | 1.4 | 120 |
| 3.1 | 167 | 300 | 1000 | −500 | 399.54 | 2000 | 909.091 | 1.75 | 75 |
| 4.1 | 167 | 300 | 1200 | −600 | 342.47 | 1500 | 2000 | 0.44 | 470 |
| 4.1 | 167 | 300 | 1200 | −600 | 456.62 | 1500 | 1666.67 | 1.05 | 230 |
| 4.1 | 167 | 300 | 1200 | −600 | 456.62 | 1500 | 1250 | 1.1 | 170 |
| 4.1 | 167 | 300 | 1200 | −600 | 456.62 | 1500 | 769.231 | 1.2 | 110 |
| 5 | 167 | 300 | 1500 | −700 | 456.62 | 1500 | 1666.67 | 0.32 | 570 |
| 5 | 167 | 300 | 1500 | −700 | 456.62 | 1500 | 1000 | 0.32 | 460 |
| 5 | 167 | 300 | 1500 | −700 | 570.78 | 1500 | 833.333 | 0.72 | 230 |

TABLE D.1-continued

List of the experimental data used

| Pressure (Torr) | $R_b$ ($\Omega$a) | Co (pF) | $V_b$ (V) | $V_{neg}$ (V) | Io (mA) | Pulse Width (us) | Pulse Rate (Hz) | Midpoint Diameter FWHM (inches) | Peak Intensity (digital) |
|---|---|---|---|---|---|---|---|---|---|
| 6 | 167 | 300 | 1800 | −1000 | 799.09 | 1500 | 666.667 | 0.23 | 640 |
| 6 | 167 | 300 | 1800 | −1000 | 799.09 | 1500 | 500 | 0.43 | 320 |
| 6 | 167 | 300 | 1800 | −1000 | 799.09 | 1500 | 250 | 0.44 | 240 |
| 7.1 | 167 | 300 | 2000 | −1100 | 913.24 | 1500 | 1111.11 | 0.21 | 740 |
| 7.1 | 167 | 300 | 2000 | −1100 | 913.24 | 1500 | 588.235 | 0.24 | 600 |
| 7.1 | 167 | 300 | 2000 | −1100 | 913.24 | 1500 | 400 | 0.34 | 420 |
| 7.1 | 167 | 300 | 2000 | −1100 | 913.24 | 1500 | 200 | 0.4 | 240 |
| 8.1 | 167 | 300 | 2400 | −1500 | 998.86 | 1500 | 833.333 | 0.26 | 720 |
| 8.1 | 167 | 300 | 2400 | −1500 | 998.86 | 1500 | 333.333 | 0.3 | 460 |
| 8.1 | 167 | 300 | 2400 | −1500 | 998.86 | 1500 | 200 | 0.34 | 200 |
| 10 | 167 | 300 | 2600 | −1500 | 1141.6 | 1500 | 833.333 | 0.23 | 720 |
| 10 | 167 | 300 | 2600 | −1500 | 1141.6 | 1500 | 500 | 0.26 | 620 |
| 10 | 167 | 300 | 2600 | −1500 | 1141.6 | 1500 | 200 | 0.31 | 340 |
| 10 | 167 | 300 | 2600 | −1500 | 1141.6 | 1500 | 166.667 | 0.35 | 280 |
| 12 | 167 | 300 | 2900 | −1800 | 1369.9 | 1500 | 769.231 | 0.21 | 740 |
| 12 | 167 | 300 | 2900 | −1800 | 1369.9 | 1500 | 454.545 | 0.21 | 660 |
| 12 | 167 | 300 | 2900 | −1800 | 1369.9 | 1500 | 333.333 | 0.24 | 560 |
| 12 | 167 | 300 | 2900 | −1800 | 1369.9 | 1500 | 200 | 0.26 | 430 |
| 1.05 | 167 | 3881 | 600 | 50 | 313.93 | 13000 | 555.556 | NR | NR |
| 2 | 167 | 3881 | 800 | −10 | 570.78 | 7000 | 384.615 | 2 | 90 |
| 2 | 167 | 3881 | 800 | −10 | 570.78 | 7000 | 222.222 | NR | NR |
| 3 | 167 | 3881 | 1000 | −180 | 913.24 | 7000 | 526.316 | 1.2 | 200 |
| 3 | 167 | 3881 | 1000 | −180 | 913.24 | 7000 | 200 | 1.7 | 120 |
| 3 | 167 | 3881 | 1000 | −180 | 913.24 | 7000 | 142.857 | NR | NR |
| 3 | 167 | 3881 | 1000 | −180 | 913.24 | 7000 | 76.9231 | NR | NR |
| 4.1 | 167 | 3881 | 1200 | −250 | 998.86 | 7000 | 250 | 0.6 | 350 |
| 4.1 | 167 | 3881 | 1200 | −250 | 1141.6 | 7000 | 166.667 | 1.4 | 150 |
| 4.1 | 167 | 3881 | 1200 | −250 | 1141.6 | 7000 | 111.111 | 1.5 | 130 |
| 5 | 167 | 3881 | 1500 | −400 | 1484 | 7000 | 166.667 | 0.6 | 320 |
| 5 | 167 | 3881 | 1500 | −400 | 1484 | 7000 | 125 | 0.75 | 250 |
| 5 | 167 | 3881 | 1500 | −400 | 1484 | 7000 | 80 | 0.95 | 150 |
| 6 | 167 | 3881 | 1900 | −600 | 2054.8 | 7000 | 125 | 0.43 | 540 |
| 6 | 167 | 3881 | 1900 | −600 | 2054.8 | 7000 | 83.3333 | 0.48 | 270 |
| 6 | 167 | 3881 | 1900 | −600 | 2054.8 | 7000 | 50 | 0.57 | 250 |
| 6 | 167 | 3881 | 1900 | −600 | 2054.8 | 7000 | 26.3158 | 0.8 | 120 |
| 7 | 167 | 3881 | 2200 | −700 | 2283.1 | 7000 | 100 | 0.3 | 550 |
| 7 | 167 | 3881 | 2200 | −700 | 2397.3 | 7000 | 34.4828 | 0.48 | 300 |
| 8 | 167 | 3881 | 2400 | −800 | 2568.5 | 7000 | 83.3333 | 0.36 | 550 |
| 8 | 167 | 3881 | 2400 | −800 | 2568.5 | 7000 | 55.5556 | 0.4 | 420 |
| 8 | 167 | 3881 | 2400 | −800 | 2568.5 | 7000 | 27.027 | 0.43 | 170 |
| 8 | 167 | 3881 | 2400 | −800 | 2568.5 | 7000 | 20 | NR | NR |
| 10 | 167 | 3881 | 2600 | −900 | 2853.9 | 7000 | 76.9231 | 0.3 | 500 |
| 10 | 167 | 3881 | 2600 | −900 | 2853.9 | 7000 | 33.3333 | 0.38 | 260 |
| 10 | 167 | 3881 | 2600 | −900 | 2853.9 | 7000 | 22.2222 | 0.38 | 200 |
| 10 | 167 | 3881 | 2600 | −900 | 2853.9 | 7000 | 10 | 0.4 | 180 |
| 12.1 | 167 | 3881 | 3000 | −1000 | 3196.3 | 7000 | 62.5 | 0.29 | 570 |
| 12.1 | 167 | 3881 | 3000 | −1000 | 3196.3 | 7000 | 50 | 0.28 | 360 |
| 12.1 | 167 | 3881 | 3000 | −1000 | 3196.3 | 7000 | 34.4828 | 0.3 | 320 |
| 12.1 | 167 | 3881 | 3000 | −1000 | 3196.3 | 7000 | 22.2222 | 0.42 | 270 |
| 12.1 | 167 | 3881 | 3000 | −1000 | 3196.3 | 7000 | 16.6667 | 0.45 | 260 |
| 12.1 | 167 | 3881 | 3000 | −1000 | 3196.3 | 7000 | 10 | 0.51 | 180 |

The methods and systems can employ artificial intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain.

It can be apparent to those skilled in the art that various modifications and variations can be made without departing from the scope or spirit. Other embodiments can be apparent to those skilled in the art from consideration of the specification and practice disclosed herein. It is intended that the specification and examples be considered as exemplary only, with a true scope and spirit being indicated by the following claims.

BIBLIOGRAPHY

[1] B. Chapman, "Glow discharge processes: sputtering and plasma etching," New York, N.Y.: John Wiley and Sons, 1980.
[2] D. C. Schram, "Is plasma unique? The presence of electrons and the importance of charge," *Plasma Sources Sci. Technol.*, vol. 18, pp. 014003.
[3] J. A. Bittencourt, "Fundamentals of Plasma Physics," ed. 3, New York, N.Y.: Springer, 2004.
[4] P. Ottinger, S. A. Goldstein and R. Meger, "Theoretical modeling of the plasma erosion opening switch for inductive storage applications," J. Appl. Phys., vol. 56, no. 3, pp. 774-784.
[5] A. Robson, R. Morgan and R. Meger, "Demonstration of a plasma mirror for microwaves," *Plasma Science, IEEE Transactions on*, vol. 20, no. 6, pp. 1036-1040.
[6] I. Alexeff, T. Anderson, S. Parameswaran, E. P. Pradeep, J. Hulloli and P. Hulloli, "Experimental and theoretical results with plasma antennas," Plasma Science, IEEE Transactions on, vol. 34, no. 2, pp. 166-172.
[7] D. B. Graves and K. F. Jensen, "A continuum model of DC and RF discharges," *Plasma Science, IEEE Transactions on*, vol. 14, no. 2, pp. 78-91.
[8] D. Ball, "Plasma diagnostics and energy transport of a dc discharge used for sputtering," *J. Appl. Phys.*, vol. 43, no. 7, pp. 3047-3057.
[9] A. Von Engel, "Ionized Gases," Woodbury, N.Y.: AIP Press, 1994.
[10] J. D. Cobine, "Gaseous Conductors: Theory and Engineering Applications,", New York, N.Y.: Dover Publications, 1958.
[11] M. A. Lieberman and A. J. Lichtenberg, "Principles of plasma discharges and materials processing,", New York, N.Y.: John Wiley & Sons, 1994.
[13] J. Massey and S. Cannon, "Constricted Discharges in the Rare Gases. I. Spectroscopic and Electrical Measurements," *J. Appl. Phys.*, vol. 36, no. 2, pp. 361-372.
[14] J. Massey, "Constricted Discharges in the Rare Gases. II. Analysis of the Macroscopic Properties of the Discharge," *J. Appl. Phys.*, vol. 36, no. 2, pp. 373-380.
[15] P. Milsom, "Constriction of the positive column in a DC-driven sulphur hexafluoride gas discharge," *J. Phys. D*, vol. 29, pp. 403.
[16] Y. B. Golubovskii, V. Nekuchaev, S. Gorchakov and D. Uhrlandt, "Contraction of the positive column of discharges in noble gases," *Plasma Sources Sci. Technol.*, vol. 20, pp. 053002.
[17] D. Ogle and G. Woolsey, "Diffuse and constricted glow discharges in SF6," *J. Phys. D*, vol. 20, pp. 453.
[18] N. Dyatko, Y. Ionikh, I. Kochetov, D. Marinov, A. Meshchanov, A. Napartovich, F. Petrov and S. Starostin, "Experimental and theoretical study of the transition between diffuse and contracted forms of the glow discharge in argon," *J. Phys. D*, vol. 41, pp. 055204.
[19] G. L. Rogoff, "Gas Heating Effects in the Constriction of a High-Pressure Glow Discharge Column," *Phys. Fluids*, vol. 15, pp. 1931.
[20] E. I. Toader, "On the constricted neon positive column," *J. Phys. D*, vol. 28, pp. 75.
[21] V. Y. Baranov and K. N. Ul'yanov, "Contraction of a Positive Column. I*," *Sov. Phys. Tech. Phys.*, vol. 14, 1969, pp. 176.
[22] Y. B. Golubovskii and R. Sonneburg, "Contraction of an Inert-Gas Discharge. I. Argon (experiment)," *Sov. Phys. Tech. Phys.*, vol. 24, no. 2, 1979, pp. 173.
[23] K. N. Ul'yanov, "Contraction of the Positive Column by Dissociative Recombination," *Sov. Phys. Tech. Phys.*, vol. 18, no. 3, 1973, pp. 360.
[24] A. V. Eletskii and B. M. Smirnov, "Contraction of the Positive Column of a Glow Discharge," *Sov. Phys. Tech. Phys.*, vol. 15, 1971, pp. 1308.
[25] P. Daniels, R. Franklin and J. Snell, "The contracted positive column in electronegative gases," *J. Phys. D*, vol. 23, pp. 823.
[26] C. Kenty, "Volume Recombination, Constriction, and Volt-Ampere Characteristics of the Positive Column," *Physical Review*, vol. 126, no. 4, pp. 1235.
[27] S. Y. Miao, C. S. Ren, Y. T. Zhang, B. Qi and Y. N. Wang, "Conical DC discharge in ambient air using water as an electrode," *Plasma Science, IEEE Transactions on*, vol. 36, no. 1, pp. 126-130.
[28] N. Hayakawa, M. Fujimori, M. Hikita and H. Okubo, "Analysis of discharge phenomena under non-uniform electric field in vacuum using image processing," *Proc. on the IEEE Int. Symp. on Elect.l Insulation*, pp. 241-244.
[29] P. Carlqvist, "Cosmic electric currents and the generalized Bennett relation," *Astrophysics and space science*, vol. 144, no. 1, pp. 73-84.
[30] J. P. Freidberg, "Ideal magnetohydrodynamics," New York: Plenum Press, 1987.
[31] A. Risacher, S. Larigaldie, G. Bobillot, J. Marcellin and L. Picard, "Active stabilization of low-current arc discharges in atmospheric-pressure air," *Plasma Sources Sci. Technol.*, vol. 16, pp. 200.
[32] K. Takaki, R. Hasegawa, S. Mukaigawa, T. Fujiwara and D. Taguchi, "High-current, large volume glow plasma production using pulse modulator,"*IEEE International Symposium on Electrical Insulation, Conference Proceedings*, pp. 571-574.
[33] J. Mathew, R. Fernsler, R. Meger, J. Gregor, D. Murphy, R. Pechacek and W. Manheimer, "Generation of large area, sheet plasma mirrors for redirecting high frequency microwave beams," *Phys. Rev. Lett.*, vol. 77, no. 10, pp. 1982-1985.
[34] J. Mathew, R. Meger, J. Gregor, D. Murphy, R. Pechacek, R. Fernsler and W. Manheimer, "Electronically steerable plasma mirror," *IEEE International Symposium on Phased Array Systems, Conference Proceedings*, pp. 58-62.
[35] R. Meger, J. Mathew, J. Gregor, R. Pechacek, R. Fernsler, W. Manheimer and A. Robson, "Experimental investigations of the formation of a plasma mirror for high-frequency microwave beam steering," *Phys Plasmas*, vol. 2, pp. 2532.
[36] K. Kelly, J. E. Scharer, G. Ding, M. Bettenhausen and S. Kuo, "Microwave reflections from a vacuum ultraviolet laser produced plasma sheet," *J. Appl. Phys.*, vol. 85, pp. 63.
[37] W. M. Manheimer, "Plasma reflectors for electronic beam steering in radar systems," *Plasma Science, IEEE Transactions on*, vol. 19, no. 6, pp. 1228-1234.

[38] W. Shen, J. E. Scharer, N. T. Lam, B. Porter and K. Kelly, "Properties of a vacuum ultraviolet laser created plasma sheet for a microwave reflector," *J. Appl. Phys.*, vol. 78, no. 12, pp. 6974-6979.

[39] W. Woo and J. DeGroot, "'Microwave absorption and plasma heating due to microwave breakdown in the atmosphere," *Phys. Fluids, vol.* 27, pp. 475.

[40] R. Briggs, "Simple model of beam transport in low-pressure ion-focused regimes," *Lawrence Livermore National Lab.*, CA (USA), UCID-19187, 1981.

[41] A. Gsponer, "Physics of high-intensity high-energy particle beam propagation in open air and outer-space plasmas," *Independent Scientific Research Institute*, Oxford England, ISRI-82-04.56, January 2009.

[42] R. B. Miller, "An Introduction to the Physics of Intense Charge Particle Beams," New York: Plenum Press, 1982.

[43] R. F. Fernsler, R. F. Hubbard and S. P. Slinker, "Conditioning Electron Beams in the Ion-Focused Regime," *Phys. Fluids B*, vol. 4, 1992, pp. 4153.

[44] R. Fernsler, "Conditioning Electron Beams in the Ion-Focused Regime," *Naval Research Laboratory*, Washington D.C., NRL/MR/4790-92-7100, September 1992.

[45] H. L. Buchanan, "Electron beam propagation in the ion-focused regime," *Phys. Fluids*, vol. 30, pp. 221.

[46] W. Martin, G. Caporaso, W. Fawley, D. Prosnitz and A. Cole, "Electron-beam guiding and phase-mix damping by a laser-ionized channel," *Phys. Rev. Lett.*, vol. 54, no. 7, pp. 685-688.

[47] M. Myers, R. Fernsler, R. Meger, J. Antoniades, D. Murphy and R. Hubbard, "Emittance tailoring of electron beams for propagation in dense gas," *J. Appl. Phys.*, vol. 80, no. 8, pp. 4258-4267.

[48] M. Myers, J. Antoniades, R. Meger, D. Murphy, R. Fernsler and R. Hubbard, "Transport and centering of high current electron beams in neutral gas filled cells," *J. Appl. Phys.*, vol. 78, no. 6, pp. 3580-3591.

[49] K. Nguyen, R. Schneider, J. Smith and H. Uhm, "Transverse instability of an electron beam in a beam-induced ion channel," *Appl. Phys. Lett.*, vol. 50, no. 5, pp. 239-241.

[50] R. Briggs and S. Yu, "Modeling Beam-Front Dynamics at Low Gas Pressures," *Lawrence Livermore National Lab.*, CA (USA), UCID-19399, 1982.

[51] W. H. Bennett, "Magnetically self-focussing streams," *Physical Review*, vol. 45, no. 12, pp. 890.

[52] C. Smith and R. Schill, "DC Discharge and Breakdown Study with Applications to the Take-Off Region in an Electron Source Leading to Electron Production," *AFOSR Grant #FA9550-08-1-0045*, vol. Final Report, 2008.

What is claimed is:

1. An electromagnetic plasma disrupter device comprising:
    a vacuum pressurized waveguide;
    a capacitor bank connected to the vacuum pressurized waveguide;
    a plurality of vacuum connectors coupled to the vacuum pressurized waveguide, wherein the plurality of vacuum connectors are configured to regulate vacuum pressure within the vacuum pressurized waveguide; and
    a plurality of pairs of opposed electrodes at least partially enclosed in the vacuum pressurized waveguide, wherein a first electrode of a first pair of the plurality of pairs of the opposed electrodes is connected to ground and a second electrode of the first pair of the plurality of pairs of the opposed electrodes is coupled to the capacitor bank, wherein the capacitor back provides a voltage, wherein a second pair of the plurality of pairs of the opposed electrodes is disposed within the waveguide and is configured in series with an electronic circuit and one or more of an external source and an external load, wherein the first pair of the plurality of pairs of the opposed electrodes facilitate generating and controlling a glow discharge.

2. The device of claim 1, wherein the vacuum pressurized waveguide comprises one or more of a grounded metal enclosure, or a Faraday enclosure.

3. The device of claim 2, wherein the external source comprises one or more of an antenna, a power source, and a power outlet, and the external load comprises one or more of an electrical device, an electromagnetic device, an optical device, an electromechanical device, or a mechanical device.

4. The device of claim 1, further comprising a control system configured to control voltage applied by the capacitor bank and gas pressure within the vacuum pressurized waveguide, wherein the voltage applied biases the first pair of the opposed electrodes.

5. The device of claim 4, wherein the control system is configured to adjust one or more of a peak voltage, a peak current, a pulse width, a pulse repetition rate, and a gas pressure.

6. The device of claim 1, wherein the glow discharge comprises a stable, pulsed plasma wire.

7. The device of claim 1, wherein a gas pressure within the vacuum pressurized waveguide is between about 3 and about 20 Torr.

8. The electromagnetic plasma disrupter device of claim 1, wherein voltage provided by the capacitor bank is between about 100 volts and about 10,000 volts.

9. A method comprising:
    disposing an electromagnetic plasma disrupter device between an external source and an electronic circuit, wherein the electromagnetic plasma disrupter device is coupled to a capacitor bank and comprises a housing, a plurality of vacuum connectors coupled to the housing, wherein the plurality of vacuum connectors are configured to regulate vacuum pressure within the housing, two pairs of opposed electrodes at least partially enclosed in the housing, wherein a first electrode of a first pair of the two pairs of the opposed electrodes is connected to ground and a second electrode of the first pair of the two pairs of the opposed electrodes is coupled to a voltage source, wherein a second pair of the two pairs of the opposed electrodes is disposed within the housing and is configured in series with the electronic circuit and the external source;
    applying a vacuum pressure in the housing; and
    applying, via the capacitor bank, a voltage across the second electrode of the first pair of the opposed electrodes to generate a glow discharge.

10. The method of claim 9, wherein the voltage applied across the first pair of the opposed electrodes is an electromagnetic pulse of a base biasing voltage either equal to or greater than 100 volts.

11. The method of claim 9, wherein the voltage applied across the first pair of the opposed electrodes is between about 100 volts and about 10,000 volts.

12. The method of claim 9, wherein vacuum pressure within the housing is between about 3 and about 20 Torr.

13. The method of claim 9, wherein the voltage applied to the first electrode pair triggers the generation of the glow discharge in response to an electromagnetic pulse.

14. The method of claim 9, wherein the voltage and pressure are adjusted through a control system.

15. The method of claim 14, wherein one or more of peak voltage, peak current, pulse width, pulse repetition rate, gas pressure are adjusted through the control system.

16. An electromagnetic plasma disrupter device comprising:
   a vacuum pressurized housing;
   a capacitor bank;
   a plurality of vacuum connectors coupled to the vacuum pressurized housing, wherein the plurality of vacuum connectors are configured to regulate vacuum pressure within the vacuum pressurized housing; and
   a first pair of opposed electrodes at least partially enclosed in the vacuum pressurized housing, wherein a first electrode of the first pair of the opposed electrodes is connected to ground, and a second electrode of the first pair of the opposed electrodes is coupled to the capacitor bank, wherein the capacitor back provides a voltage source, and wherein the first pair of opposed electrodes facilitates generating and controlling a glow discharge.

17. The device of claim 16, further comprising a control system configured to control voltage applied by the capacitor bank and gas pressure within the vacuum pressurized housing.

18. The device of claim 17, wherein the control system is configured to adjust one or more of a peak voltage, a peak current, a pulse width, or a pulse repetition rate.

19. The device of claim 16, wherein voltage applied by the capacitor bank is between about 100 volts and about 10,000 volts.

20. The device of claim 16, wherein gas pressure within the vacuum pressurized housing is between about 3 and about 20 Torr.

* * * * *